United States Patent [19]

Haba, Jr. et al.

[11] Patent Number: 4,815,190
[45] Date of Patent: Mar. 28, 1989

[54] METHOD FOR AUTOMATED ASSEMBLY OF ASSEMBLIES SUCH AS AUTOMOTIVE ASSEMBLIES

[75] Inventors: Anthony R. Haba, Jr., Lake Orion; S. Craig Clough, Birmingham; Ronald E. Koeske, Fenton; Richard P. Maxwell, Jr., Redford, all of Mich.

[73] Assignee: GMF Robotics Corporation, Auburn Hills, Mich.

[21] Appl. No.: 87,690

[22] Filed: Aug. 20, 1987

[51] Int. Cl.⁴ ............................................. G23P 11/00
[52] U.S. Cl. ..................................... 29/430; 29/701; 29/783; 29/784; 29/787; 198/346.1; 198/465.1; 414/277; 414/281; 414/331; 414/416
[58] Field of Search .................. 29/430, 701, 709, 711, 29/783, 784, 787, 791, 795, 799; 198/346.1, 465.1, 465.2, 465.3; 414/222, 225, 226, 269, 277, 281, 331, 416; 901/1, 6, 7

[56] References Cited

U.S. PATENT DOCUMENTS

| | | | |
|---|---|---|---|
| 3,796,327 | 3/1974 | Meyer et al. | 29/709 X |
| 3,854,889 | 12/1974 | Lemelson | 414/592 X |
| 4,383,359 | 5/1983 | Suzuki et al. | 29/712 |
| 4,531,284 | 7/1985 | Matsuura et al. | 29/701 X |
| 4,589,184 | 5/1986 | Asano et al. | 414/225 X |
| 4,648,167 | 3/1987 | Horvath | 29/701 X |
| 4,651,863 | 3/1987 | Reuter et al. | 198/465.1 X |
| 4,674,948 | 6/1987 | Hornacek | 414/269 X |
| 4,679,149 | 7/1987 | Merz | 901/7 X |
| 4,693,370 | 9/1987 | Aceti | 29/799 X |
| 4,703,558 | 11/1987 | Mäkinen | 29/784 |

FOREIGN PATENT DOCUMENTS

| | | | |
|---|---|---|---|
| 39844 | 4/1981 | Japan | 29/430 |
| 282226 | 12/1986 | Japan | 414/71 |

Primary Examiner—P. W. Echols
Assistant Examiner—Andrew E. Rawlins
Attorney, Agent, or Firm—Brooks & Kushman

[57] ABSTRACT

Method and system for the automated assembly of power train components along a plurality of interconnected, closed loops within cells of the system wherein parts and/or subassemblies of the components are assembled on the same assembly pallet on which they were robotically kitted. Along some of the loops, the assembly pallets are automatically transferred from kitting stations to assembly stations and from the assembly stations to an unload station where the components or subassemblies are robotically unloaded. The unloaded assembly pallets are then automatically transferred from the unload station to the kitting stations to repeat the assembly process. A mechanical guided vehicle system (MGVS) asynchronously conveys the assembly pallets along the closed loops which form guide tracks between the different stations. An automated guided vehicle system (AGVS) preferably transports part storage pallets to the system from a receiving area. Automated stacking cranes transfer the part storage pallets to and from predetermined part positions within queuing rack structures adjacent the kitting and assembly stations. The queuing rack structures and the automatic stacking cranes form part of an automated storage and retrieval system (AS/RS) which interconnect the different closed loop guide tracks. The queuing rack structure also stores subassemblies loaded on assembly pallets. Manual kitting and assembly areas are also provided. Fastening robots are provided at fastening stations located along selected ones of the guide tracks. A distributed or hierarchial control system controls each of the elements of the system. When finally assembled, the power train components are robotically unloaded from their assembly pallets and transported by the AGVS to a vehicle assembly area.

30 Claims, 14 Drawing Sheets

METHOD FOR AUTOMATED ASSEMBLY OF ASSEMBLIES SUCH AS AUTOMOTIVE ASSEMBLIES

TECHNICAL FIELD

This invention relates to method and system for automated assembly of assemblies, such as automotive assemblies, and, in particular, to method and system for automated and flexible assembly of such assemblies.

BACKGROUND ART

The predominate approach today to introduce factory automated technology into manufacturing is to selectively apply automation and to create islands of automation. The phrase "islands of automation" has been used to describe the transition from conventional or mechanical manufacturing to the automated factory. Interestingly, some appear to use the phrase as though it were a worthy end object. On the contrary, the creation of such islands can be a major impediment to achieving an integrated factory.

Manufacturing examples of islands of automation often include numerically controlled machine tools; robots for assembly, inspection, painting, and welding; lasers for cutting, welding and finishing; sensors for test and inspection; automated storage/retrieval systems (AS/RS) for storing work-in-process, tooling and supplies; smart carts, monorails, and conveyors for moving material from work station to work station; automated assembly equipment and flexible machining systems. Such islands are often purchased one at a time and justified economically by cost reductions. An example of an AS/RS system is disclosed in the U.S. Pat. No. 4,328,422 to Loomer. A different type of AS/RS system and control system therefor is disclosed in the U.S. Pat. No. 4,232,370 to Tapley.

To integrate the islands of automation it is necessary to link several machines together as a unit. For example, a machine center with robots for parts loading and unloading can best be tied to visual inspection systems for quality control Computer numerical control machine tools can all be controlled by a computer that also schedules, dispatches, and collects data. Selecting which islands to link can be most efficiently pursued on the basis of cost, quality and cycle time benefits.

In some cases the islands of automation will be very small (e.g. an individual machine or work station). In other cases the islands might be department-sized. The U.S. Pat. No. 4,611,749 to Kawano discloses the use of robots to transfer parts between such islands which are relatively close to each other.

From a systems viewpoint, islands of automation are not necessarily bad, so long as they are considered to be interim objectives in a phased implementation of an automated system. However, to obtain an integrated factory system, the islands of automation must be tied together or synchronized. Systems synchronization frequently occurs by way of a material-handling system; it physically builds bridges that join together the islands of automation. Early examples of such islands of automation linked together by a material-handling system are disclosed in the U.S. Pat. Nos. 4,369,563 to Williamson and 3,854,889 to Lemelson.

The '563 patent discloses a system including machine tools which perform machining operations on workpieces loaded on pallets. The pallets are delivered to the machine tools from a storage rack by transporters. The workpieces are manually loaded onto the pallets.

The '889 patent discloses a system including workholding carriers which are selectively controlled in their movement to permit work to be transferred to selected machine tools while bypassing other machine tools.

Automated material handling has been called the backbone of the automated factory. Other than the computer itself, this function is considered by many automation specialists as the most important element in the entire scenario of automated manufacturing. It is the common link that binds together machines, workcells, and departments into a cohesive whole in the transformation of materials and components into finished products. For example, the U.S. Pat. No. 4,332,012 to Sekine et al discloses a control system for assembly lines for the manufacture of different models of automotive vehicles. Temporary storage is provided between assembly steps by a storage section.

To date, the major application for industrial robots has been material handling. Included here are such tasks as machine loading and unloading; palletizing/depalletizing; stacking/unstacking; and general transfer of parts and materials—for example, between machines or between machines and conveyors. An example of one such application is disclosed in the U.S. Pat. No. 4,519,761 to Kenmochi. The '761 Patent discloses a combined molding and assembling apparatus wherein a pallet is conveyed by a conveyor. Resin components are carried by the pallet for use in the molding and assembling operation.

Robots are often an essential ingredient in the implementation of Flexible Manufacturing Systems (FMS) and the automated factory. Early examples of the use of robots for assembling small parts is disclosed in the U.S. Pat. Nos. 4,163,183 and 4,275,986 wherein robots are utilized to assemble parts from pallets onto a centrally located worktable.

The automated factory may include a variety of material transportation devices, ranging from driver-operated forklifts to sophisticated, computer-operated, real-time reporting with car-on-track track systems and color graphics tracking. These material transport systems serve to integrate workcells into FMS installations and to tie such installations and other workcells together for total factory material transport control.

With all of their versatility, robots suffer from a limitation imposed by the relatively small size of their work envelope, requiring that part work fixtures and work-in-process be brought to the robot for processing. Complete integration of the robot into the flexible manufacturing system requires that many parts and subassemblies be presented to the robot on an automated transport and interface system. For example, installation of an assembly robot without an automated transport system will result in an inefficient island of automation needing large stores of work-in-process inventory for support, which are necessary to compensate for the inefficiencies of manual and fork truck delivery.

A recent example of the use of robots in a manufacturing assembly line is disclosed in the U.S. Pat. No. 4,611,380 to Abe et al. The '380 Patent also discloses the use of a bar code to identify the components to be assembled to a base component to control the assembly operations.

The U.S. Pat. No. 4,616,411 to Suzuki et al discloses a fastening apparatus including a bolt receiving and supply device for use in the automated assembly of a door to a vehicle.

The handling, orienting and feeding of parts as they arrive from vendors are formidable jobs which must be done prior to robotic assembly since, in general, all such parts require reorienting for the assembly robot. The U.S. Pat. No. 4,527,326, to Kohno et al., for example, discloses a vibratory bowl which feeds parts to an assembly robot. A vision system enables the robot to properly pick up the parts from the bowl.

Part feeding is a technology that generally has lagged behind the advanced automation systems it supports. However, in general, part feeding curtails flexibility, increases costs, increases floor space requirements and lengthens concept-to-delivery time. For maximum flexibility, a minimum amount of tooling should be considered. On the other hand, additional tooling can be used effectively to "buy time" by assisting the robot. Typically, dedicated hardware—bowl feeders, magazines, pallets—is required to feed parts to the robot. Unlike the robot, dedicated hardware is not easily reusable and therefore is less economical for medium-volume applications.

The U.S. Pat. No. 4,383,359 discloses a part feeding and assembly system, including multiple stage vibration and magazine feeders. A robot is utilized to change the position of the fed parts for assembly on a chassis supported on a line conveyor. The robot operates in combination with a vision system to reorient the parts.

Neither flexible nor sophisticated, part feeding equipment is usually constructed by highly skilled artisans working with welding torch and hammer in small specialized shops. The most common and most inexpensive feeding method—vibratory bowl feeding—provides the builder with a versatile base easily modified to handle many different parts which are not delicate and which are substantially identical. Delicate parts or parts that tangle, such as motors, are better fed by magazines or trays for exact orientation.

Also, not all parts, for example, can be bowl fed. For most parts, the overriding concern is geometry and, in particular, symmetry. If a part is either symmetric or grossly asymmetric, then vibratory bowl feeding will be easier and more efficient.

Robots may load and unload workpieces, assemble them on the transport, inspect them in place or simply identify them. The kind of activity at the robot or machine and material transport system interface dictates the transport system design requirements. One of the design variables relating to the interface includes accuracy and repeatability of load positioning (in three planes). Also, care in orienting the workpiece when it is initially loaded onto the transport carrier will save time when the work is presented to the robot or the tool for processing. Proper orientation of the part permits automatic devices to find the part quickly without "looking" for it and wasting time each time it appears at the workstation.

Fixtures may be capable of holding different workpieces, reducing the investment required in tooling when processing more than one product or product style on the same system.

The transport system must be capable of working within the space limitations imposed by building and machinery configurations, yet must be capable of continuous operation with the loads applied by a combination of workpiece weight, fixture weight, and additional forces imposed by other equipment used in the process.

The system must also have the ability to provide queuing of parts at the workstation so that a continuous flow of work is maintained through the process. Automatic queuing of transport carriers should provide gentle accumulation without part or carrier damage.

The primary impediment to robotic assembly is economic justification. When the cost of robotic assembly is compared against traditional manual methods or high volume dedicated machinery, robots oftentimes lose out. On one side of the spectrum are the high-volume, high-speed applications where hard automation is used. It's difficult for robots to compete in that environment. On the other side are the low-volume, high variety products that are assembled manually. Robots may lack the dexterity to perform these jobs, and they may cost more than relatively low-paid manual assemblers. There is a middle ground between these two extremes for flexible assembly. Many believe that the best approach is a combination of robots, dedicated equipment and manual assembly.

There are other barriers to the use of robots in mechanical assembly. They include the following: (1) the high cost of engineering a new system, which may run three to five times the cost of the robot itself; (2) the amount of time it takes to engineer the system; (3) the difficulty of coordinating multiple arms; (4) the difficulty of integrating an assembly system; (5) the high cost of tooling, software sensors, part presentation equipment, and other peripherals; (6) the difficulty of finding knowledgeable personnel; (7) insufficient speed, lift capacity, and positioning accuracy and repeatability on the part of the robots; and (8) a lack of supporting technology in such areas as high-level programming languages, end-of-arm tooling, and sensors.

Additional impediments to the successful implementation of robots in assembly are insufficient communication among departments, a general slowdown in capital equipment acquisition, a disinclination to plan ahead, fear of change, and the infamous NIH (Not Invented Here) Syndrome that keeps companies from accepting ideas originating outside their walls.

Still, while assembly is probably the most difficult area of robotic application, many say it also holds the most promise. Assembly robots offer an array of benefits that cannot be ignored. They can produce products of high and consistent quality, in part because they demand top-quality components. Their reprogrammability allows them to adapt easily to design changes and to different product styles. Work-in-process inventories and scrap can be reduced. Therefore, it is important that the materials transport system serving the robots be capable of quickly moving into position with parts, then quickly moving out of the workstation and on to downstream stations. Prompt transporter movements between stations allow work-in-process inventory to be minimized. Batch sizes are smaller and work faster with only a minimum of queuing at each workstation.

The U.S. Pat. No. 4,594,764 to Yamamoto discloses an automatic apparatus and method for assembling parts in a structure member such as an instrument panel of an automobile. A conveyor conveys a jig which supports the panel to and from assembly stations. Robots mount the parts on the instrument panel at the assembly stations. Robots are provided with arm-mounted, nut-driving mechanisms supplied from vibratory parts bowls.

A link for tying together some of the independently automated manufacturing operations is the automatic guided vehicle system (AGVS). The AGVS is a relatively fast and reliable method for transporting materials, parts or equipment, especially when material must be moved from the same point of origin to other common points of destination. Guide path flexibility and independent, distributed control make an AGVS an efficient means of horizontal transportation. As long as there is idle space and a relatively smooth floor to stick guide wires or transmitters into, the AGVS can be made to go there.

As an alternative to traditional conveying methods, the AGVS provides manufacturing management with a centralized control capability over material movement. Also, the AGVS occupies little space compared with a conveyor line. Information available from the AGVS also provides management with a production monitoring data base. The U.S. Pat. No. 4,530,056 to Mackinnon et al. discloses an AGVS system including a control system for controlling the individual vehicles.

A relatively new type of link for tying together independently automated manufacturing operations is the mechanical guided vehicle (MGV) commercially available from the Roberts Corporation of the Cross and Trecker Corporation of Bloomfield Hills, Mich. The MGV is a self-contained, self-propelled, battery-operated vehicle which travels on a track system. The vehicle is utilized to carry a load much like an automated guided vehicle.

Robot installations for transporter interface can be grouped into three principal categories: (1) stationary robots, (2) moving (i.e. mobile) robots (on the floor or overhead), and (3) robots integral with a machine. The moving robots subdivide into two types. First are stationary robots, mounted on a transporter to move between work positions to perform welding, inspection, and other tasks. The second type of moving robot is the gantry unit that can position workpieces weighing more than one ton above the workcells and transport system. The system only has to deliver and pick up somewhere under the span of gantry movement.

End effectors used in material handling include all of the conventional styles—standard grippers, vacuum cups, electromagnets—and many special designs to accommodate unusual application requirements. Dual-purpose tooling is often used to pick up separators or trays, as well as the parts being moved through the system.

Vacuum-type grippers and electromagnetic grippers are advantageous because they permit part acquisition from above rather than from the side. This avoids the clearance and spacing considerations that are often involved when using mechanical grippers.

However, the use of vacuum and electromagnetic grippers is not without its problems since cycle time is not just a function of robot speed and its accelerating/decelerating characteristics. Cycle time is dependent on how fast the robot can move without losing control of the load. Horizontal shear forces must be considered in the application of these grippers. This often means that the robot is run at something less than its top speed.

DISCLOSURE OF THE INVENTION

An object of the present invention is to provide an improved method and system for the reliable and flexible assembly of assemblies, such as automotive assemblies, utilizing a blend of and robotic other intelligent material handling operations to assemble the assemblies quickly yet reliably.

Another object of the present invention is to provide an improved method and system for the reliable and flexible assembly of assemblies such as a variety of power train components utilizing an interconnected blend of individual automated components, such as robots, AGV's, MGV's and stacking cranes.

Yet still another object of the present invention is to provide an improved method and system for the flexible and cost-effective assembly of assemblies, such as automotive assemblies, wherein factory floor space is utilized effectively during the assembly operations performed by the automated assembly components of the system.

In carrying out the above objects and other objects of the present invention, a method for the automated assembly of parts on an assembly pallet in an assembly area is provided. The method comprises the steps of: (a) automatically transferring the assembly pallet to a kitting station in the assembly area including a kitting robot having a work envelope; (b) storing a first set of parts at the kitting station within the work envelope of the kitting robot; and (c) utilizing the kitting robot to pick and place the first set of the parts on the assembly pallet at a first set of predetermined positions thereon. The method further comprises the steps of; (d) automatically transferring the assembly pallet loaded with the parts to an assembly station in the assembly area to assemble the parts on the assembly pallet into at least one assembly; (e) automatically transferring the assembly on the assembly pallet to an unload station for unloading the assembly from the assembly pallet; and repeating steps (a) through (e) for each assembly.

Further in carrying out the above objects and other objects of the present invention, a system for assembling a series of sets of parts movable along a guide track having a closed loop in an assembly area is provided. The system comprises a kitting station in the assembly area including a program-controlled kitting robot having a work envelope, means for storing sets of parts at the kitting station within the work envelope of the kitting robot, an assembly station in the assembly area to assemble each set of parts into an assembly; and an unload station for unloading each of the assemblies wherein each of the stations is located along the guide track. The system further comprises transport means including first and second assembly pallets for conveying first and second sets of the parts along the guide track and for stopping and maintaining each of the assembly pallets in a stationary, predetermined position relative to the guide track during the kitting, assembly and unloading functions performed in the kitting, assembly and unload stations, respectively. Control means causes the kitting robot to pick and place the first set of the parts on the first assembly pallet at a first set of predetermined positions thereon, to pick and place the second set of parts on the second assembly pallet at a second set of predetermined positions thereon and causes the transport means to move the first and second assembly pallets in an asynchronous fashion to each of the different stations along the guide track. The control means further causes the transport means to move the first and second assembly pallets from the unload station to the kitting station after unloading of the assemblies for further assembly of additional sets of parts.

Preferably, a plurality of kitting and assembly stations are provided along at least one closed loop guide track. The assembly pallets are asynchronously conveyed along each of the guide tracks between the stations.

Also, preferably, parts and/or subassemblies are robotically assembled on the same assembly pallet on which they were robotically kitted.

Subassemblies, as well as parts are, preferably, temporarily stored between the guide tracks within queuing rack structures by automated stacking cranes to provide added flexibility.

The advantages of the present invention will be readily appreciated as the same become better understood by reference to the following detailed description when taken in connection with the accompanying drawings.

BEST MODE FOR CARRYING OUT THE INVENTION

Figure 1:
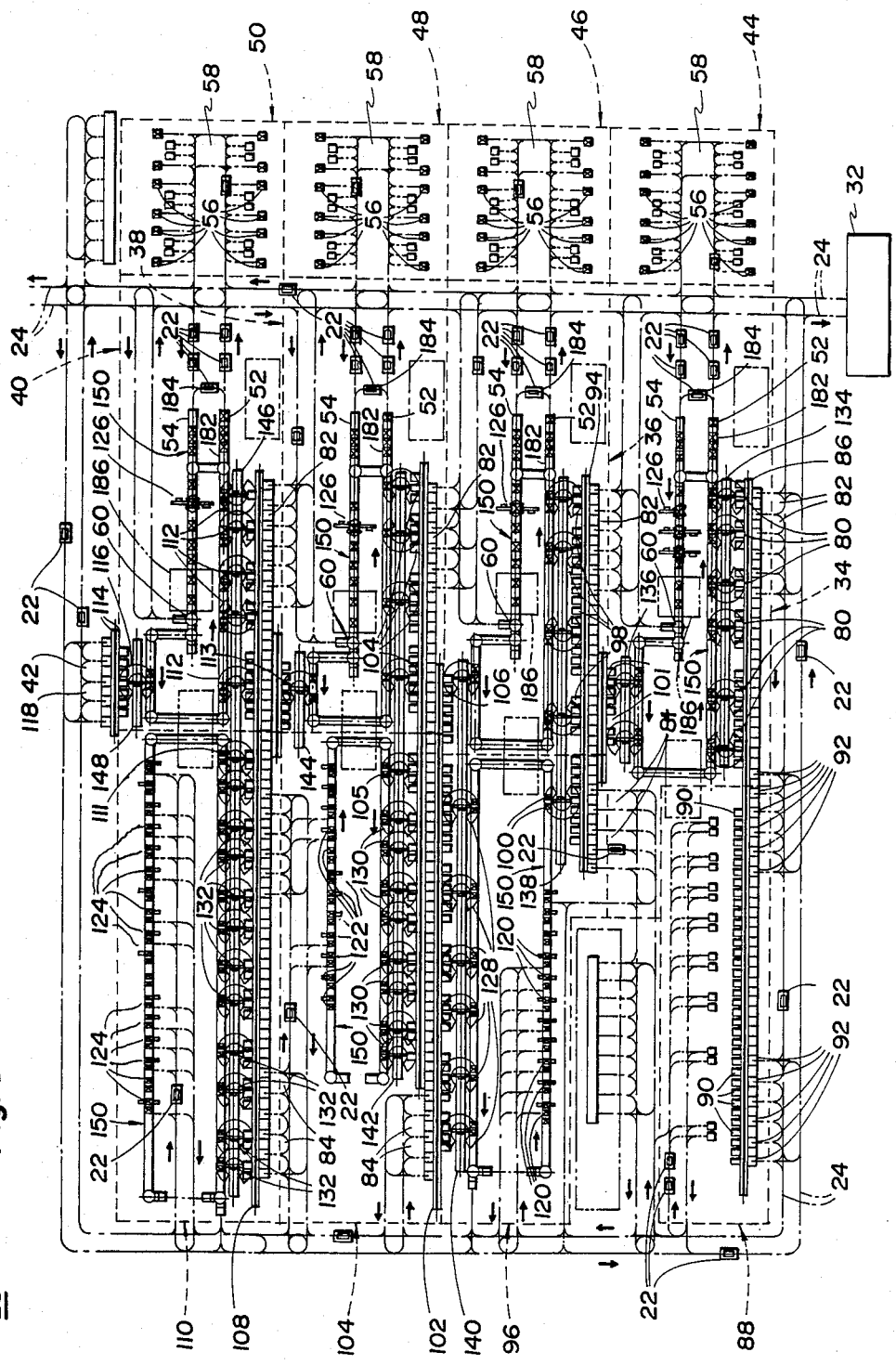
FIG. 1 is a top schematic view illustrating the method and system of the present invention.

Referring now to the drawing figures there is illustrated in FIG. 1 a top schematic view of the physical layout of a system, collectively indicated at 20, of the present invention. In order to better understand the system 20 and the method of the present invention, various major components of the present invention are now described.

AGV

The system 20 includes automated guided vehicles (AGV) 22 which are preferably unit load vehicles with a lift top. Each automated guided vehicle 22 is a battery powered, wire guided, automatically controlled carrier specifically adapted to transport loads between a variety of assembly areas, queuing racks, receiving and vehicle assembly.

In brief, each vehicle 22 features: Bidirectional travel provided by two independently mounted drive wheels; steering accomplished by varying the speeds of the opposing drive wheels; a drive motor for each wheel controlled by an AC servo drive system; various operator controls such as a vehicle control panel and hand controller; easily accessed battery compartment accomplished through a slide-out battery charger as an interface for automatic battery charging at stations 23; right and left antennas, magnet sensors, and other apparatus for guidepath tracking and communications; microprocessor-based, on-board control system; and a lift top that interfaces with a variety of pick-up and delivery stations via a telescoping load table having a motor-driven chain drive system. A lift motor is controlled by a single speed bi-directional controller. Lift top height is monitored by an incremental encoder.

TRACKING

Tracking of each vehicle 22 along a guidepath, indicated by phantom lines 24, is performed by monitoring the guidepath frequency signals carried by the embedded guidepath 24. This is performed by following frequency signals F1 and F2. The individual frequency signals are detected by the vehicle's on-board antennas.

Under normal operations, each vehicle 22 automatically follows the selected guidepath frequency. It does this by comparing the signal strengths detected by the right and left side antennas. If a difference is detected, the vehicle 22 has drifted off the guidepath and the drive wheel speeds are adjusted to correct the error. Tachometers are provided on both wheels for feedback control to the AC servo and to allow the on-board processor to provide maximum vehicle speed settings.

Digital encoders which generate high frequency pulse trains are also provided for each drive wheel. These sensors are used to compare the actual distance traveled with the distances specified between physical events by an AGV controller. The encoders are also used to provide feedback during off-wire vehicle turns and limited dead reckoning movement.

Communications to each vehicle 22 are accomplished by modulating a high frequency F3 signal. This signal is simultaneously superimposed on both the F1 and F2 guidance loops of the guidepath 24. Each vehicle 22 can communicate with an off-board control system 26 of the vehicle 22 at any time it is properly aligned with a section of guidewire.

Communication capabilities of each of the vehicles 22 include: status interrogation—this includes information such as vehicle number, load identification, battery charge condition, error code, and current zone location; lift table commands—commands are sent to the vehicle to position the lift table. Commands are available to set the lift height in one inch increments; and movement commands—commands are sent to the vehicle to move it along the guidepath 24. Commands are available to set the vehicle speed from 0–100 FPM.

The automated guided vehicles 22 are used to convey pallets 28 of parts/subassemblies, parts bins and assembly fixtures. The applications are controlled by the same computer system or system controller 30 for flexibility and utilization of the vehicles.

For example, the automated guided vehicles 22 transport pallets 28 of individual parts and subassemblies as follows: from a receiving area 32 to each of the four kitting, fastening and test cells 34, 36, 38 and 40, respectively; and, from an unload area or station 42 to the final vehicle assembly line. The vehicles 22 also move parts bins (not shown) from manual bulk kitting to manual build areas 44, 46, 48 and 50; and, return empty pallets 28 and parts bins to their respective storage areas.

The automated guided vehicles 22 transport assembly pallets 28 as follows: from the pick-up station 52 at the exit of each kitting, fastening and test cell 34, 36, 38 or 40 to the respective manual build areas 44, 46, 48 and 50; from the manual build areas 44, 46, 48 and 50 to their respective deposit stations 54 prior to automatic fastening and testing; from one of the manual build stations 56 within the manual build areas 44, 46, 48 and 50; from reject stations 60 after automotive test to the repair area 58; and from the repair areas 58 back to the assembly process.

AS/RS

Figure 15:
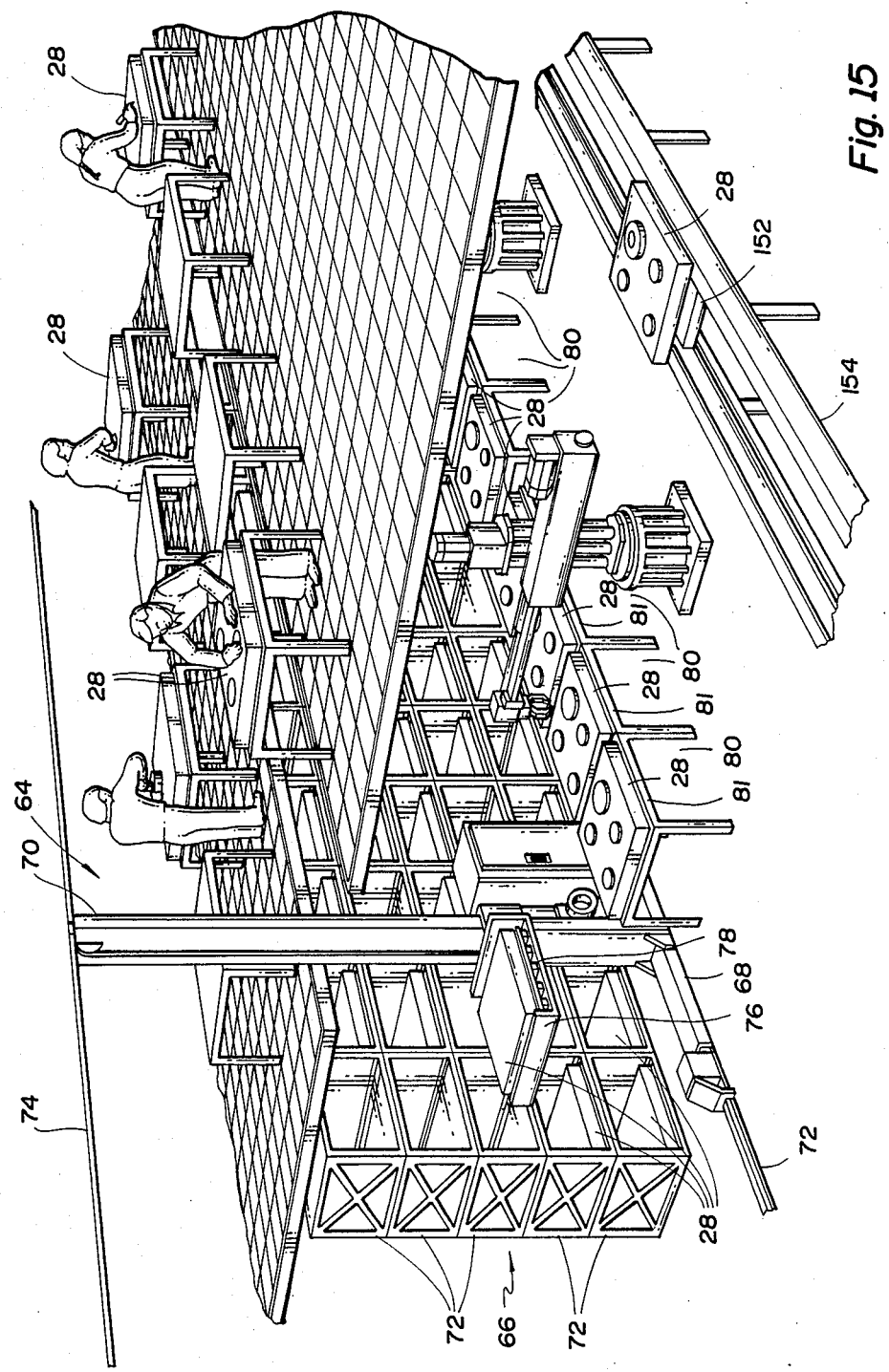
FIG. 15 is a partially broken away perspective view of a portion of a second, two-level embodiment of the system.
Figure 17:
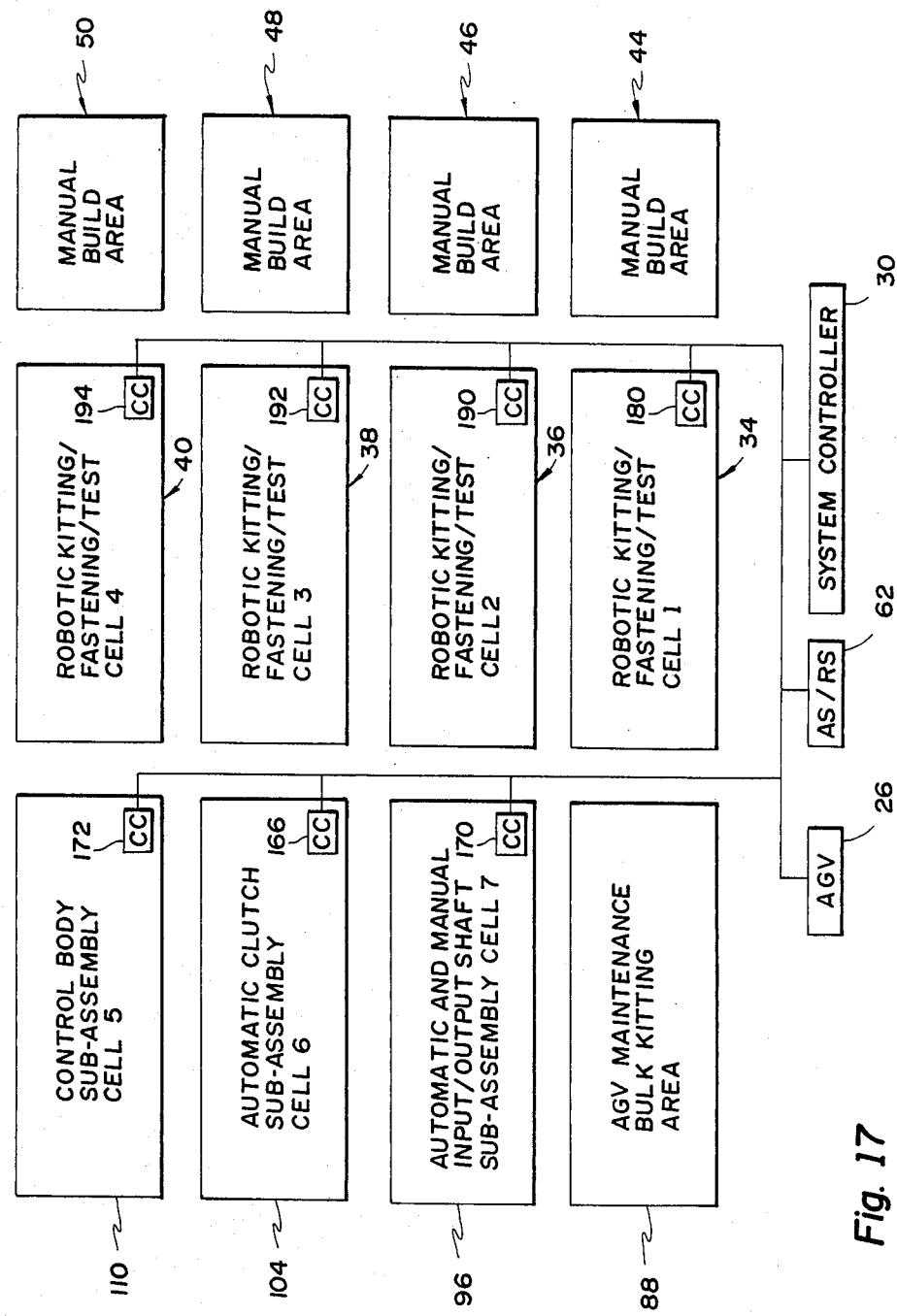
FIG. 17 is a block diagram of various cells and areas including cell controllers.

Referring to FIGS. 15 and 17, the system 20 includes an automated storage and retrieval system (AS/RS) 62 which includes a plurality of automated stacking cranes and a plurality of queuing structures. Each stacker crane, generally indicated at 64, is a computer-controlled vehicle that automatically transfers the pallets 28 in a queuing rack structure, generally indicated at 66. Each crane 64 operates as an integral part of the automated material handling system.

The crane main framework consists of a structural steel tubular 68 base with a vertical square steel tube mast 70 with steel lift platform guide tubes welded to it. Mechanical and electrical hardware is attached to the framework.

The crane 64 moves horizontally down an aisle in the rack structure on a steel rail 72 secured to the floor. A guide tube 74, attached to the underside of the cross-aisle ties at the top of the aisle parallel to the floor rail, stabilizes the top of the crane. A lift carriage 76 independently moves up and down vertically on the crane's mast 70 providing access to vertical tiers of bins 72 of the structure 66. A shuttle device 78 is mounted on the lift carriage 76 and transfers pallets 28 from the rack structure 66, to the lift carriage 76, to storage tables 81 located in robot picking stations 80 disposed parallel to the rail 72 or crane runway, and back.

Operation of the crane 14 is provided by a control computer of the system 62 commanding the crane 64 to position the shuttle device 78 vertically tier) and horizontally (bay) at a specific location (address) in the rack structure 66. The shuttle device 78 removes the pallet 28 and holds it on the lift carriage 76. The crane 64 then delivers the pallet 28 to the particular picking location or station 80 in the aisle. The crane 64 replaces the pallet 28 in the rack structure 66 when commanded by the computer.

Each automatic stacker crane 64 and its associated rack structure 66 are used as a transfer mechanism and a parts/assembly queuing area. Prior to automatic robot kitting the cranes 64 are used to pick up pallets 28 of parts from pick-up stations 82 and move them to queuing areas in the rack structure 66, then move the pallets 28 from the queuing areas in the rack structure 66 to the robotic picking stations 80. It also removes the empty pallets that are used at the robotic picking stations 80 and transfers them back through the queuing area in the structure 66 and to pick-up stations 84.

There is a total of five (5) areas in the system 20 where an automatic stacker crane system 86 which includes at least one stacker crane 64 and its associated rack structure 66 is located as described below.

A first single aisle multiple automatic crane system 86 services a manual subassembly area including the cell 34 and a manual bulk kitting area, generally indicated at 88. The system 86 has the following functions transfers pallets 28 of parts/assemblies from AGV input and output stations 82 (i.e. from the receiving area 32) to the queuing area of its rack structure; transfers pallets 28 of parts/assemblies from the queuing area to the robotic picking stations 80 prior to manual assembly in the manual build area 44; transfers bulk parts bins 90 from bulk kitting area 88 to a queuing area in its rack structure; and transfers bulk parts bins 90 to/from the queuing area from/to AGV pick-up and deposit stations 92.

A dual aisle, multiple automatic stacker crane system 94 services a build station No. 1 area which includes an automatic and manual input/output shaft subassembly cell 110 and the cell 36. The system 94 transfers pallets 28 of parts/assemblies from AGV input stations 96 (i.e. from the receiving area 32) to a queuing area in its rack structure; transfer pallets 28 of parts/assemblies from its queuing area to robotic picking stations 98; transfers pallets 28 of finished input/output shaft subassemblies from unload stations 100 (automatic input/output shaft subassembly from the cell 96) to a queuing area in its rack structure; transfers pallets 28 of finished input/output shafts from the queuing area to the robotic picking stations 92 prior to manual assembly in the manual build area 46; and transfers pallets 28 of completed subassemblies from a robot unload station 101 to a queuing area in its rack structure.

A dual aisle, multiple automatic crane system 102 services a build station No. 2 area which includes an automatic clutch subassembly cell 104 and the cell 38. The system 102 transfers pallets 28 of parts/assemblies from AGV input stations 82 (i.e. from the receiving area 32) to a queuing area in its rack structure; transfers pallets 28 of parts/assemblies from the queuing area to robotic picking stations 104 prior to manual assembly in the input/output shaft cell 96 and for automatic assembly in the clutch subassembly cell 104; transfers pallets 28 of finished clutch assemblies from unload stations 105 of cell 104 to a queuing area in its rack structure; and transfers pallets 28 of completed subassemblies from a robot unload station 106 to a queuing area in its rack structure.

A dual aisle, multiple automatic crane system 108 services a build station No. 3 area which includes a control body subassembly cell 110 and the cell 40. The system 108 transfers pallets 28 of parts/subassemblies from AGV input stations 82 (i.e. from the receiving area 32) to a queuing area in its rack structure; transfer pallets 28 of parts/subassemblies from the queuing area to robotic picking stations 112 for manual assembly in the manual build area 50 and for automatic assembly in the control body subassembly cell 110; transfers pallets 28 of the finished control body subassemblies from an unload station 111 of cell 110 to a queuing area in its rack structure; and transfers pallets 28 of completed subassemblies from a robot unload station 113 to a queuing area in its rack structure.

A single aisle, single stacker crane system 114 services the exit of completed transmission assemblies. The system 114 transfers pallets 28 of completed transmissions from a robot unload station 116 to a queuing area in its rack structure; and transfers pallets 28 of completed transmissions from the queuing area to AGV pick-up stations 118 for delivery to final vehicle assembly.

ROBOTS

The system 20 includes two types of robots. Preferably, one type of robot is the GMF A-510 robot which is a horizontal articulated (SCARA Type) robot with four (4) axis movement. The A-510 robot is utilized in robotic assembly stations 120, 122 and 124 in the cells 96, 104 and 110, respectively. The A-510 robots are to be mounted on quick change base plates. The second type of robot is the GMF M-100 robot with four (4) axis movement. The M-100 robot is utilized in fastening stations 126 in each of the cells 34, 36, 38, and 40. Each of the M-100 robots is mounted on a quick-change base plate.

The M-100 robots are also utilized in the kitting stations 80, 98, 104 and 112 and kitting stations 128, 130 and 132 in the cells 96, 104 and 110, respectively. Finally, the M-100 robots are utilized in unload stations 100, 101, 106, 105, 112, 111, and 116.

The M-100 robots in the kitting stations 80 are mounted on a servo track 134; in the unload stations 101 on a servo track 136; in the picking stations 98 and the unload station 100 on a servo track 138; in the picking stations 128 and the unload station 106 on a servo track 140 in the unload station 105 and in the picking stations 104 and 130 on a servo track 142; in the unload station 112 on a servo track 144; in the unload station 111 and the picking stations 112 and 122 on a servo track 146; and on the unload station 116 on a servo tack 148.

The kitting and unload robots are mounted on their respective servo tracks to allow them to index from one pick-up position to another. Utilization of the servo tracks allows the total number of robots applied to the system to be greatly reduced and system redundancy is enhanced in that if one robot were to fail, the robot next to it on the servo track could take over its operation.

The assembly and kitting operations are performed in the horizontal plane to allow the less complex four (4) axis configured robots to be applied, since the major tasks of the robots are radial orientation and up/down insertions.

MGV

Each of the cells 34, 36, 38, 40, 96, 104 and 110 includes a closed-loop mechanical guided vehicle system, generally indicated at 150. Each system 150 includes a plurality of mechanical guided vehicles (MGV), one of which is shown in FIG. 15 at reference numeral 152. Each MGV 152 is a self contained, self propelled, battery operated vehicle. The vehicle is a sub-frame construction consisting of a steel supported frame with battery, motor, electrical hardware, charging system (on-board) and drive train adherent to the frame construction. The body of the MGV 152 is a formed steel construction attached and supported by the sub-frame. The MGV 152 is sized to support loaded pallets 28.

Two embodiments of wheel design (placement) can be implemented. One embodiment includes a basic four wheel design with front or rear drive. The second embodiment includes a three wheel design for use with radiused curves. The three wheel model can be used in straight line applications as well, but its primary use is in applications where corners are incorporated in the system. Structural balance and support are not effected by the three wheel application.

Drive speeds of each MGV 152 are variable in any speed configuration up to approximately 68-70' per minute. In order to achieve a lesser speed a gear reduction unit can be installed. The MGV also incorporates on-board, through-light emitters. The MGV has the capability to decelerate to 6" per second at approximately 12" from the stop station point. At this speed rate with load, the MGV free stopping tolerance is within a +/−0.030 window.

MGV stations are located along each system 150 and are illustrated by rectangles having an included "X" therein. With a free stop tolerance of approximately 0.030, a shot pin station with "V" locators and pin locators will bring the station location to within a +/−0.002 position. The MGV location configuration can be, as application requires, a side or bottom centering system. Also, this implies that tolerances are dependent on the type of fixture and how it is keyed to each MGV 152.

Each system 150 includes a closed-loop MGV track 154 having an aluminum extrusion, right and left sides, with steel angle iron supported by means of offsets through the extrusion walls. The angle iron "rails" are dimensionally configured to the MGV wheel base. Considering the travel direction as X and the side-to-side direction as Y, the means required to keep the Y tolerance in the same basic area as the X tolerance is resolved by attaching cam followers to the MGV and manufacturing the rails in the station area to a specified tolerance. In this way dimensional positioning can be attained. Extrusions and rails are mechanically attached and supported in the Y axis direction at specified locations for vibration and structural support. Rail systems are applied in single layered structures as well as multi-level systems, for MGV return or continuous run applications. All systems are mounted with a mounting leg support at the height dictated by the application.

Lift and lowering stations can be incorporated in any location within the system 20. For example, a lift station 156 and a lowering station 158 are located in each of the cells 96, 104 and 110 to allow the vehicles 22 to move within each of the tracks 154. The lift and lowering stations also can be either mechanically driven or air operated.

An MGV charging system is supported and directly attached to the rails of the MGV track 154. The charging system can be provided in many configurations directly related to the application required in a situation of a multi-level rail system application. A queuing station can be incorporated for a designated time in direct parallel to the cycle time required. Queuing station or continuous charging can be provided, again dependent on the application. Charging system gauging is available for monitoring in production system application for easy reference and maintenance.

Fixturing for applications with each MGV 152 can be as varied as the application requires. For example, some of the pallets 28 are doweled for part specific tooling and are adapted for use with a mechanical, hydraulic screw, etc. lift mechanism for use in the lift and lowering stations 156 and 156, respectively.

HARD AUTOMATION

Figure 4:
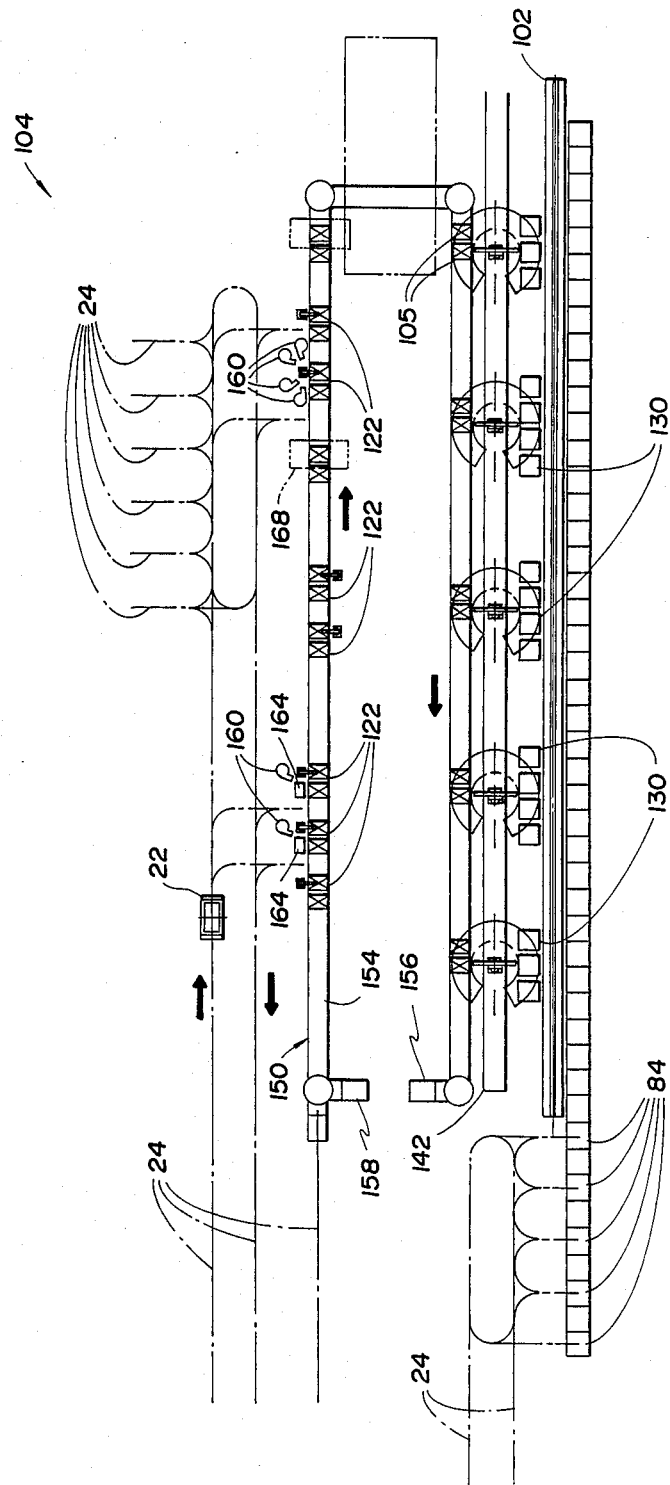
FIG. 4 is a detailed top schematic view of a modified portion of the system of FIG. 1 which assembles different clutch subassemblies.
Figure 5:
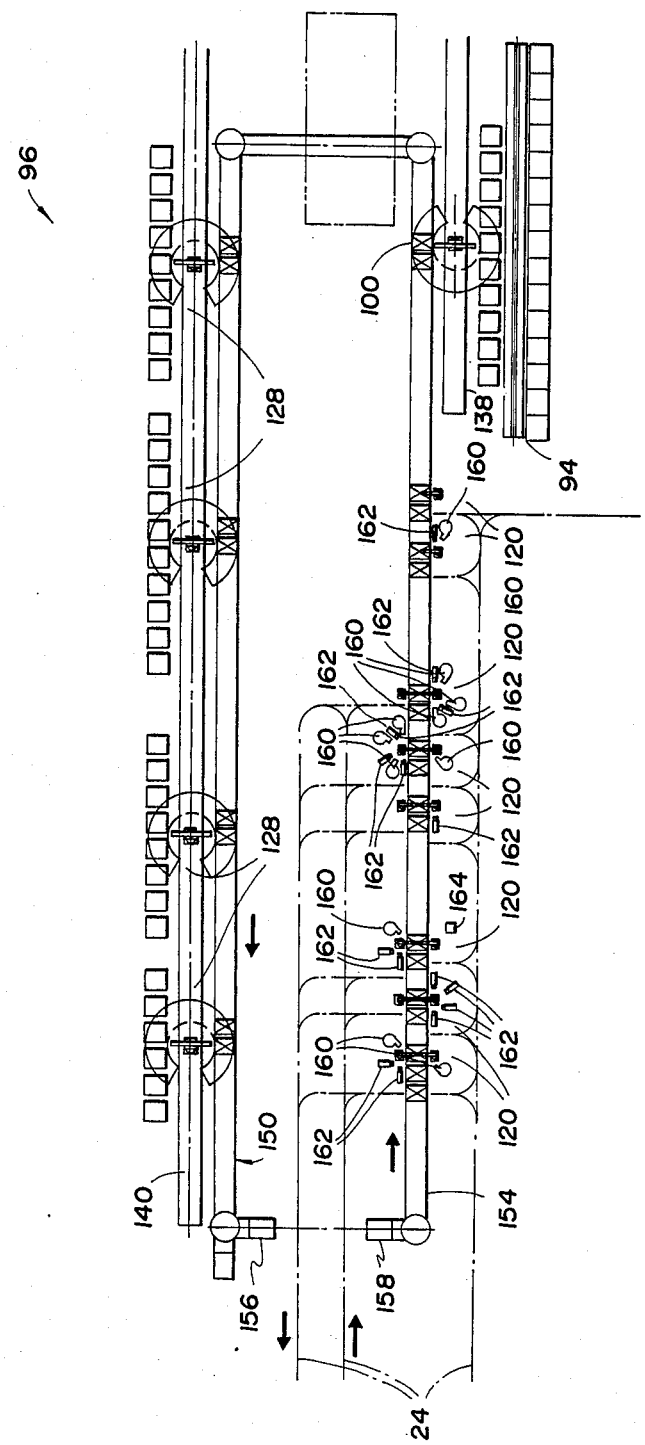
FIG. 5 is a detailed top schematic view of a modified portion of the system of FIG. 1 which assembles input and output shaft subassemblies.
Figure 6:
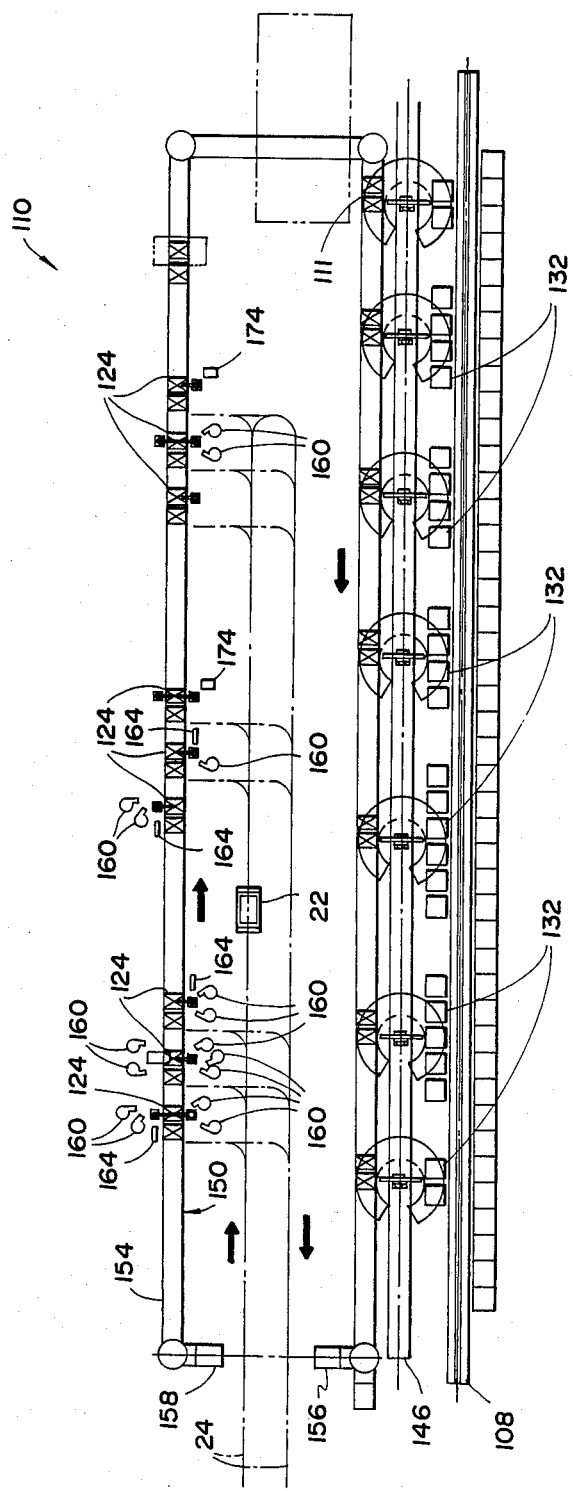
FIG. 6 is a detailed top schematic view of a modified portion of the system of FIG. 1 which assembles control, body subassemblies.

As best shown in FIGS. 4, 5 and 6, throughout the system 20 there are a number of free standing feeders 160 such as vibratory bowls and hoppers to feed items such as bolts, washers, pins, "o" rings, etc. There are a large number of standard products with proven track records on the market to satisfy these requirements. The items from these feeders 160 may be picked out directly by the A-510 assembly robots, blow fed into the robot end-effectors or blow fed into auxiliary hard automation.

Preferably, all the bearings used throughout the robotic assembly cells 96, 104 and 110 are presented through free standing magazine feeders 162. The magazine feeders 162 are specifically designed to accommodate the particular type and size of the bearing. The bearings are delivered from the suppliers either loaded in the magazine feeders 162 or packaged for easy loading into the magazine feeders 162 on the assembly floor. The A-510 assembly robots pick the bearings directly out of the magazine feeders 162.

Presses 164 are located throughout the system 20 to press on gears, bearings, seals, oil rings, pins, etc. The presses 164 used throughout the assembly operation are standard products. The presses 164 are free standing units which are robotically or manually fed.

CLUTCH ASSEMBLY CELL 104

Referring now to FIGS. 1, 2, 4 and 7, in general, the clutch automatic assembly cell 104 assembles parts and subassemblies for automatic transmissions into the following subassemblies: automatic transmission ten (10) plate clutch assembly and automatic transmission twelve (12) plate clutch subassembly. However, it is to be understood that other products could be assembled in the cell 104.

Figure 7:
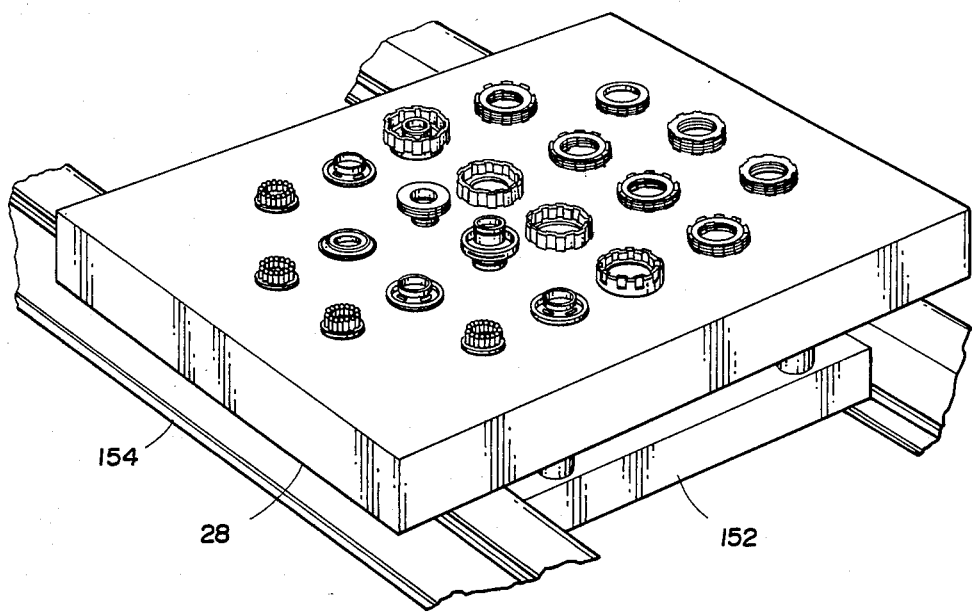
FIG. 7 is a partially broken away perspective view of an assembly pallet on an MGV loaded with kitted parts for the different clutch subassemblies.
Figure 8:
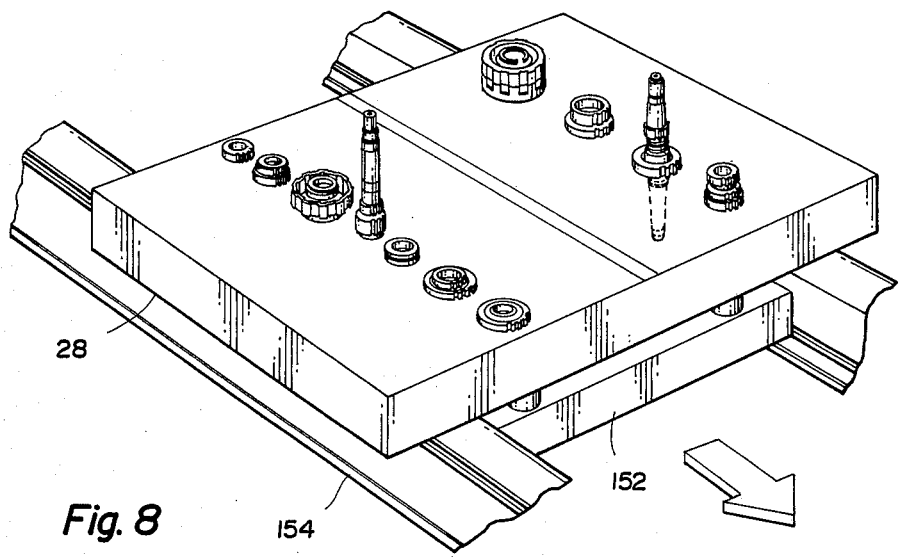
FIG. 8 is a partially broken away perspective view of an assembly pallet on an MGV loaded with kitted parts for the input and output shaft subassemblies.
Figure 9:
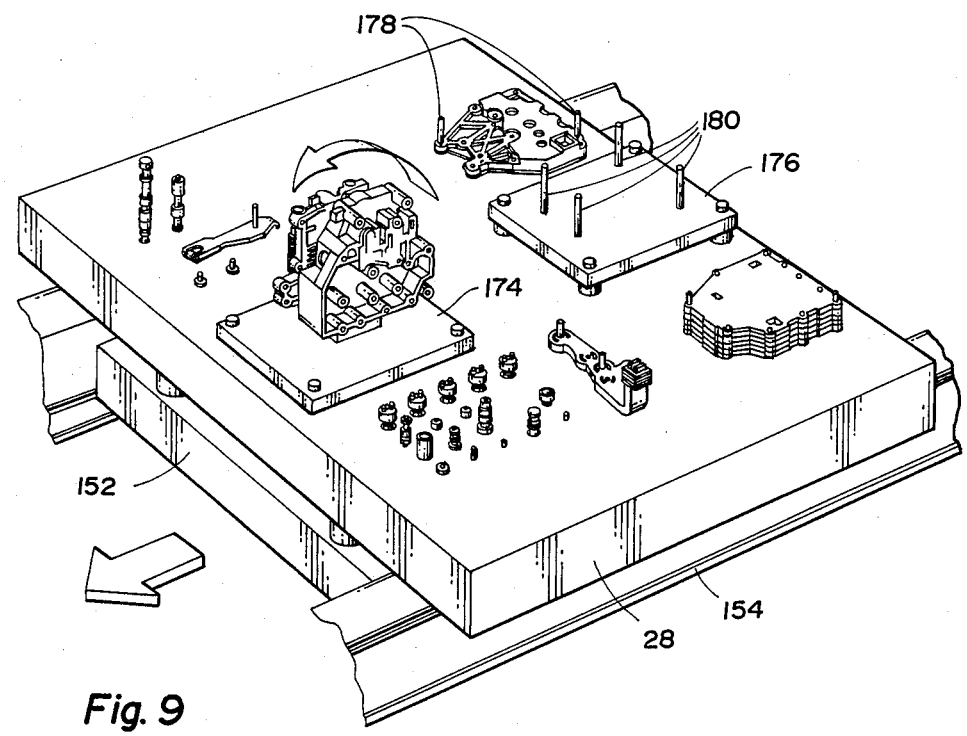
FIG. 9 is a partially broken away perspective view of an assembly pallet on an MGV loaded with kitted parts for the control module subassembly.

The clutch automatic assembly cell 104 accepts parts and assemblies from the receiving area 32 via &he AGV vehicles 22. The cell 104 automatically queues these parts and assemblies and subsequently presents the subassemblies to the robotic kitting stations 130 with its crane system 102 for placement onto assembly pallets 28 as shown in FIG. 7. They are then transported to the robotic assembly stations 122 and then to the robotic unload station 105.

PARTS AND ASSEMBLIES IN THF CELL 104

The parts and assemblies to be robotically assembled in the cell 104 are as follows: automatic transmission; plate assembly (3rd clutch and park); spring and retainer assembly (10 plate); spring and retainer assembly (12 plate); piston assembly (2nd, 4th and rev); hub (2nd and 4th); housing (2nd and rev) (10 plate); housing (2nd and rev) (12 plate); housing (3rd clutch and park); plate assembly (1st, 2nd, 4th and rev) (10 plate); plate assembly (1st, 2nd, 4th and rev) (12 plate); housing assembly (1st drive clutch); piston assembly (1st drive clutch); hub (1st drive clutch); clutch (10 plate); and clutch (12 plate).

The total number of different parts or assemblies robotically kitted for the clutch assemblies is fifteen (15). The parts and assemblies are located on pallets 28 of the same exact type as shown in FIG. 7. Multiple numbers of parts are on each pallet 28 depending on the size and characteristic of the part.

ROBOTIC KITTING IN THE CELL 104

The fifteen (15) different parts and assemblies are located in a rack structure of the system 102 in the cell 104. The racks preferably hold pallets 28 for up to 30 minutes of production parts and assemblies. The pallets 28 are delivered to the rack structure, via an automatic stacker crane of the system 102, from the receiving area input stations 82, where automatic guided vehicles 22 deliver the parts from the parts receiving department or area 32. The stacker crane: transfers full pallets 28 of parts and assemblies from the receiving area input stations 82 to a queuing area in the rack structure; transfers full pallets 28 of parts and assemblies from the queuing area to the robotic picking stations 130; transfers empty pallets 28 of parts and assemblies from the robotic picking stations 130 to a designated queuing area in the rack structure; and transfer empty pallets 28 from the queuing area in the rack structure to the pick up stations 84 for automatic guided vehicle delivery to the parts receiving area.

ROBOTIC PICKING STATIONS

There is fifteen (15) dual robot picking stations 130 where pallets 28 of parts and assemblies are located parallel to the robot servo track 142 with four (4) robots. Each robot services a predetermined number of picking stations 130 to pick individual parts/assemblies and places them onto a clutch assembly fixture or pallet 28 on the MGV vehicle system 100. The fixture is positioned at each of the four (4) robots where a sensor reads the code number of that assembly. (The number was written on the fixture prior to the picking stations.) Each robot places up to four (4) parts/assemblies on the fixture The parts/assemblies for each of the four (4) robots is as follows:

Robot No. 1—plate assembly (3rd clutch and park); plate assembly (1st, 2nd, 4th and rev) (10 plate); plate assembly (1st, 2nd, 4th and rev) (12 plate); and hub (1st drive).

Robot No. 2—hub (2nd and 4th); spring and retainer assembly (10 plate); spring and retainer assembly 12 plate); and piston (2nd, 4th and rev).

Robot No. 3—piston (1st drive); clutch assembly (10 plate); clutch assembly (12 plate); and housing (2nd and rev) (10 plate).

Robot No. 4—housing (2nd and rev) (12 plate); housing (1st drive); and housing (3rd clutch and park).

The clutch assemblies have up to twenty-one (21) parts and assemblies placed onto the fixture 28 as shown in FIG. 7. The pallets 28 of parts at the robot picking stations 130 are monitored by a cell controller 166 as shown in FIG. 17 and replaced when empty with a full pallet from the queuing area in its rack structure. Each of the fifteen (15) picking stations has two (2) locations for pallets 28 to allow the replacement of an empty pallet 28.

The MGV track system 150 then transfers the loaded assembly fixture 28 into and thru the robotic assembly stations 122.

ASSEMBLY IN THE CELL 104

Automatic transmission clutch pack assemblies are built robotically on the pallet 28 which conveys the components to the system 102. The clutch assembly line consists of eight (8) automated assembly stations 122, seven (7) robots and one (1) automation station. As previously mentioned, the preferred robot to perform the assembly operations is the GMF A-510 four (4) axis robot. The assembly line has a linear configuration. The cell 104 utilizes bulk storage in the assembly cell 104 and component kitting on the assembly pallet 28 for part presentation to the robots.

The clutch components to be stocked in bulk at the assembly stations 122 are C-rings and a housing retaining ring in the feeders 160. The housing retaining ring has a selection of size to accommodate the variations in clutch pack thickness to ring groove distance. The remaining parts are kitted directly to the assembly pallet 28 to aid robotic retrieval, to reduce material presentation costs, and to help reduce assembly cycle time. The clutch packs are sub-assembled by the supplier and delivered to the robotic kitting station 130 in a magazine which dispenses the clutch pack in the proper size (i.e. 10 or 12 plate) and maintain outer tang plate orientation.

The assembly pallets 28 in the cell 104 are designed such that the components to be assembled are accurately held in position to help insure a proper assembly. By accurately holding the parts in the assembly location and orientation, the use of machine vision during the assembly cycle is not required which helps reduce the overall cycle time.

Each of the three (3) clutch packs for the automatic transmission are assembled simultaneously. The simultaneous build can be performed since all of the clutch components are common between clutches or are similar in size and characteristics.

The robotic end of arm tooling is sufficiently equipped to perform some functions of in-process assembly validation. The end-effectors will utilize force sensing, load cells, gripper open/close, and part present sensors to determine that components are in the tooling, and that the tooling is working properly. The force sensing and load cells are used to monitor the actual assembly operation and to determine if the assembly is within the acceptable limits (i.e. excessive force was not required to complete the assembly). The robots also are equipped with wrist break detectors and limited compliance in order to protect personnel, the robot, tooling, and transmission components in the event that a fault in material presentation occurs.

The sequence in which the 3rd clutch, 2nd, 4th and reverse clutch, and the 1st drive clutch are to be assembled is outlined as follows:

Robot No. 1—install a first piston to housing (3rd/rev); install a second piston to hub (1st drive); install the first piston to a hub (2nd/4th/rev); and install clutch spring assembly.

Since the pistons for two (2) of the clutches are the same and the third piston is similar, the same end-effector can be used for this operation. Each of the pistons is kitted to the assembly pallet 28 in the orientation required for assembly.

The robot moves to the 3rd/rev piston, which is kitted to the assembly pallet, grips the part and moves to the 3rd/rev clutch housing. At the clutch housing the robot positions the piston and begins the insertion process. The robot utilizes force sensing to monitor the assembly process for indication of piston lip damage. Once the piston has been installed, the robot releases the part and moves to the 1st drive clutch piston.

At the 1st drive clutch piston the robot grips the part in the end-effector, uses part present and gripper open/close sensors to determine part retrieval, and moves to the clutch hub.

The insertion of the piston onto the hub is the same as for the piston to 3rd clutch housing. Once the insertion has been successfully performed the robot releases the part and moves to the 2nd/4th/rev clutch piston.

The retrieval and insertion of the 2nd/4th/rev clutch piston is the same as that for the 3rd/rev and 1st drive clutch pistons.

The clutch spring assembly is identical for each of the three (3) clutches. The same robotic end-effector can be used for each assembly and the installation procedure is similar for each assembly. The robot is required to perform a hand change before installation of the spring pack.

The robot moves to the spring assembly location in the assembly pallet, grips the part and moves to the housing/hub subassembly.

At the housing/hub subassembly the robot places the spring assembly onto the piston. The robot uses force sensing to determine the proper assembly of the spring to the housing/hub.

Once the spring is installed the robot releases the part and moves clear.

Robot No. 2—install release spring ring; and install washer (1st drive clutch).

Robot station No. 2 contains one (1) A-510 robot and an automated double press 164 which installs the two (2) rings for the 3rd, and 2nd clutch and the washer for the 1st drive clutch. The robot is used to load and unload the press 104 with the clutch housing/hub assemblies.

The robot first moves to the 3rd clutch housing, grips the subassembly and moves to the first press. At the automated press 164 the robot positions the housing for ring installation.

Once the housing is in position the robot releases the part and moves clear. When the robot is clear it initiates the press cycle. The press 164 receives the ring through a blow feed nose piece from the part hopper 160.

As the first press 164 is cycling the robot moves to the 1st drive clutch hub, grips the part and moves to the second press. At the press the robot loads the 1st drive hub into the second press for installation of the washer. When the 1st drive hub is in position the robot releases the part, moves clear, and cycles the press 164. The washer is blow fed to the automated press 164.

The robot then moves to the first press 164, unloads the 3rd clutch housing when the operation is complete, and moves to the assembly pallet 28. At the pallet 28, the 3rd clutch housing is placed into its location and the robot moves to the 2nd/4th/rev hub.

The robot grips the hub, moves to the first press, and loads the part. Once the hub is in position the robot moves clear and cycles the press. While the first press 164 is cycling the robot moves to the second press 164 and retrieves the 1st drive hub when its cycle is complete.

The robot then replaces the 1st drive hub into the assembly pallet 28 and moves to the first press 164. As soon as the cycle is complete and the robot is clear to access the press 164 it moves in and grips the 2nd/4th/rev hub and replaces it in the assembly pallet 28.

Robot No. 3—flip 2nd/4th/rev hub and replace to pallet 28; install piston to hub; install spring assembly to hub; and install release spring ring.

The third station is only required for the 2nd/4th/rev hub. The robot moves to the hub assembly, grips the part, moves clear of the pallet 28, and flips the hub axially 180 degrees.

The robot then places the hub back into the pallet 28 and moves to a hand change rack (not shown). At the rack the robot releases the hub end-effector an picks up a piston end-effector.

The robot then installs the piston as described for Robot No. 1. When the piston has been installed the robot moves to the hand change rack, releases the piston end-effector and picks up the spring assembly end-effector.

The installation of the spring assembly is described with respect to Robot No. 1. When the spring assembly has been installed the robot again moves to the hand change rack, releases the spring end-effector and picks up the hub end-effector.

The robot then loads and cycles an automated press 164 as described in Robot No. 2. When the press cycle is complete the robot replaces the hub of the pallet and moves clear.

Robot No. 4—Install clutch apply plate (3rd clutch, 2nd/4th hub); install clutch backing plate (1st drive, 2nd/4th hub); and install clutch plates to housing/hub assembly.

The clutch apply plates are installed into the 3rd/Rev clutch housing and to the 2nd/4th/Rev clutch hub while the clutch backing plate is installed to the 1st drive clutch housing and the 2nd/4th/Rev clutch housing.

The installation procedure is similar for each of the plates. The robot moves to the plate location in the assembly pallet, grips the plate in the end-effector, and moves to the housing/hub.

The robot then inserts the plate into the housing/hub assembly and releases the part. Load cells and a compliance device are utilized to ensure a proper insertion.

The robot then moves to the next plate and performs the assembly operation. This process is repeated four (4) times.

The clutch plates are kitted to the assembly pallet 28 in specially designed pockets to maintain the outer tang plate orientation. The pack is pre-stacked before presentation to the assembly station 122.

The installation of the four (4) clutch packs (1 each for the 1st drive clutch and 3rd clutch and 2 for the 2nd/4th clutch) are common among all clutch assemblies.

The robot moves to the clutch pack location on the assembly pallet 28, grips the assembly, and moves to the housing/hub assembly. The robot utilizes part present and gripper open/close sensors to ensure component pick up.

The robot then inserts the clutch pack into the housing/hub assembly utilizing load cells and a compliant device on the end-effector to ensure proper clutch plate alignment. Once the clutch pack has been installed the robot moves to the next clutch pack to be installed. This process is repeated four (4) times.

Robot No. 5—install clutch backing plate (3rd/rev and 2nd/4th); and install clutch apply plate (1st drive and 2nd/4th).

The clutch backing plate is installed onto the clutch pack in the 3rd/rev clutch housing and the 2nd/4th/rev hub. The clutch apply plates are assembled to the clutch jacks in the 1st drive clutch housing and the 2nd/4th/rev clutch housing.

The insertion procedure is that of Robot No. 4. Once the assembly operation is complete the robot moves clear and allows the pallet 28 to index to the next station. Gauging Station 168—gage clutch pack to ring; and groove distance.

The gauging of the ring groove to clutch pack distance is performed by a dedicated automated mechanical gage. The gage indexes from clutch subassembly to subassembly.

The gage operation is required to select the proper housing retainer ring for each clutch.

Robot No. 6—install ring to hub (1st drive and 2nd/4th/rev); flip 2nd/4th/rev clutch hub and replace to pallet 28; and install retainer ring to hub.

After the proper ring thickness has been determined and downloaded to the robot from the gauging station 168, the robot moves to the proper parts bin located at the assembly station 122 and grips one (1) ring.

When the presence of the ring in the end-effector is confirmed the robot moves to the 1st drive clutch hub. The robot then spreads the ring open to fit over the clutch hub.

Once the ring has been opened the robot inserts the ring onto the hub and releases the part. The robot then moves to the selected ring for the 2nd/4th/rev clutch hub and repeats the assembly operation and moves to the hand change rack and retrieves the hub grippers.

The flip operation is only required for the 2nd/4th/rev hub. The robot moves to the hub assembly, grips the part, moves clear of the pallet 28, and flips the hub axially 180 degrees.

The robot then places the hub back into the pallet 28 and moves to a hand change rack (not shown). At the rack the robot releases the hub end-effector and picks up a retainer ring installation end-effector.

The robot then requests the retainer ring size specification from the gauging station 168 and moves to the retainer ring retrieval area.

The robot then installs the ring onto the hub as previously described. When the ring has been installed the robot moves clear and allows the pallet 28 to index to the next station.

Robot No. 7—install retainer ring to housing (3rd clutch); install hub/ring assembly to housing (1st drive and 2nd/4th); flip 2nd/4th/rev housing assembly and replace to pallet 28; and install housing assembly to 2nd/rev housing.

The first operation of this station is to install the retainer ring to the 3rd/rev clutch. The robot requests the ring size from the gauging station 168, moves to the proper ring retrieval area, and grips a ring. Once the ring has been successfully gripped the end-effector compresses the ring closed for installation to the housing.

The robot then moves to the 3rd/rev housing and installs the ring by orienting the ring to the known position of the housing in the assembly pallet 28. The housing is oriented to the known position at one of the robotic kitting stations 130.

The robot then positions the ring to the housing groove and notch. The robot utilizes load cells and compliance to ensure a proper insertion of the ring. The robot then releases the ring and moves to the hand change rack.

At a hand change rack (not shown) the robot releases the ring end-effector and picks up the hub/ring end-effector to be used on the installation of the 1st drive clutch hub and the 2nd/4th/rev hub to the housings. Once the end-effector has been retrieved the robot moves to the 1st drive clutch hub/ring assembly.

At the hub/ring assembly the robot grips the component, compresses the ring, and orients the assembly to the housing orientation. The robot then moves to the 1st drive clutch housing.

At the housing, the robot installs the hub/ring assembly by inserting the hub into the housing until the ring groove is reached. The robot will use force sensing and compliance to fit the hub into the clutch pack and aligns the ring with the groove. The robot then releases the component and moves to the 2nd/4th/rev hub assembly.

The retrieval and installation of the 2nd/4th/rev hub assembly is the same as for the 1st clutch hub. Once the hub is installed the robot moves to the hand change rack and retrieves the housing gripper.

The flip operation is only required for the 2nd/4th/rev housing. The robot moves to the housing assembly, grips the part, moves clear of the pallet, and flips the hub axially 180 degrees.

The robot then places the housing back into the pallet 28 and moves to the hand change rack. At the rack the robot releases the housing flip end-effector and picks up the housing installation end-effector.

Once the end-effector change has been completed, the robot moves to the housing assembly location in the pallet and grips the housing. The robot then lifts the assembly away from the pallet 28, orients the remaining ring to the known orientation of the housing and moves to the 2nd/rev housing.

Once at the housing, the robot inserts the exposed hub end into the housing and clutch assembly. Force sensing and compliance is used to determine if a faulty assembly occurs. The robot then releases the assembly, seating the ring into the groove and notch, and moves clear.

When the clutch subassembly has completed all robotic operations it is transported to the robotic unload station 105 where it is removed from the fixture.

ROBOTIC UNLOAD IN CELL 104

The robotic unload station consists of one (1) robot mounted on the servo track 142. The fixture or pallet with the completed clutch subassemblies stops at the robot, where the subassemblies are identified and then removed from the fixture and placed into a pallet 28 of the same part number subassembly. The robot services two (2) dual pallet stations 105 which are parallel to the robot servo track 142. Each of the two (2) stations 105 holds multiple numbers of the two different clutch subassembly types.

When a pallet 28 of clutch subassemblies s full, an automatic stacker crane of the system 102 transfers the pallet 28 from the unload station 105 to a queuing area in its rack structure. The stacker crane then picks up an empty pallet 28 from the rack structure and places it at the unload station 105.

The clutch subassembly being removed by the robot creates an empty MGV vehicle 152 which is transported to an identification station (not shown) where a new subassembly sequence is repeated.

If production need demands, the clutch subassembly could be removed from the assembly fixture 28 and be directly placed onto an assembly fixture 28 in the cell 38. This can be accomplished with the unload station robot picking up the part and moving into cell 38 via the robot servo track 142 and placing the part onto the manual assembly fixture 28.

INPUT AND OUTPUT SHAFTS IN CELL 96

Referring now to FIGS. 1, 2, 5 and 8, in general, the input and output shaft automatic assembly cell 96 assembles parts and assemblies into the following subassemblies: automatic transmission input shaft assembly (type A); automatic transmission input shaft assembly (type B); automatic transmission input shaft assembly (type C); manual transmission input shaft assembly (type A); manual transmission input shaft assembly (type B); automatic transmission output shaft assembly (type A); automatic transmission output shaft assembly (type B); automatic transmission output shaft assembly (type C); manual transmission output shaft assembly (type A); and manual transmission output shaft assembly (type B).

The input and output shaft automatic assembly cell 96 accepts parts and assemblies from the receiving area 32. The system 94 automatically queues these parts and assemblies and presents them to the robotic kitting stations 128 for placement into assembly fixtures. They are then transported to the robotic assembly stations 120 and then to the robotic unload station 100.

PARTS AND ASSEMBLIES IN THE CELL 96

The parts and assemblies to be robotically assembled are as follows: automatic transmission; output shaft; shaft (type A); shaft (type B); shaft (type C); clutch assembly (3rd drive) (type A); clutch assembly (3rd drive) (type B); gear and hub assembly (3rd driven); gear (4th dr gr); gear (2nd driven); hub fwd and rev dog clu); sleeve (fwd and rev dog clu); gear (rev driven); input shaft; shaft (type A); shaft (type B); gear and hub assembly (4th driven); clutch assembly (2nd, 4th, and rev driven) (type A); clutch assembly (2nd, 4th, and rev driven) (type B); gear assembly (2nd and rev); manual transmission; output shaft; shaft (type A); shaft (type B); synchro subassembly; gear (1st driven); synchro subassembly; hub (1st/2nd syn); gear (1st/2nd syn slev and rev out); gear (2 nd driven); gear (3rd and 4th driven); input shaft; shaft (type A); shaft (type B); synchro up; synchro down; gear (4th driven); and synchro (3rd and 4th driven).

The total number of different parts or assemblies to be robotically kitted for input& and output shaft automatic assembly is thirty-three (33). The parts and assemblies are located on pallets 28 of the same exact type. Multiple numbers are on each pallet 28) depending on the size and characteristic of the part.

ROBOTIC KITTING CELL

The thirty-three (33) different parts and assemblies are located in a rack structure of the system 102 at the robotic kitting station 128. The racks hold pallets 28 for up to 30 minutes of production parts and assemblies. The pallets 28 are delivered to the rack structure, via an automatic stacker crane of the system 102, from the receiving area 32 at input stations where automatic guided vehicles 22 deliver the part from the receiving area 32.

The rack structure is serviced by a pair of automatic stacker cranes which perform the following transfers: transfer full pallets 28 of parts and assemblies from the input stations to a queuing area in the rack structure; transfer full pallets 28 from the queuing area to the robotic picking stations 128; transfer empty pallets 28 from the robotic picking stations 128 to a designated queuing area in the rack structure; and transfer empty pallets 28 from the queuing area in the rack structure to the pick-up stations 84 for automatic guided vehicle delivery to the parts receiving area 32.

ROBOTIC PICKING STATIONS

There are thirty-three (33) dual robot picking stations 128 where pallets 28 of parts and assemblies are located parallel to the robot servo track 140 with four (4) robots. Each robot services a predetermined number of picking stations 128 to pick individual parts/assemblies and place them onto an input/output shaft assembly fixture or pallet 28 on the MGV vehicle system 150. The fixture 28 is positioned at each of the four (4) robots where a sensor reads the code number of that assembly. (The number was written on the fixture prior to the picking stations.) Each robot places up to four (4) parts/assemblies on the fixture. The parts/assemblies for each of the four (4) robots is as follows:

Robot No. 1: manual - input - gear (4th driven); manual - input synchro up; manual - input synchro down; automatic - input - gear (2nd and rev driven); automatic input gear (4th drive); manual - output - gear (3rd and 4th driven); and manual input synchro (3rd and 4th driven).

Robot No. 2: manual - input - gear (3rd driven); automatic - output - sleeve (fwd and rev dog clu); automatic - output - hub fwd and rev dog clu); manual - output - gear (2 nd driven); manual-output - synchro subassembly; automatic - output - gear (rev driven); automatic - output - gear (2nd driven); and manual output hub (1st and 2nd synchro).

Robot No. 3: manual - output - synchro subassembly; automatic - output - gear (4th driven); automatic - output - gear and hub (3rd driven); manual - output - gear (1st/2nd syn slev and rev); manual - output - gear (1st driven); automatic - input - clutch asm (2nd, 4th and rev) (type A); automatic - input - clutch asm (2nd, 4th and rev) (type B); automatic - output - clutch asm (3rd driven) (type A); automatic - output - clutch asm (3rd driven) (type B); and manual input shaft (type A).

Robot No. 4: manual input shaft (type B); automatic input shaft type A); automatic input shaft (type B); manual output shaft (type A); manual output shaft (type B); automatic output shaft (type A); automatic output shaft (type B); and automatic output shaft (type C).

The automatic transmission input shaft has four (4) and the output shaft has eight (8) parts placed onto the fixture. The manual transmission input shaft has six (6) and the output shaft has eight (8) parts placed onto the fixture. Each pallet of parts at the robot picking stations 128 is monitored by a cell controller 170 and replaced when empty with a full pallet 28 from the queuing area in the rack structure. Each of the thirty-three (33) picking stations has two (2) locations for pallets to allow the replacement of an empty pallet.

The MGV track system 150 transfers the loaded assembly fixture into and thru the robotic assembly stations 120.

SHAFT SUBASSEMBLY STATIONS

The input and output shafts for both the automatic and manual transmissions are assembled robotically. Preferably, the input shaft assembly line utilizes six (6) GMF A-510 horizontal articulated robots and the output shaft line uses eight (8) GMF A-510 robots. The assembly line is virtually divided in the center allowing the input shaft to be assembled on one side while the output shaft is being built simultaneously on the opposite side of the stations 120. This concept provides efficient floor space utilization as well as enabling the two (2) shafts to be assembled at the same time to maintain an adequate supply of finished components. The assembly stations 120 are supplied with transmission components utilizing bulk part kitting and bulk supply.

Assembly of both the manual and automatic transmission input shafts is performed robotically at the input shaft subassembly line. The subassembly line utilizes part kitting and bulk supply for the presentation and storage of the raw materials needed for the shaft build sequence. The criteria used in the selection of the components to be kitted is part integrity and component involvement in assembly variation. The gears and synchro subassembly are items that are based on the necessity for component integrity. The input shafts, clutches, and synchronizer assemblies are kitted on the assembly pallet 28 to permit a simplified control hierarchy by not requiring the robot or cell controller 170 to make the decision of which version of each component is to be assembled to which shaft variation. This is possible since the basic assembly sequence is identical for all variations of the input shaft, the only portion of the process that changes are the components that are to be assembled. Each robot controller and the cell controller 170 have to distinguish between automatic transmission and manual transmission assembly programs.

Each of the assembly robots in the cells 96 are equipped with end of arm tooling to perform the required assembly task. The end-effectors are equipped with part presence sensors, gripper open/close sensors, load cells, and compliant devices where necessary.

The assembly sequences for the automatic and manual input shafts follow hereinbelow.

AUTOMATIC TRANSMISSION SEQUENCE OF OPERATION

Robot No. 1: install thrust bearing to input shaft; install thrust bearing to 4th gear and hub; and install thrust washer to 4th gear and hub.

The robot moves to the bearing retrieval magazine 162, grips the bearing and moves to the input shaft. The robot utilizes gripper open/close sensors and part presence sensors to monitor component retrieval and gripper operation. Once at the input shaft the robot begins lowering the bearing onto the shaft using force sensing to properly position the bearing onto the 3rd drive gear.

Once the thrust bearing is installed on the shaft the robot releases the part, moves clear of the transmission and returns to the thrust bearing magazine 162. The robot then grips another bearing, moves to the 4th gear located in assembly dunnage (not shown), and positions the bearing into the gear. The retrieval process and insertion process is similar to that of the bearing to shaft assembly.

The robot releases the bearing, moves clear of the gear and moves to the thrust washer supply (160). The thrust washer is blow fed to a presentation fixture (simulated bearing presentation) from a bulk storage hopper 160 for robotic retrieval. The robot utilizes the same gripper for the thrust washer as it did for the thrust bearings. This is possible due to the similarity in the part size and configuration. The retrieval and insertion process for the thrust washer is similar to that of the thrust bearings.

Robot No. 2: place clutch assembly to 4th gear and hub.

The clutch assembly is located in the assembly dunnage for robotic retrieval. The clutch is located accurately enough to allow the robot to grip the part without the necessity of machine vision.

The robot moves to the clutch assembly, grips the part, and moves to the gear. The end-effector contains part present sensors, gripper open/close sensors, force sensors, and a ratcheting tool to perform the gear to tang alignment. The gear is precisely located in the assembly dunnage and is restricted from movement by a serration matching the gear teeth in the dunnage.

The robot uses the force sensing and ratcheting end-effector to install the clutch onto the gear assembly. The ratchet is used in conjunction with the rotation capabilities of the robot to align the clutch plates with the gear teeth. Once the clutch is installed the robot moves clear of the assembly.

Robot No. 3: install O-rings to input shaft; and install needle bearing to input shaft.

The input shaft O-rings are dispensed to the robot in a singular fashion by magazine feeding. The robot moves into position under the dispenser 160, strips one (1) O-ring from the dispenser 160, rotates the end-effector, strips a second 0-ring from the dispenser 160 and moves to the input shaft.

At the input shaft the robot inserts one (1) O-ring, moves away, inserts the second O-ring, moves clear of the shaft and moves back to the O-ring dispenser 160.

Once at the dispenser 160 the robot strips the final O-ring from the dispenser 160 and moves to the input shaft. The seal is then installed onto the shaft.

The station 120 utilizes force sensing to determine if O-rings break during the assembly process and also in the transfer process.

Once the seals are installed the robot moves to the hand change rack, releases the O-ring end-effector, and retrieves a needle bearing end-effector. The robot then moves to the needle bearing location in the assembly pallet 28.

As with previous bearings, the input shaft needle bearings are presented to the robot in dispensing magazines 162 to facilitate robotic pick-up and quality assurance. The robot is required to move to the bearing magazine 162, grip the bearing, and move to the input shaft for installation.

At the assembly pallet 28 the robot positions the needle bearing to the input shaft utilizing load cells and end-effector compliance to seat the bearing into position.

Robot No. 4: grip clutch/gear assembly and install onto input shaft.

The robot moves to the clutch/gear assembly, grips the assembly with a self-centering end-effector, and moves to the input shaft.

At the input shaft the robot positions the clutch and begins the insertion process. The assembly process relies heavily on force sensing to maintain spline and O-ring integrity.

The end-of-arm tooling is of a ratcheting design to facilitate clutch to spline engagement.

Once the clutch is installed the robot releases the part and moves clear.

Robot No. 5: obtain thrust washer and install; install bearing race to input shaft; install needle bearing to input shaft; and install thrust bearing to input shaft.

The washer retrieval process is the same as for Robot No. 1 thrust washer retrieval.

After part retrieval the robot moves to the input shaft, positions the washer, and moves clear.

The bearing race is stored at the robotic assembly station in bulk utilizing magazine feeding techniques.

The robot goes to the magazine, strips a race away from the dispenser 160, and moves into position at the input shaft.

The robot then inserts the race onto the shaft, releases the part and moves clear.

Thrust washer retrieval of the needle bearing is performed with the same end-effector and the installation process is similar to that of Robot No. 4.

The retrieval utilizes the race and needle bearing gripper and the retrieval process is similar to that of Robot No. 1.

With the bearing i the end-effector, the robot moves to the shaft, positions the bearing to the thrust washer and moves clear.

Robot No. 6: install 2 nd and reverse gear assembly.

The gear assembly is kitted directly to the assembly pallet 28 to provide gear tooth protection and assembly process ergonomics.

The robot first moves to the gear location in the pallet 28, grips the assembly and positions it over the shaft.

The robot then installs the gear assembly onto the shaft utilizing force sensing and a ratcheting end-effector to properly seat the gear on the needle bearing.

OUTPUT SHAFT SUBASSEMBLY LINE The output shaft subassembly line contains eight (8) GMF A-510 robots and selected hard automation in a linear layout. As with the input shaft assembly line, the output shaft assembly line utilizes both bulk storage and part kitting for material presentation to the robots. Since many of the components of the output shaft are similar to those of the input shaft, the material presentation methods are duplicated which, in turn, reduces the cell cost and integration complexity.

The output shaft components to be bulk supplied at the assembly stations 120 are the O-rings, washers, thrust bearings, needle bearings, spacers, and races. The bearings are supplied to the assembly cell in pre-packed dispenser magazines 162 while the O-rings, washers, and races are loaded into dispensing parts bins 160. The output shaft, clutches, and gears are kitted directly to the assembly pallet 28. The gears and clutches are nested in the assembly pallet 28 to avoid damage to the parts and to provide an inexpensive means for part location without the need for precision fixtures or machine vision. The output shaft is located in the assembly pallet in the assembly orientation and located accurately enough to allow component assembly.

The robot end-effectors are equipped with part presence sensors, gripper open/close sensors, and force sensing. The open/close sensor is used to ensue that the gripper is working properly and the part present sensor is used to indicate if the part was actually picked up and if the part was dropped in process before completion of the process. Force sensing is utilized to check that the assembly operation was performed within the specified tolerance. If the assembly operation is producing more than acceptable force, the process is halted to prevent damage to the transmission components and/or the end-effector and robot. In the event that excessive force is produced, the robot discards the part to a container for inspection and flags the subassembly as needing inspection for repair/rebuild. The robot then moves onto the next assembly using a new part and a new subassembly.

A ratcheting type end-effector is used in applications requiring the alignment of gear teeth and shaft splines. The ratchet end-effector allows the components to be assembled without precise location and orientation or vision assistance.

The assembly sequence for the automatic transmission output shaft follow hereinbelow.

AUTOMATIC TRANSMISSION SEQUENCE OF OPERATION

Robot No. 1: retrieve and install O-rings; and install 3rd clutch and housing assembly.

The robot receives an input signal indicating that a pallet 28 is in position. The robot then moves to the O-ring dispenser 160, picks up one (1) O-ring in the gripper, moves clear and rotates the end-effector to grip a second O-ring, moves back to the dispenser 160 and grips the second O-ring. The O-ring gripper is equipped with a gripper open-close and part presence sensors to indicate if an O-ring was successfully picked up and if the part was to break in the transfer to the assembly or in the assembly process. In the event that an O-ring breaks, the robot has the capability of returning to the dispenser 160 to pick up another part.

Once the O-rings have been successfully gripped in the end-effector the robot moves to the assembly pallet 28 and positions the end-effector over the output shaft. The robot then begins the insertion process by lowering the O-ring over the shaft. Once the robot reaches the seating position, the end-effector releases the O-ring and moves up the shaft until it is clear to rotate.

When the robot is clear of the output shaft, the end-effector rotates into position to allow installation of the second O-ring. The robot then begins to move the O-ring over the shaft to its sealing position. The end-effector then releases the part and moves clear.

Once the O-rings have been installed the robot moves to a hand change rack (not shown), releases the O-ring end-effector, indexes to the next slot, and retrieves a clutch housing end-effector.

The clutch assembly is kitted directly to the assembly pallet 28 in a recessed pocket for loose tolerance location (i.e. $+/-0.125''$) of the part. The robot moves to the clutch assembly and grips the part in the end-effector. Before the robot moves away the end-effector must return a gripper closed signal and a part present signal. Once the proper signals have been received the robot moves into position over the output shaft.

At the output shaft the robot begins the assembly process by lowering the clutch over shaft. The robot reduces the speed of the insertion near the seating position to allow a more reliable final assembly. The robot utilizes a ratcheting end-effector to mate the internal tang clutch plates with the output shaft. The end-effector has force sensing to monitor the process for prevention of component and tooling damage.

Once the clutch is in position the end-effector releases the part and the robot moves clear.

Robot No. 2: install spline washer; install thrust bearing; and install needle bearing.

The spline washer is stocked at the assembly station 120 in a parts hopper 160 and presented to the robot by a positioning track integral to the hopper. The washers are metered to the robot one at a time for retrieval. The washer dispenser is equipped with a part present sensor to give indication to the robot that the washer is present before the robot moves to the hopper.

The robot receives the part present signal from the washer retrieval area and moves to the part pick up position. The robot then picks up the washer and moves to the output shaft. The end-effector utilizes a part presence sensor to give indication of a successful pick up and to indicate if the part is lost in process.

Once the robot is in position, the assembly process begins with the robot lowering the washer onto the shaft. When the washer is near the spline the robot slows the insertion speed to enable the ratcheting end-effector to perform its function. The ratcheting end-effector allows the splines to be aligned without the use of vision as well as providing protection to the components and tool. When the washer has been installed the robot releases the part and moves clear.

The thrust bearing is supplied to the robot by a pre-packed magazine dispenser 162. The bearing is dispensed to the robot in a singular fashion.

The robot moves to the bearing dispenser 162, strips one (1) bearing away, and moves to the output shaft. The bearing gripper utilizes part presence sensing for pick up and in process control.

As the robot approaches the output shaft, the end-effector positions the bearing into the installation position. The robot then begins the assembly process of sliding the bearing over the shaft to seat it onto the splined washer. The robot uses force sensing to determine the correct seating of the bearing. Once the bearing is properly seated, the robot releases the part and moves clear.

As with the thrust bearing, the needle bearing also is stocked in bulk at the assembly station in a pre-packed dispenser magazine 162. The magazine 162 is packed by the bearing supplier to verify bearing quality.

The robot moves to the bearing dispenser 162, grips one (1) bearing, and moves to the output shaft. The robot receives part present and gripper open/close feedback from the end-effector.

Once the bearing has been gripped the robot moves to the output shaft and orients the part into the assembly position. The robot starts the installation procedure by lowering the bearing over the shaft while rotating the hand axis. The gripper is designed to allow the bearing to be spread apart for the installation. Force sensing is utilized to monitor the installation process for determination of a proper assembly. Once the process is successfully completed the robot releases the part and moves clear.

Robot No. 3—install 3rd driven gear.

The 3rd driven gear is kitted directly to the assembly pallet 28 to provide part positioning and to maintain part integrity. The gear is located in a serrated pocket in the pallet.

The robot moves to the gear, grips the part in the end-effector and moves to the output shaft. The gripper centers the part in the jaws and contains part present and gripper open/close sensors.

The robot then moves clear of the pallet 28 and positions the gear over the output shaft. At the shaft the robot begins the installation by lowering the gear onto the shaft. When the gear approaches the location of the needle bearing, the robot rotates the hand axis to help ensure a proper assembly and to restrict damage to the bearing. When the gear is properly seated the robot releases the part and moves clear.

Robot No. 4—install thrust bearing

The installation of the thrust bearing is performed as in the description under Robot No. 2. The bearing is stocked in dispensing magazines 162 at the station 120 as in the previous description.

Robot No. 5—install 4th drive gear to shaft; and install spacer onto output shaft.

The 4th drive gear is presented to the robot on the assembly pallet 28 in a serrated pocket to provide part protection and component location.

The robot first moves to the assembly pallet 28, grips the gear in the end-effector and moves to the output shaft.

At the output shaft the robot installs the gear utilizing force sensing and a ratcheting end-effector to properly seat the gear.

The robot then releases the gear and moves to the spacer retrieval area.

The spacer is stored in bulk at the assembly station and presented to the robot from a queued track. The gripper that is used for the gear is also used for the spacer.

The robot grips the spacer, moves clear of the track, and moves to the output shaft. Once the robot is at the shaft the robot installs the spacer using a rotation of the hand axis to ensure that no binding occurs. When the spacer is installed the robot moves clear of the pallet 28.

Robot No. 6—install thrust washer to output shaft; install bearing race to output shaft; install needle bearing to output shaft; install 2nd driven gear onto output shaft; and install fwd and rev dog clutch hub to shaft.

The thrust washer is located at the robotic assembly station 120, stocked in bulk, and presented to the robot in a pick up fixture which is supplied from a bin hopper 160.

The robot first moves to the washer pick up point, grips a thrust washer, and moves to the output shaft. The end-effector utilizes part present sensors and gripper open/close sensors to confirm part pick up.

At the output shaft the robot inserts the thrust washer onto the shaft and positions it to the 4th drive gear.

When the washer has been seated the robot releases the part, moves clear of the shaft, and moves to a bearing race retrieval area.

The bearing race is stored at the assembly station in bulk utilizing magazine feeding techniques.

The robot moves to a magazine 160, strips a race away from the dispenser, and moves into position at the output shaft.

The robot inserts the race onto the shaft, releases the part, and moves clear.

As with other needle bearings in the system this bearing is supplied at the station in a magazine feeder 160 and the robot strips one (1) bearing away from the dispenser at a time.

The installation procedure follows the procedure indicated by Robot No. 4.

The 2nd driven gear is positioned directly to the assembly pallet 28 by the kitting robots in a splined pocket to maintain positional location.

Once the bearings are installed the robot moves to the hand change rack, releases the bearing gripper, indexes to the next slot, and retrieves the gear/hub gripper.

The robot moves to the gear location in the assembly pallet 28, grips the part on the smaller of the two (2) outside diameters, and moves to the output shaft.

Once the part is at the output shaft the robot begins the assembly process by inserting the gear over the needle bearing. When the robot begins the process it rotates the hand axis to aid in the gear-to-shaft and the gear-to-bearing mating.

Once the gear is installed the robot releases the part, moves clear of the gear, and moves to the hub pick-up point.

The hub is also located in the assembly pallet 28 by the kitting robots. The robot utilizes the same end-effector for both the gear and the hub.

At the hub location in the pallet 28 the robot grips the part, moves to the output shaft, and positions the part for installation.

The robot then installs the hub using force sensing and a ratcheting end-effector to engage the hub spline with the shaft spline. The robot then releases the part and moves clear.

Robot No. 7—install bearing race to output shaft; and install needle bearing to output shaft.

This installation procedures is the same as that for Robot No. 6.

Robot No. 8—install fwd and rev dog clutch sleeve; and install reverse driven gear.

The sleeve is supplied to the assembly robot directly on the assembly pallet 28.

The robot moves to the sleeve location, grips the part in a self-centering end-effector, and moves to the output shaft.

When the input/output shaft subassembly has completed all robotic operations, it is transported to the robotic unload station 100 where it is removed from the fixture.

ROBOTIC UNLOAD STATION 100

The robotic unload station 100 consists of one (1) robot mounted on the servo track 138. The fixture with the completed clutch subassembly stops at the robot where the subassembly is identified and then removed from the fixture 28 and placed into a pallet 28 of the same part number subassembly. The robot services ten (10) dual pallet stations which are parallel to the robot servo track 138. Each of the ten (10) stations holds multiple numbers of the ten (10) different subassembly types.

When a pallet 28 of subassemblies is full, an automatic stacker crane of the system 94 transfers the pallet 28 from the unload station 100 to a queuing area in its rack structure. The stacker crane then picks up an empty pallet 28 from the rack structure and places it at the unload station 100.

The input/output shaft subassembly being removed by the robot creates an empty MGV vehicle 152 which is transported to the identification station (not shown) where a new subassembly sequence is repeated.

Figure 12:
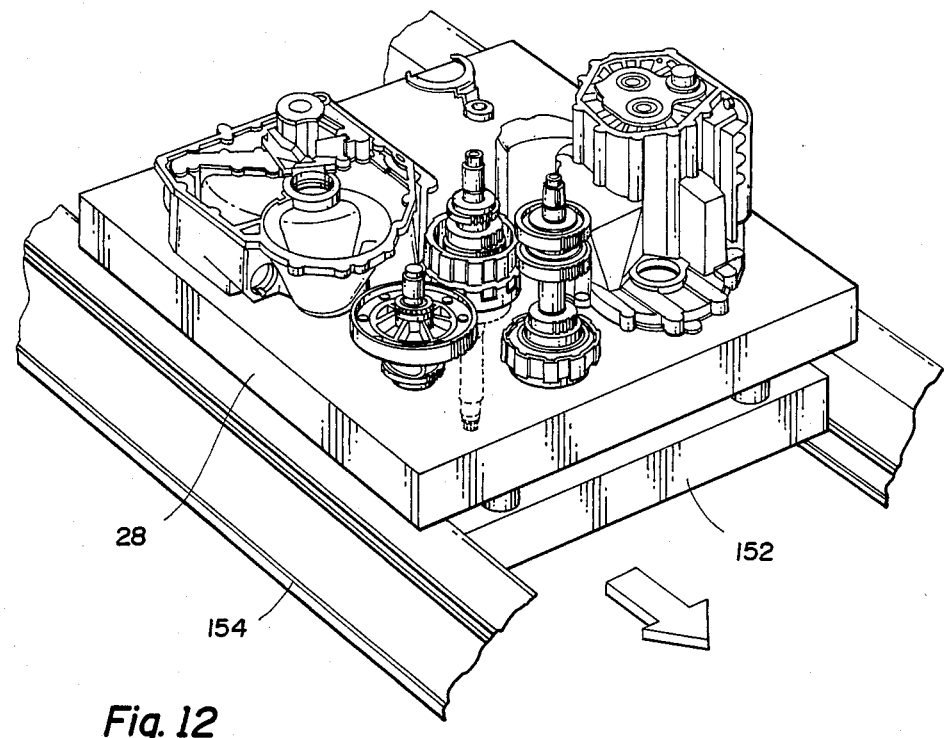
FIG. 12 is a partially broken away perspective view of an assembly pallet on an MGV loaded with the parts and subassemblies kitted by the portion of the system of FIG. 11 and to be assembled at a second manual build area.
Figure 13:
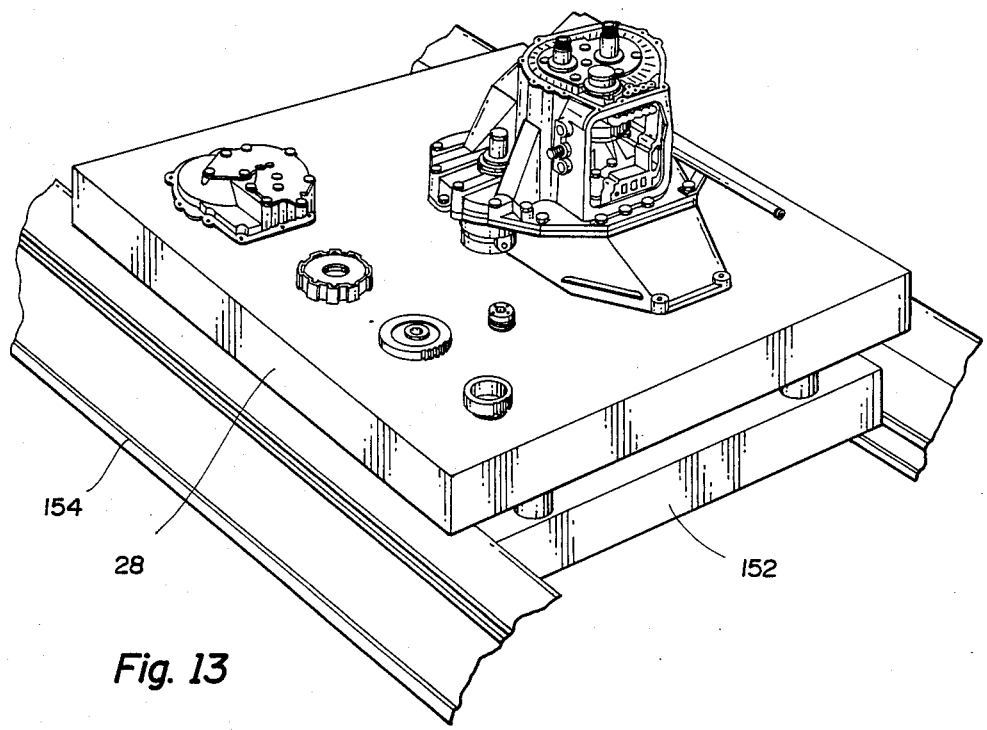
FIG. 13 is a partially broken away perspective view of an assembly pallet on an MGV loaded with parts and subassemblies to be assembled at a third manual build area.

If production need demands, the input/output shaft subassembly can be removed from the assembly fixture 28 and be directly placed onto the assembly fixture 28 in the cell 36. This can be accomplished with the unload station robot picking up the part and moving into cell 26 via the robot servo track 138 and placing the part onto a manual assembly fixture or pallet as shown in FIG. 12.

CONTROL BODY SUBASSEMBLY CELL 110

Referring now to FIGS. 1, 2, 6 and 9, in general, the control body automatic subassembly cell 110 assembles parts and assemblies into one (1) subassembly for automatic transmissions. The control body automatic assembly includes the acceptance of parts and assemblies from the receiving area 32. It automatically queues these parts and assemblies and presents them to the robotic kitting cell for placement into the assembly fixtures 28. They are then transported to the robotic assembly stations 124 and then to the robotic unload station 111.

PARTS AND ASSEMBLIES

The parts and assemblies to be robotically assembled are as follows:

Lower valve body; body; valves; spring; upper valve body; body; valves; plungers; sleeves; actuators; control valve assembly; lower valve body (from above); upper valve body (from above); gaskets; plates; connector; and cover.

The total number of different parts and assemblies to be robotically kitted for the control body subassembly is twenty-three (23). The parts and assemblies are located on pallets 28 of the same exact type. Multiple numbers are on each pallet 28 depending on the size and characteristics of the part.

ROBOTIC KITTING CELL

The twenty-three (23) different parts and assemblies are located in a rack structure of the system 108 at the robotic kitting stations 132. The racks hold pallets 28 for up to 30 minutes of production parts and assemblies. The pallets 28 are delivered to the rack structure, via an automatic stacker crane of the system 108, from the receiving area input stations where automatic guided vehicles 22 deliver the parts from the receiving area 32.

The robotic kitting cell rack structure is serviced by a pair of automatic stacker cranes of the system 108 which perform the following transfers: transfer full pallets 28 of parts and assemblies from the receiving area input stations to a queuing area in the rack structure; transfer full pallets 28 of parts and assemblies from the queuing area in the rack structure to the robotic picking stations 132; transfer empty pallets 28 from the robotic picking stations 132 to a designated queuing area in the rack structure; and transfer empty pallets 28 from the queuing area in the rack structure to the pick up stations for automatic guided vehicle delivery to the parts receiving area 32.

ROBOTIC PICKING STATIONS

There are twenty-seven (27) dual robot picking stations 132 where pallets 28 of parts and assemblies are located parallel to a robot servo track 146 with seven (7) robots. Each robot services a predetermined number of picking stations 132 to pick individual parts/assemblies and place them onto a control body assembly fixture 28 on the MGV vehicle system 150. The fixture 28 is positioned at each of the seven (7) robots where a sensor reads the code number of that assembly. (The number was written on the fixture prior to the picking stations.) Each robot places up to four (4) parts/assemblies on the fixture 28. The parts and assemblies for each of the seven (7) robots is as follows:

Robot No. 1: lower valve body—connector; and lower valve body—spring.

Robot No. 2: upper valve body—actuator upper valve body—actuator; upper valve body—plug; upper valve body—valve; and upper valve body—plunger.

Robot No. 3: upper valve body—valve; upper valve body—sleeve; upper valve body—valve; upper valve body—sleeve; upper valve body—plunger; and upper valve body—valve.

Robot No. 4: upper valve body—valve; upper valve body—plunger; lower valve body—valve; and lower valve body—valve.

Robot No. 5: control valve—cover; control valve—gasket; control valve—plate; and control valve—gasket.

Robot No. 6: control valve—gasket; control valve—plate; control valve—gasket; and control valve—plate.

Robot No. 7: upper valve—body; and lower valve—body.

The control body valve assemblies have twenty-nine (29) parts placed onto the fixture 28. The pallet 28 of parts at the robot picking stations 132 is monitored by a cell controller 172 and replaced when empty with a full pallet 28 from the queuing area in the rack structure. Each of the twenty-seven (27) picking stations has two (2) locations for pallets to allow the replacement of an empty pallet 28.

The MGV track system 150 transfers the loaded assembly fixture 28 into and through the robotic assembly station 124.

CONTROL BODY ASSEMBLY IN CELL 110

The automatic transmission control body is automatically assembled by robots and dedicated machines at the automated subassembly cell 110. The assembly cell consists of nine (9) assembly stations 1 24 of which two (2) are combined robotic and dedicated automation stations. The first of the hard automation stations is responsible for the installation of the plug and pin into the lower valve body, and the second hard automation station rotates the upper and lower valve bodies 180 degrees.

In an effort to reduce the size of the part supply bank, the upper and lower valve bodies are subassembled simultaneously. This is achieved by having robots located on either side of the assembly line. Once the upper and lower valve bodies have been subassembled, the components are mated and fastened together robotically.

Due to the high degree of valve body component integrity required for successful operation of the control body, the majority of the individual components are kitted directly to the assembly pallet 28. Along with the improved component integrity gains, kitting to the assembly pallet 28 also allows fewer robots to be used in the assembly line and meet the required cycle time.

The parts to be bulk supplied at the assembly station are the springs, pins, ball bearings, plugs, and bolts. Of these parts only the bolts are fed to the assembly line by elevator hoppers 174. The remaining parts are oriented and supplied to the assembly stations 124 by vibratory bowl feeders 160. Vibratory bowls 160 are used because of manipulation and orientation requirements of the parts to be presented. The vibratory bowls 160 are equipped with sound enclosures.

The sequence in which the control body will be assembled is outlined below:

Robot Station No. 1: install valve to lower body; install spring to lower body; install valve to lower body; install spring to lower body; install spring to valve; install clip to valve; install plunger to valve; install pins to lower body; and install plug to lower body.

The first robot in the station 124 installs the two (2) valves and springs into the lower valve body. The valves are kitted directly to the assembly pallet 28 and the springs are blow fed to the robotic end-effector from the vibratory bowl 160. The robot uses the same end-effector for the insertion of both valves and springs.

The robot moves to the first valve in the assembly pallet 28 and picks up the part using a vacuum end-effector. The robot then moves to the lower valve body and inserts the valve. During the insertion process the robot rotates its hand axis about the tool center point to aid in the insertion. This operation is performed to avoid valve or end-effector binding on the valve body.

Once the valve is in position the robot releases the part and moves clear. When it is clear of the housing the robot indexes to re-align the end-effector over the hole for insertion of the spring.

The spring is blow fed to the end-effector and inserted into the valve body by a rod that indexes through the end-effector and pushes the spring into the valve body.

Once the spring has been installed the robot moves back to the assembly pallet 28 for retrieval of the next valve.

At the assembly pallet 28 the robot picks up the valve with the vacuum end-effector and moves to the valve body. At the valve body the robot inserts the part using the hand rotation to avoid binding.

The robot releases the part, moves clear of the valve body and re-positions for spring installation. The spring is blow fed to the end-effector and inserted by an indexing rod through the end-effector.

Once the spring is installed the robot moves clear of the valve body.

As the first robot is installing the valves to the lower valve body the second robot in the same station 124 is assembling the first valve subassembly for the upper valve body. The robot is equipped with a double gripper end-effector to handle different size parts without the need for a hand change.

The robot first moves to the spring retrieval area, grips the spring, and moves to the valve. At the valve, the robot inserts the spring, releases the part, and moves to a perch position to grip the valve. The valve is then gripped and moved/loaded to an automated press 164 where the retaining clip is installed.

As the clip press is in process, the robot moves to the pallet 28 and picks up the plunger and moves back to the press 164.

After the press 164 has finished its cycle, it indicates to the controller 72 that the robot is clear to access. The robot then moves into the press 164, grips the valve, and replaces it to the assembly pallet 28.

When the valve is in position on the pallet 28 the robot indexes to the plunger insertion perch position, allows for a settling period, and inserts the plunger into the valve. The robot releases the part and moves clear.

The installation of the pins and plug to the lower valve body is performed by dedicated automation (not shown).

The pins and the plugs are stored at the assembly station 124 in vibratory bowl feeders 160 and are blow fed to the installation automation.

With the pins and plug present in the jaws of the tool, the press indexes into position at the lower valve body, actuated cylinders compress the springs and inserts the plug. While the springs are compressed the pins are pressed into the valve body.

Robot Station No. 2: install two (2) valves to upper body; install spring; install spring; install washer; install valve; and install valve.

This station 124 is only required for the upper valve body. The robot uses a vacuum gripper to retrieve and install the two (2) valves. The gripper is equipped with vacuum on/off and part present sensors.

The robot moves to the first of the valves in the assembly pallet 28, moves over the valve while rotating the hand axis, and applies the vacuum. When the input signals received are positive, the robot moves to the upper valve body, inserts the valve into the body, again rotating the hand axis to avoid binding. When the valve is close to the seating position the robot reverses the vacuum, blowing the valve out of the end-effector. This procedure offers a means for a positive part release from the robotic tool.

When the first valve has been inserted the robot moves back to the assembly pallet 28 for retrieval of the second valve. The assembly procedure is the same as the previous valve.

The installation of the springs, valves and the washer are only required for the upper valve body. The robot is required to insert the valve into the upper body after the springs and washer have been positioned by dedicated automation (not shown). The springs and washer are stored at the assembly station 124 in bulk and fed to the insertion automation using blow feed technology. The robot is equipped with a vacuum gripper for the installation of the control body valves. One (1) gripper is used for both valves. The valves are kitted directly to the assembly pallet 28.

The spring is the first part blow fed to the insertion automation to enhance the mating of the two (2) springs. The second spring is then blown to the tool to a location inside of the first spring. A rotating plunger then indexes onto the second spring to ensure that it is properly seated inside of the larger spring. The plunger retracts and allows the washer to be blown on top of the spring assembly.

As the components are being blown and sub-assembled at the inserting tool the robot moves to the assembly pallet 28, retrieves the first valve, and moves to the valve body. At the valve body the robot begins the insertion process by inserting the end-effector into the body while rotating the hand axis to avoid binding. When the valve is in the seating position the robot reverses the vacuum to allow positive disengagement of the valve from the end-effector.

The insertion tool then indexes into the side of the valve body, locates the springs and washer to the body and holds them in position.

As the insertion tool is positioning the spring assembly, the robot moves to the pallet 28, grips the valve and moves to the valve body. At the valve body, the robot inserts the part into the body, rotating the hand axis as it enters the valve body. The valve is inserted into a position that engages the spring and washer assembly. Once the valve is in position the robot reverses the vacuum, and disengages the part. The robot then indicates to the insertion tool that it is clear to release the spring assembly and moves clear.

Robot Station No. 3: sub-assemble plunger to sleeve; install plug; install two (2) pins; and insert plunger/sleeve assembly to upper valve body.

This station 124 is only required for the upper valve body. It contains an automated press 164 and a single robot. The press 164 is used to compress the valve and spring assembly installed in the previous station, inserts a plug to the top of the assembly and presses two (2) pins into the body. The robot is used to sub-assemble the plunger to the sleeve and install the subassembly.

The plug and the pins are stored at the assembly station 124 in bulk in vibratory bowl feeders 160 and are blown to the press tooling. The press 164 indexes to the valve body, compresses the valve and spring assembly and installs the plug onto the valve. The press 164 then presses the two (2) pins into the valve body and moves clear.

As the press 164 is cycling, the robot moves to the assembly pallet 28, engages the sleeve in the vacuum gripper, and moves to the plunger location. At the plunger, the robot slides the sleeve over the plunger while rotating the hand axis to ensure a positive engagement. When the input signals are received, the robot moves to a perch position.

The robot waits at the perch position for a clear-to-access signal from the press 164. Once the signal is received the robot moves to the valve body, and inserts the assembly, again rotating the hand axis. When the assembly is seated the robot reverses the vacuum to blow the parts out of the end-effector.

The robot then moves clear and allows the pallet 28 to index to the next station 124. At the same time, the press 164 initiates the blow signal to get more parts.

Robot Station No. 4: rotate upper and lower valve body; install valve; install spring; and install pin.

The rotation of the upper and lower valve bodies is performed by a dedicated rotary actuator. The operation of this tool is controlled by the cell controller 172.

The pallet 28 indexes into the station 124, and sends a signal to the rotary actuator. The actuator then indexes to engage the lower valve body and rotate the body. When the lower valve body is rotated, the upper body also rotates due to the configuration of the trunion fixture that the parts are mounted to.

Once the parts are rotated 180 degrees, and the fixture is seated in the detent, the actuator indexes clear and initiates the robot to perform its function.

This operation is required for lower valve body only. The operation utilizes one (1) robot equipped with a dual purpose end-effector, and an automated press 164 for the installation of the pin.

The robot first moves to the valve location in the assembly pallet 28, grips the part in the vacuum gripper, and moves to the valve body. At the valve body, the robot inserts the end-effector into the body and seats the valve. When the valve has been seated, the robot reverses the vacuum and blows the valve out of the end-effector. The robot then moves to a perch position over the valve body.

The spring is stored at the assembly station 124 in a vibratory bowl 160 and blow fed to the robotic end-effector. The perch position is located over the valve body with the spring insertion portion of the end-effector in position.

The robot moves down into the valve body to the seating position for the spring. The robot then actuates a pneumatic plunger to index through the tool and seat the spring into the body.

When the spring has been inserted the robot moves clear and indicates that the pin press 164 is clear to cycle.

As with the previous pin press operations the pin is blow fed to the press 164 from a resident bowl feeder 160. The press 164 indexes into the assembly station 124, compresses the spring, and presses the pin into the valve body. When the press operation has been completed the press 160 moves clear and indexes the pallet 28 to the next station 124.

Robot Station No. 5—subassembly valve; install subassembly to valve body; install valve assembly; subassemble plug to valve; and install plug subassembly.

This assembly station processes the upper valve body only. The valves and sleeve are kitted directly to the assembly pallet 28 at the kitting stations 132. The valves and sleeve are subassembled on the assembly pallet 28 prior to installation into the valve body.

The robot is equipped with a single end-effector to sub-assemble all the parts and to insert the subassembly to the valve body. The robot moves to the sleeve location in the assembly pallet, grips the part in a vacuum gripper and moves to the valve on the assembly pallet 28.

At the valve location the robot inserts the tip of the sleeve into the valve by rotating the hand axis as the robot travels in the "−Z" direction. Once the sleeve has been installed the robot releases the part and moves to the next valve location.

At the next valve, the robot grips the part with a vacuum gripper and moves to the sleeve/valve subassembly. The robot inserts the valve into the assembly and moves clear.

When the valve subassembly has been built, the robot grips the component in a vacuum gripper, moves to the valve body and inserts the parts. The robot rotates its hand axis during the insertion process to avoid binding on the valve body walls. When the valve assembly has been seated, the robot reverses the vacuum and disengages the parts by blowing air through the end-effector.

The assembly station 124 contains one (1) robot with one (1) multi-functional end-effector and an automated press 164 for installation of the pin to the valve body.

The operation of this station 124 is to install the valve assembly into the valve body. The robot moves to the component location in the assembly pallet 28, grips the part with a vacuum gripper, and moves to a perch position over the body when the input signals are positive.

At the valve body, the robot begins inserting the components. When a point just above the valve body hole is reached, the robot rotates its hand axis prior to inserting the end-effector into the hole. When the end-effector reaches the seating position, the robot reverses the vacuum to disengage the parts. The robot then moves clear of the valve body and moves to a perch position over the plug in the pallet 28.

The robot again uses vacuum to grip the plug, moves to the location of a valve in the pallet 28, and positions the plug onto the valve. The robot then releases the part and repositions itself at the assembly.

The robot then moves in to grip the assembly, applies vacuum to the end-effector and grips the parts. Once the parts have been gripped, the robot moves to the valve body, and inserts the component. When the parts have been seated, the robot releases the assembly and moves clear.

When the robot has moved clear, it sends a signal to the press 164 indicating that it is free to cycle. The press 164 then indexes into the station 124, compresses the plug into position and drives one (1) pin into the valve body.

Robot Station No. 6—load lower valve body to horizontal fixture; install spring assembly; and drive bolt.

This operation is only required for the re-positioning of the lower valve body. The station contains one (1) M-100 robot. The robot is equipped with a single part gripper designed specifically for the lower valve body.

The robot receives a pallet-in-position signal, moves to the pallet 28, and grips the valve body. The robot utilizes part-present and gripper-open/close sensors to provide feedback for part retrieval.

The robot removes the valve body from a vertical build fixture 174, moves to a horizontal build fixture 176 and positions the body to the fixture 176. The robot then releases the part and moves clear.

This operation is required for the lower valve body only. The robot is equipped with a combination gripper/bolt running end effector. The spring is kitted directly to the assembly pallet 28 as a subassembly (i.e. roller and pin will be installed) for robotic retrieval. The bolts are bulk stored at the assembly station 124 in an elevator feeder 124 and blow fed to the robotic end-effector.

The robot initiates the feeding of a belt to the end-effector, receives the bolt and moves to a perch position over the spring. The robot then moves down to the part retrieval position and grips the part.

The bolt is inserted a short distance into the bolt hole prior to part pickup to ensure proper location of the part in the gripper with respect to the bolt runner position.

When part retrieval has been confirmed, the robot moves to the lower valve body and positions the spring. Once the spring is in position the robot initiates the bolt runner to cycle. The bolt runner then indicates the cycle is complete by sending an accept/reject signal to the robot. The torque and angle of the joint is controlled to provide quality assurance.

When the cycle is complete the robot moves clear and release the pallet 28.

Robot Station No. 7—install gasket; install plate; install gasket; install spacer plate; install gasket; install four (4) solenoids; and install one (1) solenoid.

The gaskets to be installed at this station are kitted directly to the assembly pallet 28. At the time of kitting, the gaskets and plates are stacked in the order in which they are to be installed. The gaskets are located to the pallet 28 on register pins 178.

The robot utilizes a parallel finger gripper for part retrieval. The robot moves to the assembly location in the assembly pallet 28, opens the gripper, receives feedback confirming that the gripper is open and moves into the pick-up position.

Once in the pick-up position, the robot closes the gripper, receives gripper-close confirmation and a part-present signal, and moves to the valve body.

At the valve body, the robot positions the gasket assembly onto register pins, moves the parts down to the body and releases the parts. The robot then moves to the upper valve body location on the pallet 28.

The robot uses the same end-effector to grip both the gasket assembly and the upper valve body. The robot grips the valve body, removes it from the vertical build fixture 173 and moves to the horizontal build fixture 176.

At the horizontal build fixture 176, the robot loads the valve body onto its register pins 180 and releases the part. The register pins 180 guide the valve body into position on the gaskets.

The solenoids are installed by one (1) robot equipped with an end-effector that radially orients the solenoids prior to part pick-up.

The robot moves to the first of the solenoids, moves into position and begins the orientation procedure. To orient the part, the end-effector is equipped with two (2) fingers that engage the connectors and provide force sensing as an indication of contact. The robot uses its hand axis to rotate the end-effector until contact is made between the fingers and the solenoid connector. Once contact is made the robot then rotates the solenoid to a known position. When the solenoid is in position another set of fingers grips the solenoid body.

The robot then moves to the valve body and positions the solenoid to the hole. When the solenoid is in position the robot presses the part into the valve body, releases the part and moves to the next solenoid pick-up location.

The installation procedure for the remaining four (4) solenoids are the same as the first solenoid. When all five (5) parts have been installed the robot moves clear to allow the pallet 28 to index to the next station 124.

Robot Station No. 8—install ball/spring; install solenoid connector; install gasket; and install cover.

The ball and the spring are stored in bulk at the assembly station 124 in vibratory bowl feeders 160. The parts are blow bed to the robotic end-effector from their hoppers 160 to simplify the station design and reduce the part fixturing requirements.

The robot is equipped with an end-effector that accommodates both the spring and the ball for assembly.

The robot moves to the ball/spring connector location in the assembly pallet 28 and positions the end-effector over the hole. The robot then initiates the blowing of the ball to the end-effector. When the ball is present in the tool, the robot actuates a pneumatic plunger to push the ball through the end-effector and into the hole. The plunger then retracts and the robot initiates the blowing of the spring to the tool. When the part is present the plunger is actuated and pushes the spring into the hole.

When both the ball and spring are installed the robot moves to a hand change stand (not shown), releases the blow feed tool and picks up a connector gripper.

The robot then moves to the connector location in the assembly pallet 28, positions the gripper over the connector, and grips the part. The robot utilizes part present and gripper open/close sensors to provide feedback on the part pick-up process.

The robot then moves to the valve body and positions the connector to the solenoids. The end-effector provides individual support over each of the solenoid connections. The robot also uses force sensing to determine if the connector is properly seated.

The gasket and the cover are kitted to the assembly pallet 28. During the kitting operation the gasket is positioned first and then the cover placed on top of it so that it is in the assembly configuration when it reaches the assembly station 124.

The robot is equipped with an end-effector that picks up both parts and provide part present and gripper open/close feedback to the robot.

The robot moves to the cover/gasket location in the pallet 28, positions the end-effector to the parts and actuates the gripper. Once the parts have been gripped, the robot moves to the valve body.

The robot orients the cover/gasket to coincide with the register pins 100 of the horizontal build fixture 176. The cover/gasket then is lowered onto the register pins 180 and to a point above the connector. The robot then releases the parts and allows the register pins 180 to guide them to the seated position.

Robot Station No. 9—drive and torque nine (9) bolts.

The bolts are stored at the assembly station in a bulk utilizing an elevator hopper 174 for bolt orientation and presentation. The bolts are blow fed to the robotic end-effector to reduce assembly cycle time and to reduce part presentation fixture costs.

The robot is equipped with a bolt runner end-effector which is an electric spindle with torque and angle control/monitoring mounted to a blow feed nosepiece and advance module.

The robot moves to the first bolt location, positions the tip of the bolt into the bolt hole and initiates the start cycle for the bolt runner. The robot then actuates the advance module to bring the socket into contact with the bolt and pushes the bolt into the bolt hole.

The bolt is spinning as it approaches the threaded section of the hole for a more positive thread to thread engagement. The robot maintains the position until the bolt runner indicates that the cycle is complete.

When the cycle has been completed the robot moves to the next bolt position, blows a bolt to the end-effector and initiates the bolt running sequence. This procedure is repeated nine (9) times until all bolts have been run down and torqued.

When the last bolt has been torqued the robot moves back to the first bolt position, with the socket still extended, and re-torque the bolt. The re-torque operation is performed for the first four (4) bolts installed to ensure a proper control body assembly.

When the bolts have been installed the robot moves clear, allows the pallet 28 to index out of the station 124, and blows another bolt to its end-effector in preparation for the next assembly.

The remaining valve is installed at the manual build area 50 prior to the control body installation to the transmission.

When the control valve body subassembly has completed all robotic operations, it is transported to the robotic unload station 111 where it is removed from the fixture 28.

ROBOTIC UNLOAD STATION IN CELL 110

The robotic unload station 111 consists of one (1) robot mounted on the servo track 146. The fixture 28 with the completed control valve body subassembly stops at the robot where the subassembly is identified and then removed from the fixture 28 and placed into a pallet 28 of the same part number subassembly. The robot services one (1) dual pallet station 111 which is parallel to the robot servo track 146. The station 111 holds multiple numbers of the subassembly.

When a pallet 28 of subassemblies is full an automatic stacker crane of the system 108 transfers the pallet 28 from the unload station 111 to a queuing area in its rack structure. The stacker crane then picks up an empty pallet 28 from the rack structure and places it at the unload station 111.

The control valve body subassembly being removed by the robot creates an empty MGV vehicle 152 which is transported to an identification station (not shown) where a new subassembly sequence is repeated.

Figure 14:
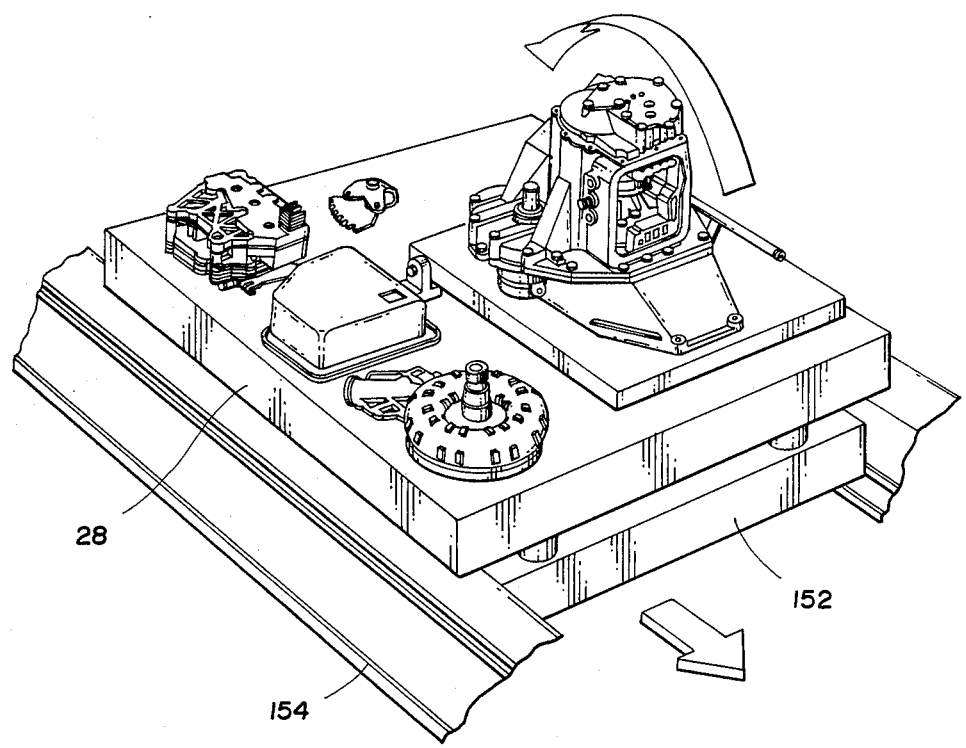
FIG. 14 is a partially broken away perspective view of an assembly pallet on an MGV loaded with parts and subassemblies to be assembled at a fourth manual build area.

If production need demands, the control valve body subassembly is removed from the assembly fixture 28 and is directly placed onto the assembly fixture 28 in the cell 110. This is accomplished with the unload station robot picking up the part and moving onto the cell area via the robot servo track 146 and placing the part onto the manual assembly fixture 28 as shown in FIG. 14.

MANUAL BULK KITTING AREA 88

At each of the manual build stations within the area 88, two (2) bulk parts bins (one for automatic and one for manual transmissions) are located for use by an operator. These bins include small parts used in the assembly at each respective manual build area 44 through 50. These bins are replenished on a regular basis. Preferably, this replenishment is accomplished at lunch breaks and between shifts unless a demand for a change exists during production.

These bins are made up manually from pallets stored in a rack structure of the system 86 in the manual bulk kitting area 88. The replacement of the bins is accomplished by directing the automatic guided vehicle system 26 to pick up an empty bin and replace it with a full bin.

CELL 34 AND BUILD AREA 44

In general, in the cell 34 and the area 41, parts and assemblies are assembled into the following transmission subassemblies: automatic transmission (type A); housing assembly; rear case assembly; differential assembly; automatic transmission (type B); housing assembly; rear case assembly; differential assembly; automatic assembly (type C); housing assembly; rear case assembly; differential assembly; automatic transmission (type D); housing assembly; rear case assembly; differential assembly; automatic transmission (type E); housing assembly; rear case assembly; differential assembly; manual transmission (type A); housing assembly; rear case assembly; differential assembly; manual transmission (type B); housing assembly, rear case assembly; and differential assembly.

This includes the acceptance of parts from the receiving area 32. The cell 34 automatically queues these parts and presents them to the robotic kitting or picking stations 80 for placement into assembly fixtures 28. They are then transported to manual build area 44 and back to the cell 34 for automatic fastening, automatic testing and unloading at the robotic unload station 101.

PARTS AND ASSEMBLIES

Figure 2:
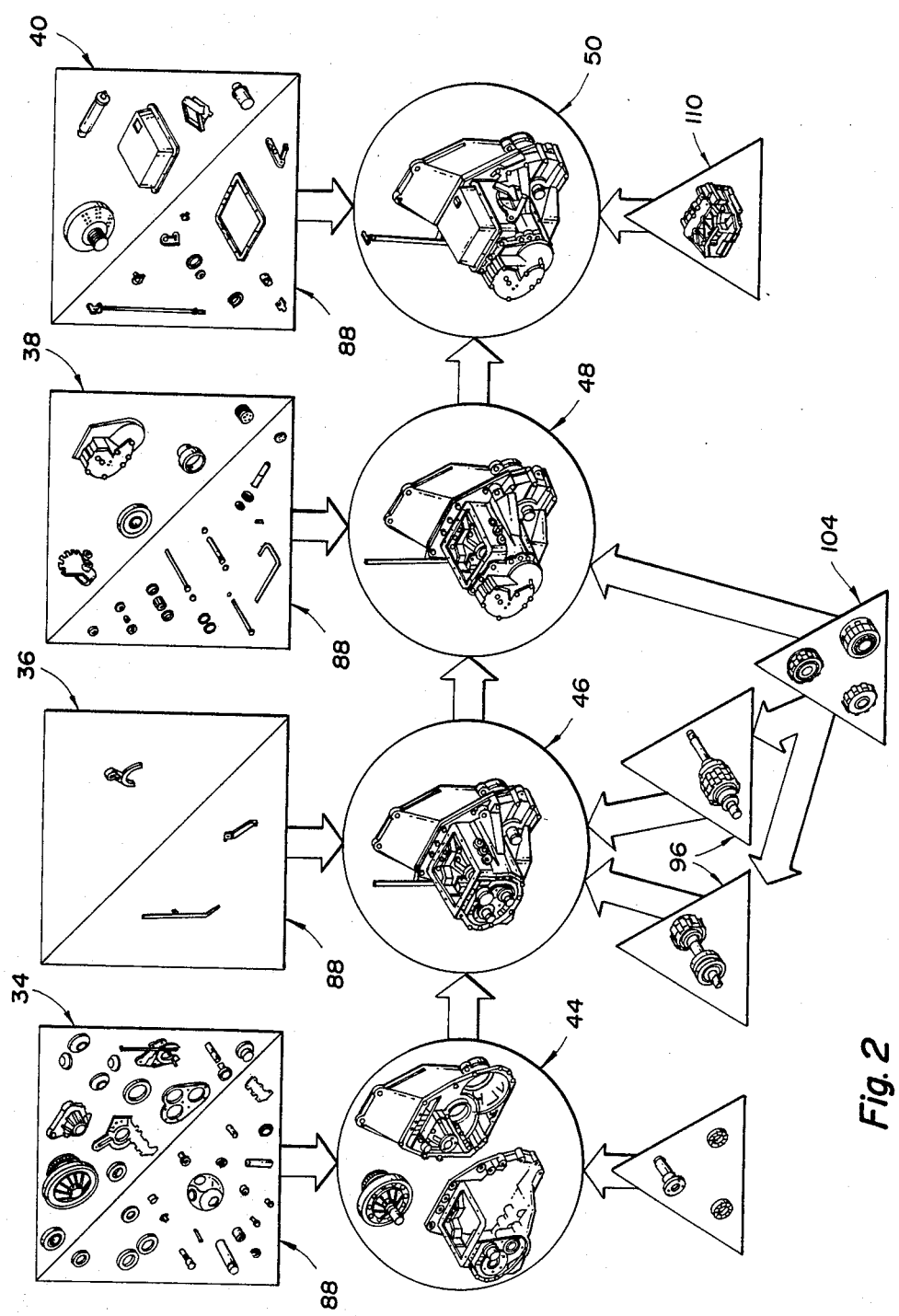
FIG. 2 is a diagram illustrating the flow of parts and subassemblies in assembling a power train component such an automatic transmission.
Figure 3:
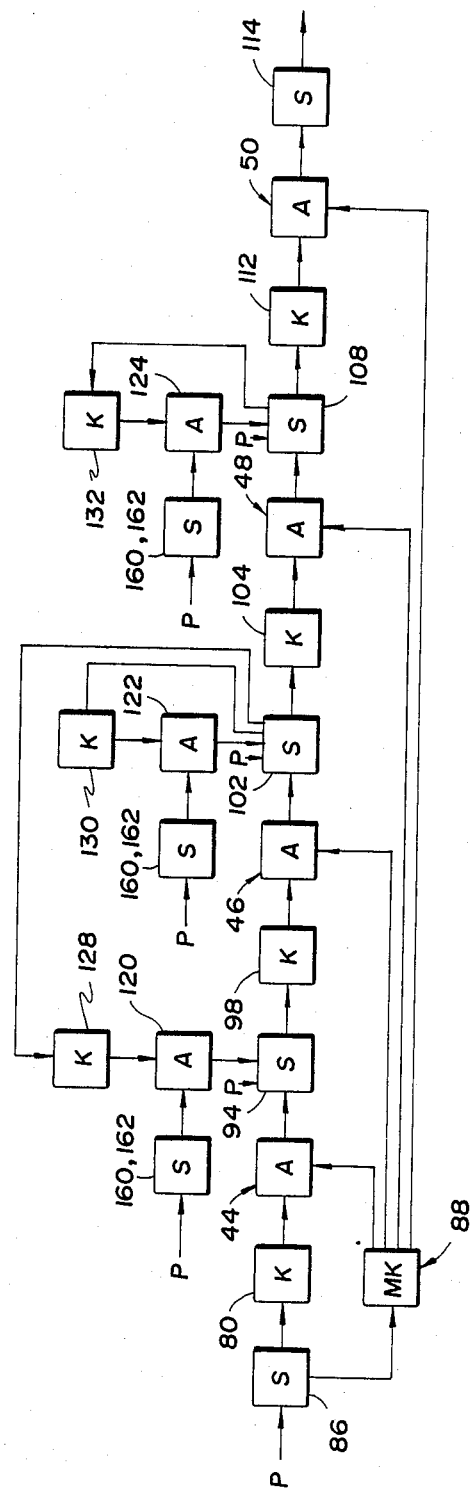
FIG. 3 is a flowchart illustrating many of the steps taken by the different components of the system of FIG. 1 wherein P stands for parts, S stands for store, K stands for kit, MK stands for manual kit, and A stands for assemble.

As shown in FIG. 2, the parts and assemblies to be built in the manual area 44 are as follows: automatic transmission; transmission housing; rear case; differential case assembly; differential gear pinion (type C); differential gear side (type C); housing gear I.D.; housing gear O.D.; rear case retainer; housing plate; rear case gear; rear case cover; rear case servo; rear case retainer; housing plate; loose parts stored in bins at work stations in the area 44; manual transmission; transmission housing; rear case; differential case assembly; rear case retainer; rear case retainer; loose parts stored in bins at work station; common parts for both automatic and manual transmissions; differential gear pinion (type A); differential gear pinion (type B); differential gear side (type A); and differential gear side (type B).

The total number of different parts and assemblies to be robotically kitted for manual subassembly is twenty-four (24). The parts and assemblies are located on pallets 28 of the same exact type. Multiple numbers are on each pallet 28 dependent upon the size and characteristics of the part.

ROBOTIC KITTING STATION 80

The twenty-four (24) different parts and assemblies are located in a rack structure of the system 86 in the cell 34. The racks hold pallets for up to 30 minutes of production parts and assemblies. The pallets are delivered to the rack structure, via the automatic stacker crane of the system 86, from the receiving area input stations 82, where automatic guided vehicles 22 deliver the parts from the receiving area 32.

The cell rack structure is serviced by a single automatic stacker crane which performs the following transfers: transfers full pallets 28 of parts and assemblies from the receiving area input stations 82 to a queuing area in the rack structure; transfers full pallets 28 from the queuing area to the robotic picking stations 80; transfers empty pallets 28 from the robotic picking stations 80 to a designated queuing area in the rack structure; and transfers empty pallets 28 from the queuing area in the rack structure to the pick-up stations 92 for automatic guided vehicle delivery to the parts receiving area 32.

ROBOTIC PICKING STATIONS

Figure 10:
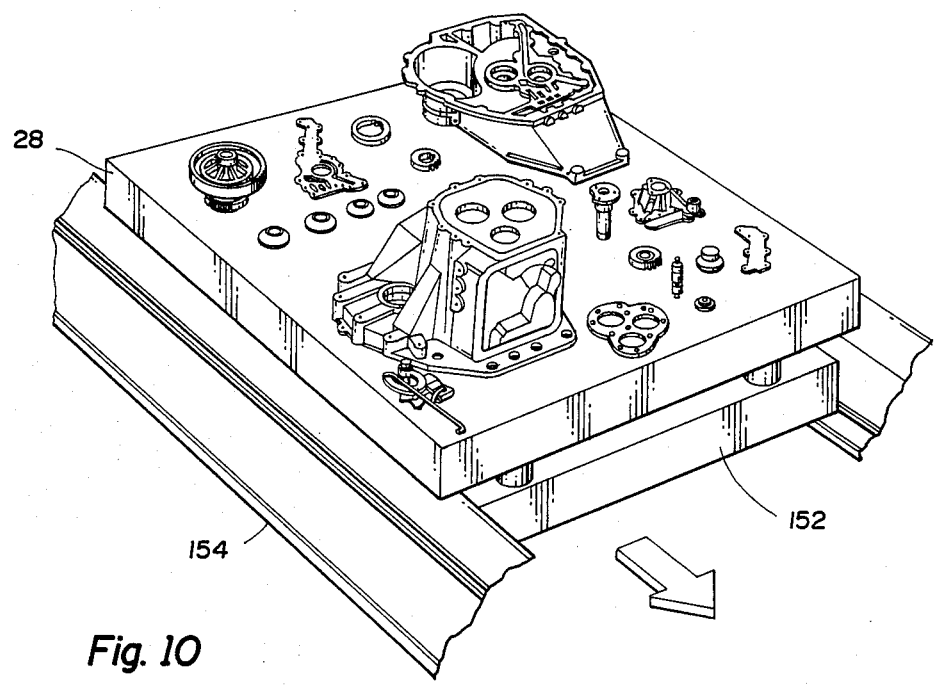
FIG. 10 is a partially broken away perspective view of an assembly pallet on an MGV loaded with kitted parts to be assembled at a first manual build area.

Preferably, there are twenty-four (24) dual robot picking stations 80 where pallets of parts and assemblies are located parallel to a robot servo track with four (4) robots. However, it is to be understood that a greater or lesser number of robots could be utilized as illustrated in FIG. 1. Each robot services a predetermined number of the picking stations 80 to pick individual parts/assemblies and place them onto a transmission assembly fixture 28 located on the MGV vehicle system 150 as shown in FIG. 10. The fixture 28 is positioned at each of the four (4) robots where a sensor reads the code number of that assembly. The number was written on the fixture 28 prior to the picking stations.) Each robot places up to four (4) parts/assemblies on the fixture 28. The parts/assembly assignment for each of the four (4) robots is as follows:

Robot No. 1: manual—transmission housing; automatic—transmission housing; manual—rear case; automatic—rear case; manual—differential case assembly; and automatic—differential case assembly.

Robot No. 2: manual/automatic—differential gear pinion (type A); manual/automatic—differential gear pinion (type B); automatic—differential gear pinion (type C); manual/automatic—differential gear side (type A); manual/automatic—differential gear side (type B); automatic—differential gear side (type C); automatic—housing gear O.D.; and automatic—housing gear I.D.

Robot No. 3: manual—rear case retainer; automatic—rear case retainer; automatic—housing plate; automatic—rear case gear; and automatic—rear case cover.

Robot No. 4: automatic—rear case servo; manual—rear case retainer; automatic—rear case retainer; and automatic—housing plate.

The automatic transmission has fourteen (14) parts and the manual transmission has seven (7) parts placed on the fixture 28. The pallets of parts/assemblies at the robot picking stations 80 are monitored by a cell controller 180 and replaced when empty with a full pallet 28 from the queuing area in the rack structure. Each of the twenty-four (24) picking stations 80 has two (2) locations for pallets 28 to allow the replacement of an empty pallet 28.

The MGV track system 150 transfers the loaded assembly fixture 28 to a queuing conveyor 182 ahead of the AGV pick-up station 52. When a fixture 28 is present at the pick-up station 52 the cell controller 180 notifies the AGV controller 26 to deliver the fixture 28 to the manual build area 44.

MANUAL BUILD AREA 44

The automated guided vehicle system (AGVS) transfers the loaded assembly fixture 28 from the pick-up station 52 to the next available manual build station 56 within the area 44 for assembly of the parts on the fixture. There are four (4) manual stations 56 in the manual build area 44. Each station 56 is preferably supported with the following tools and equipment: AGV fixture pick-up/delivery station (two per manual station); automatic fixture presence sensing; manual fixture raise and lower mechanism; AGV parts bin pick-up/delivery station (two per manual station); bin of parts for automatic transmissions; automatic parts bin presence sensing; operator instruction manual; CRT terminal; instruction book holder; hand held assembly tools; hand held automatic fastening/monitoring system; operator selection station; replenish parts bin pushbutton; automatic transmission; manual transmission; manual assembly completed pushbutton; station A; station B; assembly fixture to repair area; station A; station B; and repair code keypad.

When an assembly fixture 28 appears at the AGV pick-up station 52, the AGV controller 26 dispatches an empty AGV 22 to that position. This AGV 22 is located in a queuing station 184 between the AGV deposit station 54 and the AGV pick-up station 22. The AGV 22 moves under the fixture and raises its lift, thereby removing the fixture 28 from the pick-up station 52. The AGV 22 is directed by the AGV controller 26 to deliver the fixture to the next available manual station 56. The AGV 22 travels to the assigned location and deposits the fixture 28 in the pick-up/delivery station. The AGV 22 then is directed to a manual station that has a completed assembly. (Operator pressed the "assembly completed" pushbutton.)

The assembly station operator raises the fixture to a comfortable working height with a foot pedal located under the station. Utilizing the supplied tools and instructions, the operator assembles the parts on the fixture 28. When the operator has completed the assembly he releases the fixture 28 to the lower level and presses the corresponding "assembly complete" pushbutton. He then moves to the second assembly station where another fixture has been delivered with unassembled parts. If, during assembly of the transmission the operator discovers an incorrect or bad part he will notify the system via the keypad and press the "transmission to repair" button. The AGV controller 26 directs an empty AGV 22 to that location for delivery to the repair area or loop 58.

Each individual assembly station has two (2) parts bins for small brackets, washers, gears, etc.—one for automatic and one for manual transmissions. The parts bins are made up in a separate area and conveyed by AGV's 22 to the assembly stations. When an operator requires a parts bin replacement, he presses the "replenish parts bin" button on his operator panel and the AGV controller 26 removes the empty bin and replaces it with a full bin.

When an assembly has been completed and the pushbutton on the operator panel is pressed, the AGV 22 delivers the completed assembly to the AGV deposit station 54 for queuing prior to the transfer to the MGV track system 150.

AUTOMATIC FASTENING AND TESTING

The assembled transmission fixture is transferred to a MGV vehicle 152 for delivery to a robotic fastening stations 126 within the cell 34. After the fixture 22 is identified at the fastening stations 126, a series of four (4) (or five (5) as shown in FIG. 1) robots automatically fasten and monitor the joints and report the quality to the system controller 30. The assembly then proceeds to an automatic test station 186 in the cell 34 where identification of the assembly is made and verification of the quality of the assembly is determined. If during automatic fastening and testing a transmission assembly is determined to be a reject, it is noted and directed to &he reject station 60 in the cell 34. The AGV controller 26 directs an empty AGV 22 to deliver this unit to the repair area or loop 58.

Good assemblies are transported on the MGV system 150 in the cell 34 to the robotic unload station 101 for removal from the fixture 28.

ROBOTIC UNLOAD STATION 101

The robotic unload station 101 consists of two (2) robots mounted on the servo track 136. The transmission assembly stops at the robot where the assembly is identified and then removed from the fixture 28 and placed into a pallet 28 of the same part number assemblies. The robots service seven (7) dual pallet stations which are parallel to the robot servo track 136. Each of the seven (7) stations holds multiple numbers of the nine (9) different assembly types.

When a pallet of assemblies is full, an automatic stacker crane of the system 94 transfers the pallet from the unload station 101 to a queuing area in the rack structure of the system 94. The stacker crane then picks up an empty pallet from the rack structure and places it at the unload station 101.

The transmission assembly being removed by the robot creates an empty MGV vehicle 152 which is transported to the identification station where a new assembly sequence is repeated.

CELL 36 AND AREA 46

Figure 11:
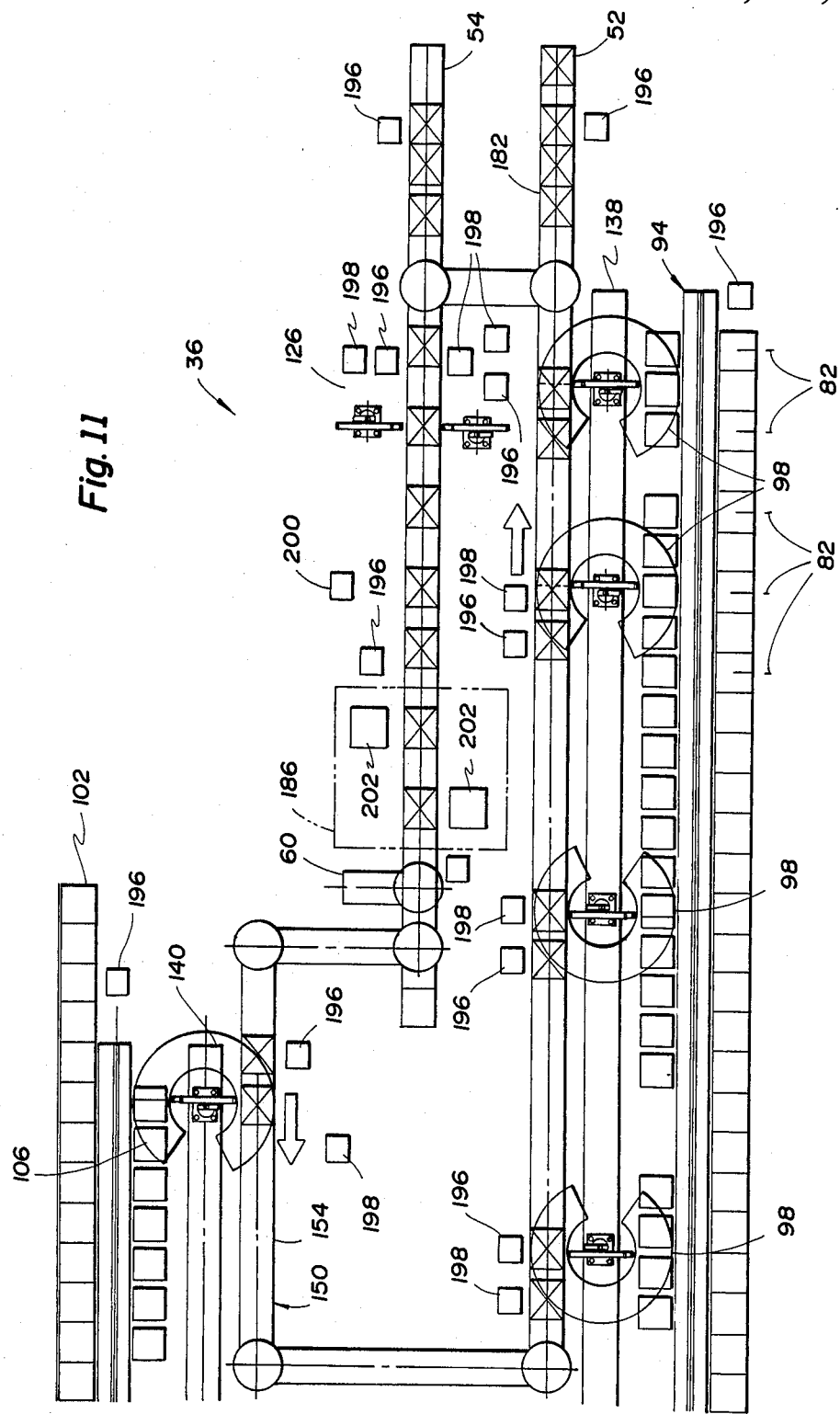
FIG. 11 is a detailed top schematic view of a modified portion of the system of FIG. 1 which kits parts and subassemblies and fastens, tests and unloads a subassembly.

Referring now to FIGS. 1, 11 and 12, in general, parts and assemblies are assembled into the following transmission subassemblies: automatic transmission (type A); automatic transmission (type B); automatic transmission (type C); automatic transmission (type D); automatic transmission (type E); manual transmission (type A); and manual transmission (type B).

The cell 36 accepts parts and assemblies from the cell 34, input and output shafts from cell 96, and parts from the receiving area 32. The cell 36 automatically queues these parts/assemblies and presents them to the robotic kitting stations 98 for placement into assembly fixtures 28. They are then transported to the manual build area 46 and then automatically fastened, automatically tested and unloaded in the cell 36.

PARTS AND ASSEMBLIES

As shown in FIG. 2, the parts and assemblies to be built in the area 46 are as follows: automatic transmission; housing assembly; rear case assembly; input shaft assembly (3 types); output shaft assembly (3 types); differential assembly (3 types); shift fork assembly; loose parts stored in bins at its work station; manual transmission; housing assembly; rear case assembly; input shaft assembly (2 types); output shaft assembly (2 types); differential assembly (2 types); shift fork assembly; reverse idler gear; and loose parts stored in bins at work station.

The total number of different parts and assemblies to be robotically kitted is twenty-two (22). The parts and assemblies are located on pallets 28 of the same exact type. Multiple numbers are on each pallet 28 dependent upon the size and characteristics of the part.

ROBOTIC KITTING STATIONS 98

The twenty-two (22) different parts and assemblies are located in a rack structure of the system 94 in the cell 76. The racks hold pallets 28 for up to 30 minutes of production parts and assemblies. The pallets 28 are delivered to the rack structure, via an automatic stalker crane of the system 94, from the cell 96 that is building input and output shafts, the cell 34, and parts delivered by automatic guided vehicles 22 (AGVS) from the receiving area 32.

The cell rack structure is serviced by a pair of automatic stacker cranes which perform the following transfers: transfer full pallets 28 of assemblies from unload stations 101 to a queuing area in the rack structure; transfer full pallets of assemblies from automatic input and output shaft assembly unload stations 100 to a queuing area in the rack structure; transfer full pallets 28 of parts from the receiving area input stations to a queuing area in the rack structure; transfer full pallets 28 from the queuing area to the robotic picking stations 98; transfer empty pallets 28 from the robotic picking stations 98 to a designated queuing area in the rack structure; transfer empty pallets 28 from the queuing area in the rack structure to the robotic unload station 100 where 2 to 3 types of input and output shafts are loaded; and transfer empty pallets 28 from the queuing area in the rack structure to pick-up stations 84 for automatic guided vehicle delivery to parts receiving area 32.

ROBOTIC PICKING STATIONS 36

There are twenty-two (22) dual robot picking stations where pallets 28 of parts and assemblies are located parallel to a robot servo track 138 with two (2) robots. However, a greater number such as four (4) robots may be utilized as indicated in FIGS. 1 and 11. Each robot services a predetermined number of the picking stations 36 to pick individual parts/assemblies and places them onto a transmission assembly fixture 28 located on the MGV vehicle system 150 of the cell 36. The fixture 28 is positioned at each of the two (2) robots where a sensor reads the code number of that assembly. (The number was written on the fixture prior to the picking stations.) Each robot places up four (4) parts/assemblies on the fixture. The parts/assemblies assignment for each of the two (2) robots is as follows:

Robot No. 1: manual—input shaft (type A); manual—input shaft (type B; manual—output shaft (type A); manual—output shaft (type B); automatic—input shaft (type A); automatic—input shaft (type B); automatic—input shaft (type C); and automatic—output shaft (type A).

Robot No. 2: automatic—output shaft (type B); automatic—output shaft (type C); manual—housing assembly; automatic—housing assembly; manual—rear case assembly; automatic—rear case assembly; manual—differential assembly (type A); manual—differential assembly (type B); automatic—differential assembly (type A); automatic—differential assembly (type B); automatic—differential assembly (type C); manual—— shift fork assembly; manual—reverse idler gear; and automatic—shift fork assembly.

The automatic transmission will have six (6) parts and the manual transmission will have seven (7) parts placed on the fixture 28. The pallets 28 of parts/assemblies at the robot picking stations are monitored by a cell controller 190 and replaced when empty with a full pallet 28 from the queuing area in the rack structure. Each of the twenty-two (22) picking stations 98 has two (2) locations for pallets 28 to allow the replacement of an empty pallet 28.

The MGV track system 150 transfers the loaded assembly fixture 28 to a queuing conveyor 182 ahead of the AGV pick-up station 52. When a fixture 28 is present at the pick-up station 52 the cell controller 190 notifies the AGV controller 26 to deliver the fixture 28 to the manual assembly area 46.

MANUAL BUILD AREA 46

The automated guided vehicle system (AGVS) transfers the loaded assembly fixture 28 from the pick-up station 52 of the cell 36 to the next available manual station for assembly of the parts on the fixture. There are four (4) manual stations in the build area 46. Each station is supported with the following tools and equipment: AGV fixture pick-up/delivery station (two per manual station); automatic fixture presence sensing; manual fixture raise and lower mechanism; AGV parts bin pick-up/delivery station (two per manual station); bin of parts for automatic transmissions; automatic parts bin presence sensing; bin of parts for manual transmissions; automatic parts bin presence sensing; operator instruction manual; CRT terminal; instruction book holder; hand held assembly tools; hand held automatic fastening/monitoring system; operator selection station; replenish parts bin pushbutton; automatic transmission; manual transmission; manual assembly completed pushbutton; station A; station B; assembly fixture to repair area; station A; station B; and repair code keypad.

When an assembly fixture 28 appears at the AGV pick-up station, the AGV controller 26 dispatches an empty AGV 22 to that position. This AGV 22 is located in a queuing station 184 between the AGV deposit station 54 and the AGV pick-up station 52. The AGV 22 moves under the fixture 28 and raises its lift removing the fixture 28 from the pick-up station 52. The AGV 22 is directed by the AGV controller 26 to deliver the fixture 28 to the next available manual station. The AGV 22 travels to the assigned location and deposits the fixture 28 in the pick-up/delivery station. The AGV is directed to a manual station that has a completed assembly. (Operator pressed the "assembly completed" pushbutton.)

The assembly station operator raises the fixture 28 to a comfortable working height with a foot pedal located under the station. Utilizing the supplied tools and instructions the operator assembles the parts on he fixture 28. When the operator has completed the assembly he releases the fixture 28 to the lower level and presses the corresponding "assembly complete" pushbutton. He then moves to the second assembly station where another fixture has been delivered with unassembled parts. If, during assembly of the transmission, the operator discovers an incorrect or bad part he notifies the system via the keypad and press the "transmission to repair" button. The AGV controller 26 directs an empty AGV 22 to that location for delivery to the repair area or loop 58.

Each individual assembly station has two (2) parts bins for small brackets, washers, gears, etc.—one for automatic and one for manual transmissions. The parts bins are made up in a separate area and conveyed by AGV's to the assembly stations. When an operator requires a parts bin replacement, he presses the "replenish parts bin" button on his operator panel and the AGV controller 26 removes the empty bin and replaces it with a full bin.

When an assembly has been completed and the pushbutton on the operator panel is pressed, the AGV controller 26 dispatches an empty vehicle 22 to that station. The AGV 22 delivers the completed assembly to the AGV deposit station 54 for queuing prior to the transfer to the MGV track system 150.

AUTOMATIC FASTENING AND TESTING

The assembled transmission on the fixture 28 is transferred to a MGV vehicle 152 for delivery to the robotic fastening cell 126. The fixture 28 is identified by the fastening cell 126, then two (2) robots automatically fasten and monitor the joints and report the quality to the system controller 30. The assembly then proceeds to an automatic test cell 186 where identification of the assembly is made and verification of the quality of the assembly is determined. If during automatic fastening and testing a transmission assembly is determined to be a reject, it is noted and directed to the reject station 60. The AGV controller 26 directs an empty AGV 22 to deliver this unit to the repair area 58.

Good assemblies are transported on the MGV system 150 to the robotic unload station 106 for removal from the fixture 28.

ROBOTIC UNLOAD STATION 106

The robotic unload station 106 consists of one (1) robot mounted on the servo track 140. The transmission assembly stops at the robot where the assembly is identified and then removed from the fixture 28 and placed into a pallet 28 of the same part number assemblies. The robot services seven (7) dual pallet stations which are parallel to the robot servo track 140. Each of the seven (7) stations holds multiple numbers of the seven (7) different transmission types.

When a pallet of assemblies is full an automatic stacker crane of the system 102 transfers the pallet from the unload station 106 to a queuing area in its rack structure. The stacker crane then picks up an empty pallet from the rack structure and places it at the unload station 106.

The transmission assembly removed by the robot creates an empty MGV vehicle 152 which is transported to its identification station where a new assembly sequence is repeated.

CELL 38 and AREA 48

Referring now to FIGS. 1 and 12, in general, parts and assemblies are assembled into the following subassemblies in the area 48: automatic transmission (type A); automatic transmission (type B); automatic transmission (type C); automatic transmission (type D); automatic transmission (type E); manual transmission (type A); and manual transmission (type B).

Cell 38 includes the acceptance of parts and assemblies from cell 36, and parts from the receiving area 72. The system 102 automatically queues these parts/assemblies and presents them to the robotic kitting stations 104 for placement into assembly fixtures 28. They are then transported to manual build area 68 and then automatically fastened, tested and robotically unloaded at the station 112.

PARTS AND ASSEMBLIES

As shown in FIG. 2, the parts and assemblies to be built in the area 48 are as follows: automatic transmission; transmission assemblies built in area 46 (5 types); rear cover; detent lever; gear and sprag assembly; gear and hub assembly; clutch assembly (2 types); tube assembly (input shaft) hub; loose parts stored in bins at work station; manual transmission; transmission assemblies build in build station No. 1 (2 types); gear 5th drive to output shaft; synchronizer subassembly; fork; syncro subassembly; reverse cone; rear cover; gear for input shaft; synchronizer assembly; and loose parts stored in bins at work station.

The total number of different parts and assemblies to be robotically kitted in cell 38 is twenty-two (22). The parts and assemblies are located on pallets 28 of the same exact type. Multiple numbers are on each pallet 28 dependent upon the size and characteristics of the part and assembly.

ROBOTIC KITTING STATIONS 104

The twenty-two (22) different parts and assemblies are located in a rack structure of the system 102 in the cell 38. The racks holds pallets 28 for up to 30 minutes of production parts and assemblies. The pallets 28 are delivered to the rack structure, via an automatic stacker crane of the system 102, from the robotic unload station 106 and from input stations 82, where parts are delivered from the receiving area 32 via automated guided vehicles 22.

The rack structure is serviced by a pair of automatic stacker cranes which perform the following transfers of the system 102: transfers full pallets 28 of assemblies from unload station 106 and 105 to a queuing area in the rack structure; transfer full pallets 28 of parts from the receiving area input stations 82 to a queuing area in the rack structure; transfer full pallets 28 from the queuing area to the robotic picking stations 104; transfer empty pallets 28 from the robotic picking stations 104 to a designated queuing area in the rack structure; transfer empty pallets 28 from the queuing area in the rack structure to the stations 105 and 106; and transfer empty pallets from the queuing area in the rack structure to the pick-up stations 84 for automatic guided vehicle delivery to the parts receiving area 32.

ROBOTIC PICKING STATIONS 104

Preferably, there are twenty-two (22) dual robot picking stations where pallets of parts and assemblies are located parallel to a robot servo track 142 with two (2) robots. However, four (4) robots may also be used as illustrated in FIG. 1. Each robot services a predetermined number cf the picking stations 104 to pick individual parts/assemblies and place them onto a transmission assembly fixture 28 located on the MGV vehicle system 150 of the cell 38. The fixture 28 is positioned at each of the two (2) robots where a sensor reads the code number of that assembly. (The number was written on the fixture prior to the picking station.) Each robot places up to four (4) parts/assemblies on the fixture. The parts/assemblies assignment for each of the two (2) robots is as follows:

Robot No. 1: manual transmission assembly (type A); manual transmission assembly (type B); automatic transmission assembly (type A); automatic transmission assembly (type B); automatic transmission assembly (type C); automatic transmission assembly (type D); automatic transmission assembly (type E); manual—reverse cone; manual—gear for input shaft; manual—syncro subassembly; and automatic—gear and sprag assembly.

Robot No. 2: automatic—clutch assembly 10 plate; automatic—clutch assembly 12 plate; automatic—gear and hub assembly; manual—rear cover; automatic—rear cover; manual—synchronizer assembly; automatic—detent lever; manual—gear 5th drive to output shaft; manual—fork; manual—synchronizer subassembly; and automatic—tube assembly (input shaft) hub.

The automatic transmission has seven (7) parts and the manual transmission has nine (9) parts placed on the fixture 28. The pallets 28 of parts/assemblies a& the robot picking station is monitored by a cell controller 192 and replaced when empty with a full pallet 28 from the queuing area in its rack structure. Each of the twenty-two (22) picking stations 104 has two (2) locations for pallets to allow the replacement of an empty pallet 28.

The MGV track system 150 transfers the loaded assembly fixture 28 to a queuing conveyor 182 ahead of the AGV pickup station 52. When a fixture 28 is present at the pick-up station 52 the cell controller 192 notifies the AGV controller 26 to deliver the fixture 28 to the manual build area 48.

MANUAL BUILD AREA 48

The automated guided vehicle system (AGVS) transfers the loaded assembly fixture 28 from the pick-up station 52 to the next available manual station for assembly of the parts/assemblies on the fixture. There are four (4) manual stations in the build area 48. Each station is supported with the following tools and equipment: AGV fixture pick-up/delivery station (two per manual station); automatic fixture presence sensing; manual fixture raise and lower mechanism; AGV parts bin pick-up/delivery station (two per manual station); bin of parts for automatic transmissions; automatic parts bins presence sensing; bin of parts for manual transmissions; automatic parts bins presence sensing; operator instruction manual; CRT terminal; instruction book holder; hand held assembly tools; hand held automatic fastening/monitoring system; operator selection station; replenish parts bin pushbutton; automatic transmission; manual transmission; manual assembly completed pushbutton; station A; station B; assembly fixture to repair area; station A; station B; and repair code keypad.

When an assembly fixture 28 appears at the AGV pick-up station 52, the AGV controller 26 dispatches an empty AGV 22 to that position. This AGV 22 is located in a queuing station 184 between the AGV deposit 54 and the AGV pick-up station 52. The AGV 52 moves under the fixture 28 and raises its lift removing the fixture from the pick-up station 52. The AGV 22 is directed by the AGV controller 26 to deliver the fixture 28 to the next available manual station. The AGV 22 travels to the assigned location and deposits the fixture 28 in the pick-up/delivery station. The AGV 22 is now directed to a manual station that has a completed assembly (operator pressed the "assembly completed" pushbutton).

The assembly station operator raises the fixture to a comfortable working height with a foot pedal located under the station. Utilizing the supplied tools and instructions, the operator assembles the parts on the fixture. When the operator has completed the assembly he releases the fixture to the lower level and presses the corresponding "assembly complete" pushbutton. He then moves to the second assembly station where another fixture 28 has been delivered with unassembled parts. If during assembly of the transmission, the operator discovers an incorrect or bad part, he notifies the system via the keypad and presses the "transmission to repair" button. The AGV controller 26 directs an empty AGV 22 to that location for delivery to the repair area or loop 58.

Each individual assembly station has two (2) parts bins for small brackets, washers, gears, etc.,—one for automatic and one for manual transmissions. The parts bins are made up in a separate area and conveyed by AGVs 22 to the assembly station. When an operator requires a parts bin replacement, he presses the "replenish parts bin" button on his operator panel and the AGV controller 26 removes the empty bin and replaces it with a full bin.

When an assembly has been completed and the pushbutton on the operator's panel is pressed, the AGV controller 26 dispatches an empty vehicle 22 to that station. The AGV 22 delivers the completed assembly to the AGV deposit station 54 for queuing prior to the transfer to the MGV track system 150.

AUTOMATIC FASTENING AND TESTING

The assembled transmission on the fixture 28 is transferred to a MGV vehicle 152 for delivery to the robotic fastening station 126. The fixture 28 is identified by the fastening station 126, then a pair of two (2) robots automatically fastens and monitors the joints and reports the quality to the system controller. The assembly then proceeds to an automatic test station 186 where identification of the assembly is made and verification of the quality of the assembly is determined. If during automatic fastening and testing a transmission assembly is determined to be a reject, it is noted and directed to the reject station 60. The AGV controller 26 directs an empty AGV 22 to deliver this unit to the repair area 58.

Good assemblies are transported on the MGV system 150 to the robotic unload station 112 for removal from the fixture 28.

ROBOTIC UNLOAD STATION 112

The robotic unload station 112 consists of one (1) robot mounted on the servo track 144. The transmission assembly stops at the robot, where the assembly is identified and then removed from the fixture 28 and placed into a pallet 28 of the same part number assemblies. The robot services seven (7) dual pallet stations which are parallel to the robot servo track 144. Each of the seven (7) stations holds multiple numbers of the seven (7) different transmission types.

When a pallet 28 of assemblies is full an automatic stacker crane of the system 108 transfers the pallet 28 from the unload station 112 to a queuing area in its rack structure. The stacker crane then picks up an empty pallet 28 from the rack structure and places it at the unload station 112.

The transmission assembly being removed by the robot creates an empty MGV vehicle 152 which is transported to an identification station where a new assembly sequence is repeated.

CELL 40 AND AREA 50

Referring now to FIGS. 1 and 4, in general parts and assemblies are assembled in the area 50 into the following transmission types: automatic transmission (type A); automatic transmission (type B); automatic transmission (type C); automatic transmission (type D); automatic transmission (type E); manual transmission (type A); and manual transmission (type B).

The cell 40 accepts parts and assemblies from the cell 38, control bodies from the cell 110, and parts from the receiving area 32. The system 108 automatically queues these parts/assemblies and presents them to the robotic kitting stations 112 for placement into assembly fixtures 28. The fixtures 28 are then transported to the manual build area 50 and then back to the cell 40 for automatic testing, and to the robotic unload station 116.

PARTS AND ASSEMBLIES

As shown in FIG. 2, the parts and assemblies built in area 50 are as follows: automatic transmission; transmission assemblies built in build area 48 (5 types); control body assemblies; valve body covers; input speed sensor arm; high pressure filter assembly; low pressure filter assembly; torque converter; loose parts stored in bins at its work stations; manual transmission; transmission assemblies built in build area 48 (2 types); shift housing; cylinder arm; clutch fork; and loose parts stored in bins at its work stations.

The total number of different parts and assemblies to be robotically kitted in the cell 80 is sixteen (16). The parts and assemblies are located on pallets 28 of the same exact type. Multiple numbers are on each pallet 28 dependent upon the size and characteristics of the part and assembly.

ROBOTIC KITTING STATIONS 112

The sixteen (16) different parts and assemblies are located in a rack structure of the system 108. The racks hold pallets 28 for up to 30 minutes of production parts and assemblies. The pallets 28 are delivered to the rack structure, via an automatic stacker crane of the system 108, from the robotic unload stations 111 and 112 and from input stations 82, where parts are delivered from the receiving area 32 via automated guided vehicles 22.

The rack structure is serviced by a pair of automatic stacker cranes of the system 108 which perform the following transfers transfer full pallets 28 of assemblies from unload stations 111 and 112 to a queuing area in the rack structure; transfer full pallets 28 of parts from the stations 82 to a queuing area in the rack structure; transfer full pallets 28 from the queuing area to the robotic picking stations 112; transfer empty pallets 28 from the robotic picking stations 112 to a designated queuing area in the rack structure; transfer empty pallets 28 from the queuing area in the rack structure to the unload stations 111 and 112; and transfer empty pallets 28 from the queuing area in the rack structure to the pick-up stations 84 for automated guided vehicle delivery to the parts receiving area 32.

ROBOTIC PICKING STATIONS 112

Preferably, there are sixteen (16) dual robot picking stations 112 where pallets 28 of parts and assemblies are located parallel to a robot servo track 146 with three (3) robots. However, it is to be understood that five (5) robots could be used as illustrated in FIG. 1. Each robot services a predetermined number of picking stations 112 to pick individual parts/assemblies and place them onto a transmission assembly fixture 28 located on the MGV vehicle system 150. The fixture 28 is positioned at each of the three (3) robots where a sensor reads the code number of that assembly. (The number was written on the fixture prior to the picking stations.) Each robot places up to four (4) parts/assemblies on the fixture 28. The parts/assemblies assignment for each of the three (3) robots is as follows:

Robot No. 1: manual transmission assembly (type A); manual transmission assembly (type B); automatic transmission assembly (type A); automatic transmission assembly (type B); automatic transmission assembly (type C); automatic transmission assembly (type D); and automatic transmission assembly (type E).

Robot No. 2: manual transmission shift housing; automatic—control body assembly; automatic—valve body cover; manual—cylinder arm; and automatic—high pressure filter assembly.

Robot No. 3: automatic—input speed sensor arm; manual—clutch fork; automatic—low pressure filter assembly; and automatic—torque converter.

The automatic transmission has seven (7) parts and the manual transmission will have four (4) parts placed on the fixture 28. The pallets 28 of parts/assemblies at the robot picking station is monitored by a cell controller 194 and replaced when empty with a full pallet 28 from the queuing area in the rack structure, each of the sixteen (16) picking stations 112 has two (2) locations for pallets 28 to allow the replacement of an empty pallet 28.

The MGV track system 150 transfers the loaded assembly fixture 28 to a queuing conveyor 185 ahead of the AGV pick-up station 52. When a fixture 28 is present at the pick-up station 52 the cell controller 194 notifies the AGV controller 26 to deliver the fixture 28 to the manual build area 50.

MANUAL BUILD AREA 50

The automated guided vehicle system (AGVS) transfers the loaded assembly fixture 28 from the pick-up station 52 to the next available manual station for assembly of the parts/assemblies on the fixture 28. There are four (4) manual stations in the build area 50. Each station is supported with the following tools and equipment: AGV fixture pick-up/delivery station (two per manual station); automatic fixture presence sensing; manual fixture raise and lower mechanism; AGV parts bin pick-up/delivery (two per manual station); bin of parts for automatic transmissions; automatic parts bin presence sensing; bin of parts for manual transmission; automatic parts bin presence sensing; operator instruction manual; CRT terminal; instruction book holder; hand held assembly tools; hand held automatic fastening/monitoring system; operator selection station; replenish parts bin pushbutton; automatic transmission; manual transmission; manual assembly completed pushbutton; station A; station B; assembly fixture to repair area; station A; station B; and repair code keypad.

When an assembly fixture 28 appears at the AGV pick-up station 52, the AGV controller 20 dispatches an empty AGV 22 to that position. This AGV 22 is located in a queuing station 184 between the AGV deposit station 54 and the AGV pick-up station 52. The AGV 22 moves under the fixture 28 and raises its lift removing the fixture 28 from the pick-up station 52. The AGV 22 is directed by the AGV controller 194 to deliver the fixture 28 to the next available manual station The AGV 22 travels to the assigned location and deposits the fixture in the pick-up/delivery station. The AGV 22 now is directed to a manual station that has a completed assembly. (Operator pressed the "assembly completed" pushbutton.)

The assembly station operator raises the fixture 28 to a comfortable working height with a foot pedal located under the station. Utilizing the supplied tools and instructions, the operator assembles the parts on the fixture When the operator has completed the assembly he releases the fixture 28 to the lower level and presses the corresponding "assembly complete" pushbutton. He then moves to the second assembly station where another fixture 28 has been delivered with unassembled parts. If, during assembly of the transmission, the operator discovers an incorrect or bad part, he notifies the system via the keypad and presses the "transmission to repair" button. The AGV controller 36 directs an empty AGV 22 to that location for delivery to the repair area 58.

Each individual assembly station has two (2) parts bins for small brackets, washers, gears, etc.,—one for automatic and one for manual transmissions. The parts bins are made up in a separate area and conveyed by AGVs to the assembly station. When an operator requires a parts bin replacement he presses the "replenish parts bin" button on his operator panel and the AGV controller 26 removes the empty bin and replaces it with a full bin.

When an assembly has been completed and the pushbutton on the operator panel is pressed, the AGV controller 26 dispatches an empty vehicle 22 to that station. The AGV 22 delivers the completed assembly to the AGV deposit station 54 for queuing prior to the transfer to the MGV track system 150.

AUTOMATIC FASTENING AND TESTING

The assembled transmission on the fixture 28 is transferred to a MGV vehicle 152 for delivery to the robotic fastening station 126. The fixture 28 is identified by the fastening station 126, then, preferably, a series of four (4) robots automatically fastens and monitors the joints and reports the quality to the system controller 194. However, it is to be understood that two (2) robots may be utilized as illustrated in FIG. 1. The assembly fixture 28 then proceeds to an automatic test station 186 where identification of the assembly is made and verification of the quality of the assembly is determined. If during automatic fastening and testing a transmission assembly is determined to be a reject, it is noted and directed to the reject station 60. The AGV controller 26 directs an empty vehicle 22 to deliver this unit to the repair area 58.

Good assemblies are transported on the MGV system 150 to the robotic unload station 116 for removal from the fixture 28.

ROBOTIC UNLOAD STATION 116

The robotic unload station 116 consists of one (1) robot mounted on a servo track 148. The transmission assembly stops at the robot, where the assembly is identified and then removed from the fixture 28 and placed into a pallet 28 of the same part number assemblies. The robot services seven (7) dual pallet stations which are parallel to the robot servo track. Each of the seven (7) stations holds multiple numbers of the seven (7) different transmission types.

When a pallet 28 of assemblies is full an automatic stacker crane of the system 114 transfers the pallet 28 from the unload station 116 to output or pickup stations 118 where the cell controller 194 notifies the AGV controller 26 to pick up the completed pallet 28 of transmissions for delivery to the shipping area.

The transmission assembly being removed by the robot creates an empty MGV vehicle 152 which is transported to an identification station where a new assembly sequence is repeated.

TRANSMISSION REPAIR AREAS 58

Transmission assemblies that are determined to have bad parts or assemblies are directed to a repair area 58. The repair areas 58 are located in each of the areas 44, 46, 48 and 50.

Parts and assemblies that are to be sent to repair are delivered by automated guided vehicle 22.

When a transmission assembly is determined to be a reject, the system or the operator sends it to the repair area 58 in the respective area where the bad part/assembly was identified. The control system or controller 30, via a CRT terminal, signals the repair station operator the reason the assembly was rejected. If the repair station operator needs to change a part/assembly he signals the control system 30 via the CRT terminal for delivery of a replacement part/assembly from the receiving area 32 or the queuing area in the rack structure. When the part/assembly has been repaired the operator, via the CRT, signals the automatic guided vehicle system (AGVS) to pick-up and deliver the assembly to the respective assembly line.

TRANSMISSION DELIVERY OF VEHICLE ASSEMBLY

When transmissions have been completely assembled they are placed in the queuing area in the rack structure at the exit of cell 40. When these transmissions are required at vehicle assembly, the stacker crane transfers these pallets 28 of multiple transmissions to output stations 118 for delivery by automatic guided vehicles 22 to vehicle assembly. These pallets 28 are moved on unit load type AGVs or by a tow type AGV system to the assembly line.

AS/RS MATERIAL DELIVERY TO MANUAL BUILD AREAS

As an option to the above described systems concept the manual build areas 44, 46, 48 and 50 are moved to a second level as illustrated in FIG. 15. This area is directly above the queuing rack structures 66 and the automatic stacker cranes 64.

The stacker cranes 64 are used as the transportation means of the assembly fixture 28 from robotic picking stations 80 to the manual build areas 44 through 50. This eliminates the AGVS system for delivering the assembly fixture 28 from the MGV track systems 150 to the manual build areas 44 through 50.

The assembly fixture 28 after robotic picking is transferred on the MGV system 150 to a stacker crane pickup station (not shown), where the stacker crane 64 picks up the fixture 28 and moves upward to an available manual build station within its respective area. The stacker crane 64 sets the fixture 28 at the work station and the assembly operation is the same as previously described. When the assembly is completed the operator signals the stacker crane controller and the crane 64 removes the fixture 28 to a delivery station (not shown) for pick up by the MGV system 150 for transportation to its fastening station 126.

The replenishment of the bulk parts bins in the build ares 44 through 50 is also accomplished with the stacker crane 64.

This concept better utilizes the floor space needed for the manual build areas 44 through 50 and the automatic stacker crane's use in the system 20. There are also benefits and savings in the need for fewer pallets 28 for the shorter distances traveled.

CONTROLS

Figure 16:
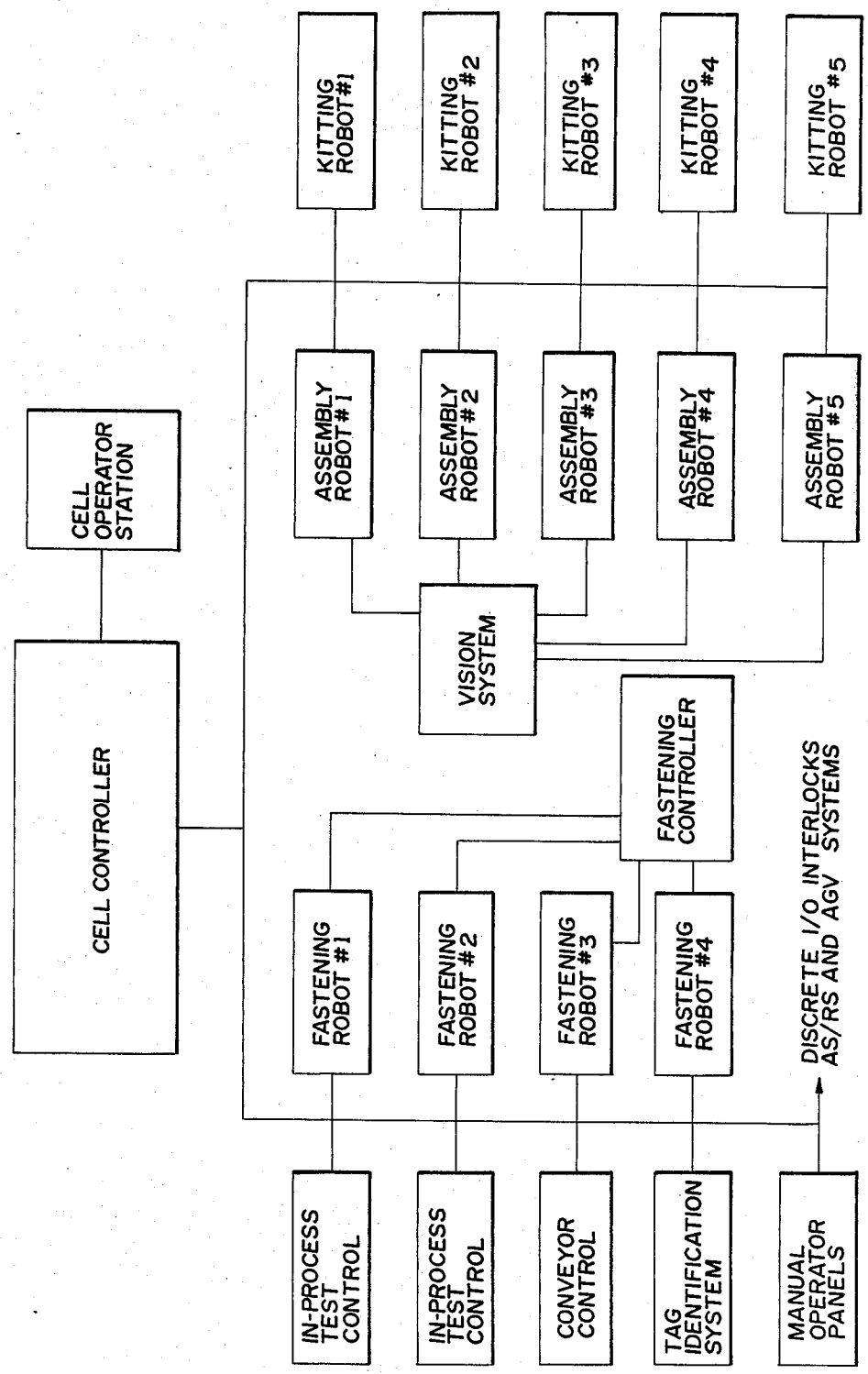
FIG. 16 is a block diagram of a distributed or hierarchical control system of the present invention.

Referring now to FIGS. 16 and 17 there is illustrated a distributed control architecture in which decisions are made at the lowest level possible. This structure allows each element of the system 20 to operate as independently as possible, a factor which simplifies control logic and provides for individual device operation in degraded mode operation. The decision-making ability of devices has greatly increased in recent years with new advances in microprocessors, memory, and software.

The control for the overall system is divided into a number of modules, or cells. The activities within each cell are controlled by its cell controller. For example, the transmission assembly system 20 has four (4) robotic kitting/fastening/test cells 34 through 40, three (3) assembly cells 96, 104 and 110, an automatic guided vehicle system 26, and an automated storage/retrieval system 62.

CONTROL ARCHITECTURE

As shown in FIG. 16, each cell consists of a number of automation devices, which may include robots, fastening systems, test equipment, vision systems, etc. The operation of these devices is coordinated with one another and with external equipment which interfaces with cell devices, such as materials handling equipment. A cell controller is used to perform this coordinating function. The robots within the cell utilize their controllers to operate and perform the necessary operations for transmission assembly. The robots function in a manner similar to the operator in the manual assembly area. This approach simplifies the high level control software needed to run the system 20. This decentralized control hierarchy provides greater reliability through the use of many components with inherent back-up capability.

CELL CONTROLLER

The primary role of each cell controller 80, 190, 192 or 194 is to integrate the individual cell devices. In this role the cell controller performs a variety of functions such as: sequential control of cell devices; data acquisition and analysis; alarming/error logging; material control; device program back-up; operator interface; and communications.

SEQUENTIAL CONTROL OF CELL DEVICES

The main purpose of each cell controller is to monitor and coordinate the operation of the various devices within a cell. It does this by issuing program commands and by manipulating discrete I/O interlock signals. Typical cell devices include robots, test equipment, tag identification systems, fastening equipment, materials handling equipment, and hard automation such as bolt feeders.

Key system level control functions being provided include: cell initialization—this includes downloading of device programs, device parameters, and resetting all devices to a known state; cell startup/shutdown—this function provides safe starts and shutdowns of cell activity, and takes into account previous activity of the cell. This allows the cell to resume operations properly following unexpected shutdowns; fault monitoring/recovery—the cell controllers monitor error messages from all devices as well as determining error conditions from its own control logic. For each error condition, a proper recovery procedure is followed; material movement requests—the cell controller coordinates the movement of materials with the assembly operation; and device sequencing—the cell controller coordinates activities within the cell through such functions as selecting device task programs, and starting, interlocking, and pausing tasks in the proper sequence to assemble transmission components in the most efficient manner possible. For some simple devices, the cell controller acts as a device controller. This technique can reduce the cost of the assembly system by eliminating control hardware and interconnections.

The cell control architecture is structured so that control decisions are made at the lowest practical level. This enhances the effectiveness of both manual and semiautomatic control when the system is operating in a degraded mode.

DATA ACQUISITION AND ANALYSIS

Each cell controller collects information, condenses and operates upon it, and transfer the results to other plant level host systems. As the cell controller monitors the operation of its cell it maintains a historical database of production data for each transmission produced. Typical production information retained includes: part serial number; date processed; station ID; part ID or batch numbers (one for each major part); part status; cycle time data; and measured variables (i.e., pressure, force, etc.).

When appropriate, the cell controller performs X-bar and R calculations on the data obtained within its cell. This capability provides local statistical process control (SPC) at the cell level, thereby helping to insure product quality and minimize the possibility of producing large quantities of off-spec product.

ALARMING/ERROR LOGGING

Each cell controller reduces cell downtime through the use of comprehensive diagnostic messages. It has the capability to log both application and system messages to local terminals, external plant systems, or to a history file. Typically, the severity level for each message is categorized as: alarm—requires immediate attention; warning—potential problem; and event—normal occurrence.

Messages generated by the cell controller contain the following information: date and time; message class; message number; and line of English text.

MATERIAL CONTROL

A key function of each cell controller is to manage the movement of material within the cell.

During the entire assembly process, the cell controller keeps a running parts count of all materials and generate on-demand requests for additional parts as they are needed. This activity is coordinated with the material control manager. This approach minimizes buffer stocks and reduces the amount of inventory and WIP which is maintained on the floor.

The following functions are supported to control this activity: request material for the cell—the cell controller coordinates all material flow into and out of the assembly cell with a material control manager system. The material control manager system then dispatches automated storage/retrieval (AS/RS) units and/or automated guided vehicles (AGV) as required to perform the actual material transportation function; enter received material into the cell—once materials arrive at the cell, a verification process occurs to insure that the received materials are the correct ones. This verification process is performed by devices (i.e., tag identification systems, vision systems, etc.) within the cell and the results are reported to the cell controller; report errors to the materials manager—if any errors are detected, they are logged and the material control manager is informed of the anomaly condition. The cell controller then interfaces with the material control manager to have the incorrect materials removed in an orderly fashion; track materials within the cell—within the cell, a read/write tag identification system is used to record the contents of the materials handling containers and to keep a log of what operations have been performed on the material. The cell controller monitors this data for error checking and error recovery procedures; and remove materials from the cell—as subassemblies are completed within each cell, they are transferred to the adjacent cell via an AS/RS system. The cell controller notifies the AS/RS controller when completed subassemblies are ready for the transfer. Also, parts for repair are removed by the AGV system in a similar fashion. Production data relative to a part being removed are transferred to the materials management system at this time.

During the physical process of material transfer between devices, interlocking and handshaking are only between the two devices involved using discrete I/O. This minimizes system complexity and increases the reliability and safety of the transfer operation.

DEVICE PROGRAM BACKUP

Prior to beginning an assembly cycle, the cell controller verifies that the cell devices are loaded with the appropriate program. If the proper program is not resident within the cell device, the cell controller either downloads to the device from its files or requests a download of the appropriate files from a programmable device support system if a plant wide system is being used.

The cell controller also has the capability to upload device programs for storage.

OPERATOR INTERFACE

A combination of CRT and color graphic terminals are used to provide an operator interface 196 as shown in FIG. 11.

Interactive menu driven CRT displays provide the basic operator interface for cell control configuration, maintenance and backup operations. The cell controller is provided with a security system which insures that operators are only allowed to access the commands and displays that they are authorized to us. Command screens are menu driven such that the operator is presented with a menu of possible choices to which he must respond. These menus are automatically tailored to the particular user depending upon his level of authorization.

A color graphics terminal is provided with each cell controller. It is used as the primary cell interface. This unit supports all of the menu driven commands discussed above. It also is provided with a variety of graphic displays. These displays show operating personnel the real time status of the cell devices and permit operating personnel to interact in a timely and responsive manner. Displays are configured to include: process graphics which indicate the status of cell devices, the location and status of in-process assemblies and the status of expendable material supplies; process diagnostics using color and blink for ease of interpretation; emergency and alarm conditions are displayed on the bottom of each screen to permit easy identification and expedite corrective action; and real-time production statistics and trend charts that provide feedback on actual verses goal performance.

Two classifications of internal cell communications is addressed: communications between two devices and from cell controller to device.

DEVICE TO DEVICE COMMUNICATIONS

Communications directly between two devices within the cell is required when a physical interaction occurs between the two devices. The communication is usually one or a number of discrete I/O interlock signals which prevent collisions between the two devices.

CELL CONTROLLER TO DEVICE COMMUNICATIONS

Communications between the cell controller and devices are required for a variety of functions: cell controller to device—sequencing commands; part data (type and quantity); status requests; system messages; and device programs. Device to cell controller—device status; error messages; operation complete; part quantity status; test result data; and device programs.

The communications media between the device and cell controller take two forms. Those signals which must occur on a real-time basis (for achieving cycle time) are done through discrete I/O signals. Other non-time-critical data is done via serial communications.

EXTERNAL COMMUNICATIONS

Communications to external equipment generally occurs at two levels: interlocking signals at the device level, and all other communications via the cell controller.

Communications directly between a device within the cell and an external device is required when a physical interaction occurs between the two devices. The communication is usually one or a number of discrete I/O interlock signals which prevent collisions between the two devices. Examples are: robot removing from AS/RS dropoff point (one signal per location); and AS/RS dropping off or picking up (one signal per location).

Otherwise, the cell controller is the focal point for data into and out of the cell. The cell controllers communicate with the AGV and AS/RS controllers, a materials management computer, a plant scheduling computer, and so on.

The following information is communicated: messages to the cell controller—transmission build schedule; materials status in AS/RS dropoff points; and part ID and batch numbers for each part. Messages from the cell controller—production data; parts needed; send part to repair; system status; error log; subassembly completed; incorrect parts received; and test result data.

High performance communications networks are used for these applications. However, in some cases, it may be necessary to use point-to-point communications to achieve the performance required.

ROBOT CONTROLLERS

The robot controllers 198 are intelligent devices each of which is responsible for controlling its robot and its end-effector. Its normal functions include: control of robot motion; logical control of robot task; task program development and editing; process and device error detection; error recovery; direct activities of peripheral devices; manual operator interface; and receive commands from cell controller.

The robot controller is also capable of directly controlling peripheral devices such as automated parts feeders, workpiece fixturing, etc. This allows the automated cell to be controlled with fewer controllers, thereby increasing overall system reliability and reducing cost.

IN-PROCESS TEST CONTROLLERS

The in-process tests may or may not require separate programmable controllers, depending upon the complexity of the test to be performed. The functions include: receive parameter selection from a higher level computer; sequential control of the test process; determining pass/fail status; reporting results; and reporting errors.

Optionally, the test controller can log and perform analysis upon test data for statistical process control or historical reports.

FASTENING CONTROLLERS

Although the nutrunner can be considered as a robot end-effector, the control requirements are sufficiently complex that a separate controller is required. The fastening controller performs the following functions: receive parameter selection from a higher level computer; perform sequential control of nutrunner spindles; control and monitor torque and angle; report results; and report errors.

VISION SYSTEMS

The vision system is set up as a peripheral device to the cell controller or to the robot controller. The application determines which of these is the logical host.

The functions of the vision system controller are: receive commands from its host; gather data from the process (take picture); analyze the data; report results to the host; and report errors to the host.

MATERIALS HANDLING (i.e. MGV) CONTROLLERS

The materials handling systems may or may not require separate controllers, depending upon the complexity of the equipment to be controlled. Simple equipment is controlled directly by the cell controller. The functions required include: communications to cell controller; interlocking with cell devices; sequential control of the equipment; and error reporting to the cell controller.

TAG IDENTIFICATION SYSTEMS

Passive read/write ID tags are used in the cell to facilitate materials tracking. These tags are attached to materials handling containers. The tags contain data about the parts within the pallet, including transmission type and option, operations performed, process errors, etc.

At workstations, the operation performed or materials added are recorded on the tag. This tag is read prior to beginning any new operation on the part and compared to expected data. If a discrepancy is found, an error message is generated and operator intervention is required.

An important use of this tag system is to simplify parts tracking as they leave and re-enter the domain of the cell. This occurs, for example, when the parts are picked up by an AGV 22 and taken to a manual build or repair area. Upon arrival at a destination, the parts are identified as necessary. When the parts or assembly is returned to the domain of the cell, they are re-identified.

Another important function of this read/write tag system is to aid in recovery from catastrophic errors, such as loss of memory in the cell controller.

OPERATOR INTERFACE

An efficient and simple operator interface is a key ingredient for a successfully operating automation system. An operator interface 196 is provided at each device for setup and maintenance. It is also provided at the cell level for control and monitoring of the overall cell.

The control logic is designed for normal operation in a fully automatic mode, but with provisions for semi-automatic and manual modes for debugging, degraded operation, and setup. The cell operating modes are selectable at the cell controller man-machine interface station 200. Each device is also capable of being switched independently into a local or remote mode.

Preferred locations of operator panels for the robotic kitting/fastening/test cell 36 are shown in FIG. 11.

CELL MAN-MACHINE INTERFACE STATION

The cell man-machine interface station is used for all control functions that require the coordination of cell devices to perform a task. Two terminals are provided for the operator: a monitoring terminal and a control terminal. The color graphics monitoring terminal is used for observing the status of all components of the cell, and for accessing message logs, statistical data, and device program backup.

The control terminal is used for selecting cell modes, entering parameters, initiating execution, halting execution, etc.

MANUAL OPERATOR STATIONS

As previously mentioned, each intelligent device is equipped with an operator control panel 196. In addition, manual operator panels are placed at convenient locations for operation of hard automation equipment, such as the conveyor system, etc. These manual panels allow each device to be operated as needed via pushbuttons.

At the intelligent device control panels, an operator or maintenance technician performs the tasks that must be done at the device level, such as testing and modifying task programs, tool setup, teaching positions, and making other adjustments.

Preferably, permanently mounted on each assembly pallet, is a read-write device which is monitored and updated throughout the assembly process thus insuring proper model identification and verification of successful completion of each task. Each station in the assembly sequence has a unit which reads from and writes on to the device. At the beginning of the sequence, the cell controller initiates instructions to erase the device and write on to it the model of the component to be assembled. At each station the read-write device is read to identify the model and initiate the appropriate task to be accomplished. This is done at the robotic kitting stations, robotic assembly stations, hard automation stations, manual build stations, robotic fastening stations, test stations and repair areas or loops. After completion of the task, the read-write device is written on to verify successful completion of the task or identified as defective. Successful completion allows the pallet 28 to proceeds to the next station in the sequence. Once an assembly is identified as defective, the pallet 28 bypasses all subsequent operations and proceeds to the repair loop 58. Once the assembly is repaired, the pallet 28 is reinserted into the assembly sequence and the remaining tasks completed.

Preferably, all robotic end-effectors incorporate part present sensors. Depending on the application, these sensors are electronic, electromechanical, optical or pneumatic. The sensors verify part presence at the retrieval point and insure against loss until the completion of the operation. For part retrieval in the part presentation pallets 28 the sensors are tied into the preprogrammed decision-making process of the robot. If a part is not present in the appropriate position of the presentation pallet 28 the robot proceeds to the next location and attempts to retrieve a part there. Where applicable, load cells and/or position monitors are incorporated to insure that the task is accomplished correctly. These sensors can be part of an in-process control loop which detects assembly/insertion errors, commands the robot to back out, and attempts the process again. Where possible, sensors in the end-effectors assist in identifying that the correct part is being handled. This assists in the verification that the correct part is being applied to the appropriate model of assembly.

As indicated before, the robot initiates the read instruction from the read-write device on the assembly pallet 28. This allows the robot to identify the model of the assembly independently of the cell controller and initiates the appropriate sequence of events to be completed. Also, after completion of the task the robot controller initiates the instruction to write onto the read-write device successful completion of the task or identify an unsuccessful task and initiate delivery of the pallet 28 to the repair loop 58.

All screws and bolts are torqued by means of programmable bolt runners and monitored for both torque and angle. These bolt runners are manipulated robotically so that both manual and automatic transmissions are processed in the same fastening stations 126. These bolt runners are coupled with automatic blow feeders which deliver different sizes of bolts where necessary or simply torque bolts which were started in their respective manual build areas. With the programmable controllers coupled to the bolt runners, various limits of both torque and angle are monitored for determination of successful/unsuccessful fastening sequences. The bolt runner controller is interfaced with its robot controller 198 which processes all the decision-making functions of the fastening station 126.

As before, the read-write device reads at the beginning of the process and is written onto at the end of the process to identify successful/unsuccessful completion of the task.

Grayscale vision systems are incorporated where necessary to identify and/or locate parts for kitting and assembly. Parts retrieved from presentation pallets 28 which require orientation determination are located with the vision system. Once the part is located and retrieved from the presentation pallets 28, it is placed on to the assembly pallets 28 which maintain the required orientation and thus allow subsequent operations to proceed without the use of vision. The vision systems are utilized in a limited capacity being applied only where alternative means of part identification and orientation cannot be used.

The vision system includes a control system and when used in conjunction with the robots the vision system is directly interfaced. Depending on the application, either the vision or the robot controller initiates the read-write process for the read-write device.

All parts and assemblies are handled to some degree within the manual build stations of the manual build areas. This allows for human inspection and detection of defects. The operators in the manual build stations are allowed to make a determination as to the best method of repair. If the repair is simple and the necessary parts accessible, the operator makes the repair and completes his assembly operation. If it is a complex repair or the operator does not have access to the necessary parts, he identifies the defect which in turn will be written on to the read-write device and the assembly pallet 28 is delivered to the repair loop 58 where a more in depth repair can be accomplished.

At the end of each assembly sequence, both robotic and manual, the assembly is processed through an appropriate test machine 202 within the station 186. These machines 202 are specially designed to accomplish the appropriate tasks required and certify the assembly as satisfactory or unsatisfactory. If the test results are positive the assembly proceeds to the next sequence. If the test results are not adequate the defect is identified, where possible, and the assembly rejected and delivered to the repair loop 58. Once repaired, the assembly is reprocessed through the test machine 202.

Again, identification and certification are processed through the read-write device interface.

While the best mode for carrying out the invention has been described in detail, those familiar with the art to which this invention relates will recognize various alternative designs and embodiments for practicing the invention as defined by the following claims.

What is claimed is:

1. A method for the automated assembly of parts on an assembly pallet in an assembly area, the method comprising:

(a) automatically transferring the assembly pallet to a knitting station in the assembly area including a kitting robot having a work envelope;
(b) storing a first set of parts at the kitting station within the work envelope of the kitting robot;
(c) utilizing the kitting robot to pick and place the first set of the parts on the assembly pallet at a first set of predetermined positions thereon;
(d) automatically transferring the assembly pallet loaded with the parts to an assembly station in the assembly area to assemble the parts on the assembly pallet into at least one assembly;
(e) automatically transferring the assembly on the assembly pallet to an unload station for unloading the assembly from the assembly pallet wherein the assembly area includes first and second kitting stations including first and second kitting robots, respectively, each of the kitting robots having a work envelope and wherein the method further comprising the steps of:
(f) storing a second set of the parts at the second kitting station within the work envelope;
(g) automatically transferring the assembly pallet from the first kitting station to the second kitting station;
(h) utilizing the second kitting robot to pick and place the second set of the parts on the assembly pallet at a second set of predetermined positions thereon;
(i) automatically monitoring and coordinating operation of the first and second kitting robots with the automatic transferring of the assembly pallet to and from the kitting stations to control the flow of parts and the pallet in the assembly area; and
repeating steps (a) through (i) for each assembly.

2. The method as claimed in claim 1 wherein the assembly station includes an assembly robot having a work envelope and wherein the method further comprises the step of utilizing the assembly robot to at least partially assemble the parts on the assembly pallet, the assembly pallet being located within the work envelope of the assembly robot during the step of utilizing the assembly robot.

3. The method as claimed in claim 1 wherein the assembly area includes first and second assembly stations including first and second assembly robots, respectively, each of the assembly robots having a work envelope and the first assembly robot partially assembling the parts on the assembly pallet and wherein the method further comprises the steps of:

(j) automatically transferring the assembly pallet from the first assembly station to the second assembly station;
(k) utilizing the second assembly robot to assemble the parts on the assembly pallet into the assembly, the assembly pallet being located within the work envelope of the second assembly robot during the step of utilizing the second assembly robot; and
repeating steps (j) through (k) for each assembly.

4. The method as claimed in claim 3 further comprising the steps of:
storing a third set of the parts within the work envelope of at least one of the first and second assembly robots; and
utilizing the one of the first and second assembly robots to pick and place at least one of the third set of parts into the assembly.

5. The method as claimed in claim 3 wherein the assembly pallet is transferred along a guide track and wherein the first and second assembly robots are located on opposite sides of the guide track to assemble first and second assemblies at predetermined locations on the assembly pallet from the parts on the assembly pallet.

6. The method as claimed in claim 4 wherein the first and second assembly robots are utilized to assemble first and second assemblies at predetermined locations on the assembly pallet from the parts on the assembly pallet.

7. The method as claimed in claim 1 wherein the assembly pallet is transferred along a guide track and wherein the kitting robot is mobile to move parallel to the guide track.

8. The method as claimed in claim 1 or claim 8 wherein the assembly pallet is transferred along a loop-shaped guide track, each of the stations being located along the guide track.

9. The method as claimed in claim 1 wherein the assembly pallet is transferred along a guide track by a pallet-supporting carrier and by means for selectively controlling movement of the carrier to permit the assembly pallet to stop at selected stations while passing through other stations along the guide track without stopping.

10. The method as claimed in claim 1 further comprising the step of automatically unloading the assembly from the assembly pallet at the unload station.

11. The method as claimed in claim 11 wherein the step of automatically unloading includes the step of utilizing an unloading robot to pick the assembly from the assembly pallet.

12. The method as claimed in claim 1 further comprising the steps of:
unloading the assembly from the assembly pallet at the unload station; and
storing the assembly at a predetermined assembly position in a storage area.

13. The method as claimed in claim 13 wherein the storage area includes a queuing rack structure and wherein the assembly is located on a storage pallet at the predetermined assembly position within the queuing rack structure.

14. A method for the automated assembly of parts and at least one subassembly on an assembly pallet in an assembly area, the method comprising:
(a) automatically transferring the assembly pallet to a kitting station in the assembly area including at least one kitting robot having a work envelope;
(b) storing a first set of parts and the subassembly at the kitting station within the work envelope of the kitting robot;
(c) utilizing the kitting robot to pick and place a first set of the parts on the assembly pallet at a first set of predetermined positions thereon and to pick and place the subassembly on the assembly pallet at a second predetermined positions thereon;
(d) automatically transferring the assembly pallet loaded with the parts to an assembly station in the assembly area to assemble the parts and the subassembly on the assembly pallet into at least one assembly;
(e) automatically transferring the assembly on the assembly pallet to an unload station for unloading the assembly from the assembly pallet wherein the assembly area includes first and second kiting stations including first and second kitting robots, respectively, each of the kitting robots having a work envelope and wherein the method further comprises the steps of:
(f) storing a second set of the parts at the second kitting station within the work envelope of the second kitting robot;
(g) automatically transferring the assembly pallet from the first kitting station to the second kitting station;
(h) utilizing the second kitting robot to pick and place the second set of the parts on the assembly pallet at a second set of predetermined positions thereon;
(i) automatically monitoring and coordinating operation of the first and second kitting robots with the automatic transferring of the assembly pallet to and from the kitting stations to control the flow of parts and the pallet in the assembly area; and
repeating steps (a) through (i) for each assembly.

15. The method as claimed in claim 14 wherein the assembly station includes an assembly robot having a work envelope and wherein the method further comprises the step of utilizing the assembly robot to at least partially assembly the parts with the subassembly on the assembly pallet, the assembly pallet being located within the work envelope of the assembly robot during the step of utilizing the assembly robot.

16. The method as claimed in claim 14 wherein the assembly area includes first and second assembly stations including first and second assembly robots, respectively, each of the assembly robots having a work envelope and the first assembly robot partially assembling the parts on the assembly pallet and wherein the method further comprises the steps of:
(j) automatically transferring the assembly pallet from the first assembly station to the second assembly station;
(k) utilizing the second assembly robot to assemble the parts and the subassembly on the assembly pallet into the assembly, the assembly pallet being located within the work envelope of the second assembly robot during the step of utilizing the second assembly robot; and
repeating steps (j) through (k) for each assembly.

17. The method as claimed in claim 16 further comprising the steps of:
storing a third set of the parts within the work envelope of at least one of the first and second assembly robots; and
utilizing the one of the first and second assembly robots to pick and place at least one of the third set of parts into the assembly.

18. The method as claimed in claim 16 wherein the assembly pallet is transferred along a guide track and wherein the first and second assembly robots are located on opposite sides of the guide track to assembly first and second assemblies at predetermined locations on the assembly pallet from the parts and the subassembly on the assembly pallet.

19. A method for the automated assembly of parts and a subassembly on an assembly pallet in an assembly area, the method comprising:
(a) automatically transferring a first assembly pallet to a first kitting station in the assembly area including a first kitting robot having a work envelope;
(b) storing a first set of parts at the first kitting station within the work envelope of the first kitting robot;
(c) utilizing the first kitting robot to pick and place the first set of the parts on the first assembly pallet at a first set of predetermined positions thereon;

(d) automatically transferring the first assembly pallet loaded with the parts to a first assembly station in the assembly area to assemble the parts on the assembly pallet into at least one subassembly;

(e) automatically transferring the subassembly on the first assembly pallet to a first unload station;

(f) unloading the subassembly from the first assembly pallet at the first unload station;

(g) storing the subassembly at a predetermined subassembly position in a storage area;

(h) storing a second set of the parts at predetermined part positions within the storage area;

(i) automatically transferring a second assembly pallet to a second kitting station in the assembly area including a second kitting robot having a work envelope;

(j) automatically transferring the second set of parts and the subassembly from the storage area to the second kitting station within the work envelope of the second kitting robot;

(k) utilizing the second kiting robot to pick and place the second set of parts and the subassembly on the second assembly pallet at a second set of predetermined positions thereon;

(l) automatically transferring the second assembly pallet loaded with the second set of parts and the subassembly to a second assembly station in the assembly area to assemble the parts and the subassembly on the second assembly pallet into an assembly;

(m) automatically transferring the assembly on the second assembly pallet to a second unload station for unloading the assembly from the second assembly pallet;

(n) automatically monitoring and coordinating operation of the first and second kitting robots with the automatic transferring of the assembly pallet to and from the kitting stations to control the flow of parts and the pallet in the assembly area; and repeating steps (a) through (n) for each assembly.

20. The method as claimed in claim 19 wherein the first assembly station includes an assembly robot having a work envelope and wherein the method further comprises the step of utilizing the assembly robot to at least partially assemble the parts on the first assembly pallet, the first assembly pallet being located within the work envelope of the first assembly robot during the step of utilizing the first assembly robot.

21. The assembly as claimed in claim 19 or claim 20 wherein the assembly area includes a third kitting station including a third kitting robot, the third kitting robot having a work envelope and wherein the method further comprises the steps of:

(o) storing a third set of the parts at the third kitting station within the work envelope of the third kitting;

(p) automatically transferring the first assembly pallet from the first kitting station to the third kitting station;

(q) utilizing the third kitting robot to pick and place the third set of the parts on the first assembly pallet at a third set of predetermined positions thereon; and repeating steps (o) through (q) for each assembly.

22. The method as claimed in claim 21 wherein the assembly area includes a third assembly station including a second assembly robot, the second assembly robot having a work envelope, the first assembly robot partially assembling the parts on the first assembly pallet and wherein the method further comprises the steps of:

(r) automatically transferring the first assembly pallet from the first assembly station to the third assembly station;

(s) utilizing the second assembly robot to assemble the parts on the first assembly pallet into the subassembly, the first assembly pallet being located within the work envelope of the second assembly robot during the step of utilizing the second assembly robot; and repeating steps (r) through (s) for each assembly.

23. The method as claimed in claim 22 further comprising the steps of:

storing a fourth set of the parts within the work envelope of one of the first and second assembly robots; and utilizing the one of the first and second assembly robots to pick and place at least one of the fourth set of parts into the subassembly.

24. The method as claimed in claim 22 wherein the first assembly pallet is transferred along a guide track and wherein the first and second assembly robots are located on opposite sides of the guide track to assembly first and second subassemblies at predetermined locations on the first assembly pallet from the parts on the first assembly pallet.

25. A method for the automated assembly of parts and first and second subassemblies on an assembly pallet in an assembly area, the method comprising:

(a) automatically transferring a first assembly pallet to a first kitting station in the assembly area including a first kitting robot having a working envelope;

(b) storing a first set of parts at the first kitting station within the work envelope of the first kitting robot;

(c) utilizing the first kitting robot to pick and place the first set of the parts on the first assembly pallet at a first set of predetermined positions thereon;

(d) automatically transferring the first assembly pallet loaded with the parts of a first assembly station in the assembly area to assemble the parts on the assembly pallet into a first subassembly;

(e) automatically transferring the first subassembly on the first assembly pallet to a first unload station;

(f) unloading the first subassembly from the first assembly pallet at the first unload station;

(g) storing the first subassembly at a first predetermined subassembly position in a first storage area;

(h) storing a second set of the parts at predetermined part positions and a second subassembly at a second predetermined subassembly position within the first storage area;

(i) automatically transferring a second assembly pallet to a second kitting station in the assembly area including a second kitting robot having a work envelope;

(j) automatically transferring the second set of parts and the first subassembly from the storage area to the second kitting station within the work envelope of the second kitting robot;

(k) utilizing the second kiting robot to pick and place the second set of parts and the first subassembly on the second set of parts and the first subassembly on the second assembly pallet at a second set of predetermined positions thereon;

(l) automatically transferring the second assembly pallet from the second kitting station to a third kitting station in the assembly area including a third kitting robot having a work envelope;
(m) automatically transferring the second subassembly from the first storage area to the third kitting station within the work envelope of the third kitting robot;
(n) utilizing the third kitting robot to pick and place the second subassembly on the second assembly pallet at a predetermined position thereon;
(o) automatically transferring the second assembly pallet loaded with the second set of parts and the first and second subassemblies to a second assembly station in the assembly area to assemble the parts and the first and second subassemblies on the second assembly pallet into an assembly;
(p) automatically transferring the assembly on the second assembly pallet to a second unload station for unloading the assembly from the second assembly pallet;
(q) automatically monitoring and coordinating operation of the first and second kitting robots with the automatic transferring of the assembly pallet to and from the kitting stations to control, the flow of parts and the pallet in the assembly area; and
repeating steps (a) through (q) for each assembly.

26. The method as claimed in claim 25 wherein the first assembly station includes a first assembly robot having a work envelope and wherein the method further comprises the step of utilizing the first assembly robot to at least partially assemble the parts on the first assembly pallet, the first assembly pallet being located within the work envelope of the first assembly robot during the step of utilizing the first assembly robot.

27. The method as claimed in claim 26 wherein the assembly area includes a third assembly station including a second assembly robot, the second assembly robot having a work envelope, the first assembly robot partially assembling the parts on the first assembly pallet and wherein the method further comprises the steps of:
(r) automatically transferring the first assembly pallet from the first assembly station to the third assembly station;
(s) utilizing the second assembly robot to assemble the parts on the first assembly pallet into the first subassembly, the first assembly pallet being located within the work envelope of the second assembly robot during the step of utilizing the second assembly robot; and
repeating steps (r) through (s) for each assembly.

28. The method as claimed in claim 27 further comprising the steps of:
storing a third set of the parts within the work envelope of one of the first and second assembly robots; and
utilizing the one of the first and second assembly robots to pick and place at least one of the third set of parts into the first subassembly.

29. The method as claimed in claim 27 wherein the first assembly pallet is transferred along a guide track and wherein the first and second assembly robots are located on opposite sides of the guide track to assemble first and third subassemblies at predetermined locations on the first assembly pallet from the parts on the first assembly pallet.

30. The method as claimed in claim 25 further comprising the steps of:
unloading the assembly from the second assembly pallet at the unload station; and
storing the assembly at a predetermined location in a second storage area.

* * * * *

UNITED STATES PATENT AND TRADEMARK OFFICE
CERTIFICATE OF CORRECTION

PATENT NO. : 4,815,190

DATED : March 28, 1989

INVENTOR(S) : Anthony R. Haba et al

It is certified that error appears in the above-identified patent and that said Letters Patent is hereby corrected as shown below:

Column 1, line 43
after "control" and before "Computer" add --.--.

Column 2, line 43
after "car-on-track" and before "systems", "track" should be eliminated.

Column 2, lines 53-54
"subassemb-Iies" should be --subassemblies--.

Column 5, line 66
after "of" and before "robotic", eliminate "and" and after "robotic" insert --and--.

Column 9, line 68 after "vertically" and before "tier)" add --(--.

Column 10, line 27
after "functions" and before "transfers" add --:--.

Column 13, line 52
after "via" and before "AGV" "&he" should be --the--.

Column 17, line 14,
after "end-effector" and before "picks", "an" should be --and--.

Column 19, line 63 after "subassemblies" and before "full" "s" should be --is--.

UNITED STATES PATENT AND TRADEMARK OFFICE
CERTIFICATE OF CORRECTION

PATENT NO. : 4,815,190 (handwritten correction from 4,815,180)

DATED : March 28, 1989

INVENTOR(S) : Anthony R. Haba et al

Page 2 of 4

It is certified that error appears in the above-identified patent and that said Letters Patent is hereby corrected as shown below:

Column 20, line 57
after "input" and before "and" delete "+".

Column 20, line 59
after "pallet" and before "28)" insert --(--.

Column 24, line 27
after "bearing" and before "the end-effector", "i" should be --in--.

Column 24, line 41
after "OUTPUT SHAFT SUBASSEMBLY LINE", "The" should be placed on new line.

Column 24, line 67
after "the" and before "that", "ensue" should be --ensure--.

Column 35, line 43
after "the" and before the second "the", "release" should be --releases--.

Column 36, line 31
after "blow" and before "to", "bed" should be --fed--.

Column 39, line 41
after "assembly." and before "The" add --(--.

Column 41, line 12
after "to" and before "robotic" delete "a".

UNITED STATES PATENT AND TRADEMARK OFFICE
CERTIFICATE OF CORRECTION

PATENT NO. : 4,815,190

DATED : March 28, 1989

INVENTOR(S) : Anthony R. Haba et al

It is certified that error appears in the above-identified patent and that said Letters Patent is hereby corrected as shown below:

Column 41, line 22 last word on line 24 "&he" should be --the--.

Column 43, line 67 after "on" and before "fixture", "he" should be --the--.

Column 45, line 37 after "the" and before "holds", "racks" should be --rack--.

Column 46, line 26 after "assemblies" and before "the", "a&" should be --at--.

Column 52, line 16 before "44", "ares" should be --areas--.

Column 55 line 11 after "to" and before "Command", "us" should be --use--.

Column 58, lines 28-29

"proceeds" should be --progress--.

Column 61, line 15 after "claim 1" change "or claim 8", to --or claim 7--.

Column 61, line 29 after "claim" and before "wherein", "11" should be --10--.

UNITED STATES PATENT AND TRADEMARK OFFICE
CERTIFICATE OF CORRECTION

PATENT NO. : 4,815,190 (4,185,190)

DATED : March 28, 1989

INVENTOR(S) : Anthony R. Haba et al

Page 4 of 4

It is certified that error appears in the above-identified patent and that said Letters Patent is hereby corrected as shown below:

Column 61, line 39 after "claim" and before "wherein", "13" should be --12--.

Column 62, line 54 after "to", "assembly" should be --assemble--.

Column 63, line 21 after "second" and before "robot", "kiting" should be --kitting--.

Column 64, line 24 after "to", "assembly" should be --assemble--.

Signed and Sealed this

Twelfth Day of June, 1990

Attest:

HARRY F. MANBECK, JR.

Attesting Officer

Commissioner of Patents and Trademarks